US012711562B1

(12) United States Patent
Burnett

(10) Patent No.: US 12,711,562 B1
(45) Date of Patent: Aug. 18, 2026

(54) COMPUTER-IMPLEMENTED SYSTEMS AND METHODS FOR REAL ESTATE METADATA ACQUISITION, CRYPTOGRAPHIC VERIFICATION, AND SMART-CONTRACT RECONCILIATION USING BLOCKCHAIN AND MACHINE LEARNING

(71) Applicant: Tyrone Burnett, Indianapolis, IN (US)

(72) Inventor: Tyrone Burnett, Indianapolis, IN (US)

( * ) Notice: Subject to any disclaimer, the term of this patent is extended or adjusted under 35 U.S.C. 154(b) by 0 days.

(21) Appl. No.: 19/094,211

(22) Filed: Mar. 28, 2025

(51) Int. Cl.
*G06Q 50/16* (2024.01)
*G06Q 30/018* (2023.01)

(52) U.S. Cl.
CPC ......... *G06Q 50/16* (2013.01); *G06Q 30/0185* (2013.01); *G06Q 2220/00* (2013.01)

(58) Field of Classification Search
CPC ............... G06Q 50/16; G06Q 30/0185; G06Q 2220/00; G06Q 10/10; G06Q 10/08; G06V 30/416; H04L 9/3239; H04L 9/50; G06N 20/00; G06F 21/602; G06F 16/9537; G06F 16/29; G06F 16/248
See application file for complete search history.

(56) References Cited

U.S. PATENT DOCUMENTS

| | | | |
|---|---|---|---|
| 7,340,608 B2 | 3/2008 | Laurie et al. | |
| 8,271,431 B1 * | 9/2012 | Carrington ............ | G06Q 10/10 705/28 |
| 8,571,973 B1 | 10/2013 | Haberaecker et al. | |
| 8,688,461 B1 | 4/2014 | Richards et al. | |
| 8,689,094 B1 | 4/2014 | Trimble et al. | |
| 9,679,276 B1 | 6/2017 | Cuende | |
| 10,074,145 B2 | 9/2018 | Budlong | |
| 10,121,215 B2 | 11/2018 | Branscomb et al. | |
| 10,248,731 B1 | 4/2019 | Brouwer, II et al. | |
| 11,055,436 B2 | 7/2021 | Saket et al. | |

(Continued)

OTHER PUBLICATIONS

Stewart Title | VA Bulletins MU2009004 / SA2013013 (2013) → ¶[0303]-[0309] | Context Note: Post-transaction workflows without real-time metadata validation.

(Continued)

*Primary Examiner* — Sarah M Monfeldt
*Assistant Examiner* — Don Edmonds

(57) ABSTRACT

In some approaches, a computer-implemented system acquires and reconciles real estate metadata from diverse sources to detect potential ownership or record discrepancies. The system may submit automated public record requests for government-issued documents (e.g., land development building or zoning permit applications, subsequent permits or logs, or property ownership histories referencing a first owner of record) and extract structured metadata fields—including Tax Map Reference (TMR) values, Parcel Identification (PI) values, or Assessor Parcel (AP) identifier values. By cross-referencing these data with last-owner-of-record information from deeds, liens, or other instruments in public registries, the system verifies authenticity via a cryptographic infrastructure. A blockchain-based audit trail logs transactions for enhanced transparency. Integrating AI and distributed ledger technologies, these implementations streamline real estate transactions, improve data reliability, and facilitate cross-jurisdictional metadata validation.

4 Claims, 21 Drawing Sheets

(56) References Cited

U.S. PATENT DOCUMENTS

| | | | | |
|---|---|---|---|---|
| 11,145,017 | B1 | 10/2021 | Wu et al. | |
| 11,277,260 | B2 | 3/2022 | Sen et al. | |
| 11,373,257 | B1 | 6/2022 | Guo et al. | |
| 11,567,904 | B2 | 1/2023 | Earley et al. | |
| 11,593,901 | B2 | 2/2023 | Blackman et al. | |
| 11,748,371 | B2 | 9/2023 | Thomas et al. | |
| 2003/0140064 | A1 * | 7/2003 | Klein | G06Q 10/08 |
| 2015/0074018 | A1 * | 3/2015 | Gill | G06Q 50/16 705/36 T |
| 2016/0300234 | A1 | 10/2016 | Moss-Pultz et al. | |
| 2017/0132621 | A1 | 5/2017 | Miller et al. | |
| 2018/0189528 | A1 | 7/2018 | Hanis et al. | |
| 2018/0268504 | A1 | 9/2018 | Paolini-Subramanya et al. | |
| 2019/0033090 | A1 * | 1/2019 | Tzirkel-Hancock et al. | G01C 21/3617 |
| 2019/0294647 | A1 * | 9/2019 | Brouwer | G06F 16/9537 |
| 2020/0044827 | A1 | 2/2020 | Snow | |
| 2020/0111068 | A1 | 4/2020 | Scarselli et al. | |
| 2020/0410491 | A1 * | 12/2020 | Ronnow | H04L 63/1441 |
| 2021/0319059 | A1 | 10/2021 | Vianello et al. | |
| 2022/0067117 | A1 | 3/2022 | Brouwer, II et al. | |
| 2022/0284432 | A1 | 9/2022 | Papantoniou et al. | |
| 2022/0358607 | A1 * | 11/2022 | Guo | G06F 16/248 |
| 2023/0192304 | A1 * | 6/2023 | Mattikalli et al. | B64D 27/357 244/53 R |
| 2024/0054586 | A1 * | 2/2024 | Singh | G06Q 50/16 |
| 2024/0220969 | A1 * | 7/2024 | Marusyk | G06Q 50/16 |
| 2024/0388457 | A1 | 11/2024 | Gordon | |

OTHER PUBLICATIONS

Alta | VA Homebuyer Predatory Contract Protection (2024) → ¶[0310]-[0316] | Note: Industry guidance not incorporating modern metadata-integrity technologies.

First Excel Title | Promotion Notice (2016) → ¶[0317]-[0323] | Context Note: Represents conventional property-record processing workflows.

First American Title | AgentNet Order Insights (2024) → ¶[0324]-[0327] | Context Note: Describes order-management tools without blockchain-based validation.

Ginnie Mae | MBS Portfolio PR ($2.71T) (2025) → ¶[0023]-[0030] | Illustrates large-scale mortgage processing without metadata reconciliation across decentralized local systems.

Freddie Mac | Execution of Legal Documents Guidance (2025) → ¶[0031]-[0037] | Note: Discusses high-volume document execution absent blockchain or tamper-evident validation.

Fannie Mae | Legal Documents Resource Page (2025) → ¶[0038]-[0047] | Note: Highlights fragmented property-recording processes and metadata vulnerabilities.

HUD | Handbook 4310.5 Single Family Servicing (1994) → ¶[0048]-[0057] | Note: Legacy servicing guidance lacking modern data-integrity or reconciliation controls.

FHA | Direct Endorsement Program Guidance (2024) → ¶[0058]-[0066] | Context Note: Efficiency-driven endorsement framework without anomaly-detection mechanisms.

VA | Lenders Handbook M26-7 Ch. 4 (2019) → ¶[0067]-[0074] | Context Note: Underwriting processes dependent on decentralized property-record systems lacking cross-validation.

Ginnie Mae | Second Amendment to Contract w/ BNY Mellon (2015) → ¶ [0023]-[0030] | Context Note: SEC filing on Ginnie Mae operational processes.

Loudoun County | Commissioners of Accounts Manual Ch. 16 (2019) → ¶[0084]-[0093] | Context Note: Highlights systemic gaps in trustee-filing and property-recording workflows.

Loudoun County| AlertMe Notification System (2023) → ¶ [0094]-[0102] | Context Note: Property-notification service without proactive validation or tamper-evident controls.

Loudoun County | LandMARC System Overview (2023) → ¶[0103]-[0111] | Context Note: Centralized permitting system lacking blockchain-backed data-integrity measures.

Ampaloni / A&M | Land Use Audit Article (2024) → ¶[0084]-[0093] | Context Note: Independent audit confirming vulnerabilities in land-use and metadata workflows.

Plotkin / Covington | MERS eRegistry Validity Memo (2004) → ¶[0112]-[0124] | Context Note: Legal analysis identifying pre- and post-origination metadata vulnerabilities.

Loudoun County | FOIA Permit Records (19253 Harlow Sq) (2012) → ¶[0103]-[0111] | Note: Example of jurisdiction-level record inconsistencies relevant to metadata integrity.

Woolley & Herzog | Lost Chain of Title Study (2011) → ¶[0075]-[0083] | Context Note: Foundational study on title-chain disruption and property-recording risks.

Lyman | Corruption in Land Use & Building Regulation vol. I (1979) → ¶[0048]-[0057] | Context Note: Federal study on land-use regulatory weaknesses.

Merscorp Holdings | MERS System Integration Handbook vol. I (2015) → ¶[0112]-[0124] | Note: References chain-of-title vulnerabilities and relevant metadata-integrity gaps.

Merscorp Holdings | MERS Service Mark Reg. 2084831 (1997) → ¶[0112]-[0124] | Note: Foundational MERS reference cited in connection with specification.

Ice / Simplifile | eRecording System Acquisition Release (2019) → ¶[0233]-[0241] Describes eRecording workflows lacking robust metadata validation or reconciliation.

Fidlar Tech | Property Fraud Alert Notice (2024) → ¶[0242]-[0250] | Note: Illustrates reactive property-fraud notifications without intake-side integrity checks.

DTS | ALERTME Notification Program Release (2023) → ¶[0251]-[0261] | Note: Notification model that does not include proactive metadata verification.

Home Title Lock | FBI Advisory Release (2022) → ¶[0262]-[0272] | Note: Post-recordation monitoring approach without pre-recordation validation.

Tyler Tech | iasWorld Adoption Notice (2022) → ¶[0273]-[0283] | Note: Centralized land-management workflow lacking blockchain-based integrity control.

Old Republic Title | Transaction Services Overview (2025) → ¶[0284]-[0290] | Note: Post-transaction risk management framework without metadata reconciliation.

Title One Settlement | Services Summary (2025) → ¶[0291]-[0296] | Note: Conventional transactional processes without anomaly detection or validation.

Landamerica | Bankruptcy / Legacy Services (2008) → ¶[0297]-[0302] | Context Note: Illustrates legacy systems lacking modern data-integrity measures.

* cited by examiner

System architecture overview

(Computer-implemented system for metadata acquisition, reconciliation, and validation)

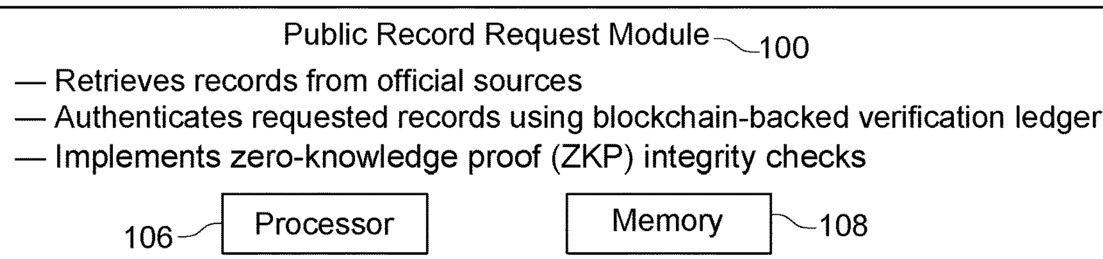

(Metadata flows)

Metadata Reconciliation Engine 200

— Extracts metadata fields using natural language processing (NLP)

— Executes graph neural network (GNN)-driven schema matching algorithm

— Compares metadata between:

▶ First owner metadata (Government-Issued, e.g., building/zoning permit applications, subsequent permits or logs), from a landowner, a developer, or homebuilder ▶ Last owner metadata (Public Registry, e.g., recorded deeds, liens, instruments)

metadata validation and processing 216

— Applies reinforcement learning-based anomaly detection

— Uses Bayesian inference for adaptive thresholding

— Generates confidence-weighted reconciliation outputs (Optional Machine Learning Model Retraining Engine)

Tax Map Reference (TMR) values, Parcel Identification (PI) values, and Assessor Parcel (AP) identifier values (cross-references TMR values, PI values, or AP identifier values) 220

Publicly recorded deeds (including trust deeds and liens) 222

Anomaly Detection Engine (flags potentially unauthorized release-record anomalies 224

(anomaly + metadata flows)

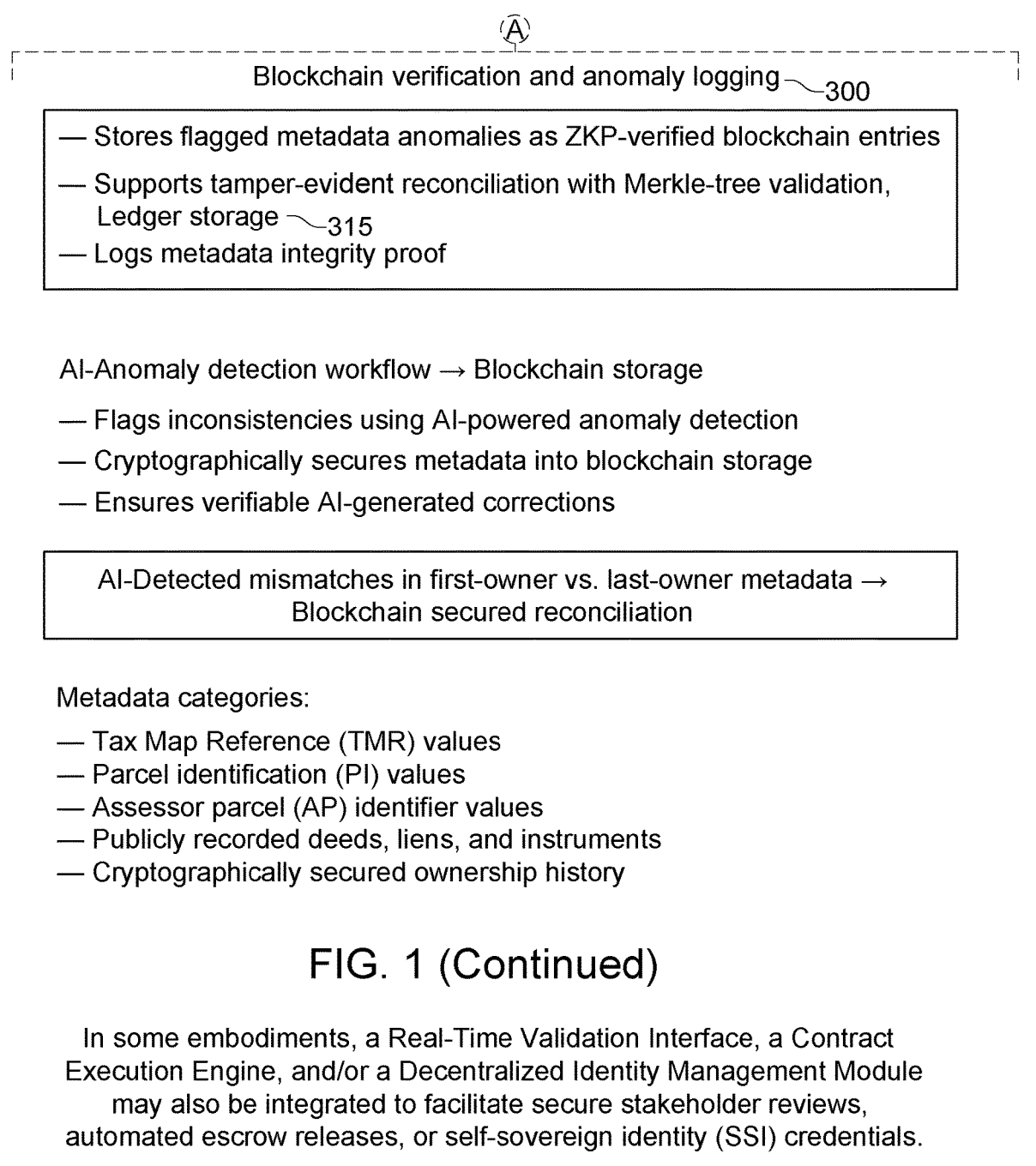

Blockchain verification and anomaly logging 300

— Stores flagged metadata anomalies as ZKP-verified blockchain entries
— Supports tamper-evident reconciliation with Merkle-tree validation, Ledger storage 315
— Logs metadata integrity proof AI-Anomaly detection workflow → Blockchain storage — Flags inconsistencies using AI-powered anomaly detection
— Cryptographically secures metadata into blockchain storage
— Ensures verifiable AI-generated corrections AI-Detected mismatches in first-owner vs. last-owner metadata → Blockchain secured reconciliation Metadata categories:

— Tax Map Reference (TMR) values
— Parcel identification (PI) values
— Assessor parcel (AP) identifier values
— Publicly recorded deeds, liens, and instruments
— Cryptographically secured ownership history

FIG. 1 (Continued)

In some embodiments, a Real-Time Validation Interface, a Contract Execution Engine, and/or a Decentralized Identity Management Module may also be integrated to facilitate secure stakeholder reviews, automated escrow releases, or self-sovereign identity (SSI) credentials.

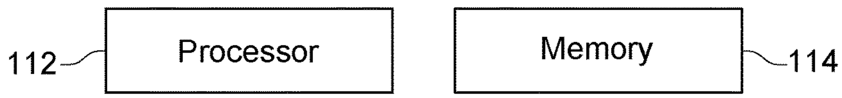

Public Record Request Module 100

— Generates and submits jurisdiction-specific public record requests
— Retrieves metadata from government-issued records and public registries
— Executes NLP-based metadata extraction 112 Processor Memory 114

Metadata acquisition and validation framework 120

— Extracts metadata from:

▶ Government-issued records (first owner metadata, e.g., a landowner such as developer or homebuilder)

▶ Public Registries (last owner metadata, e.g., recorded deeds, liens, instruments)

Core metadata dataset

— Tax Map Reference (TMR) values
— Parcel identification (PI) values
— Assessor Parcel (AP) identifier values AI-Powered schema matching and validation 205

— Performs graph neural network (GNN) schema matching
— Aligns metadata fields across jurisdictions
— Detects structural and semantic metadata inconsistencies 210 GNN Schema matching engine Metadata validation module 230

Metadata validation and reconciliation 230

— Executes AI & cryptographic proofs for data integrity
— Cross-references metadata using federated learning Tax Map Reference (TMR) values 232 (processes validated records)

Parcel Identification (PI) values 234 (standardizes parcel identifiers)

Assessor Parcel (AP) identifier values 236 (aligns with assessment data)

AI-Driven anomaly classification 238

— Detects metadata discrepancies via reinforcement learning (RL)
— Flags and prioritizes anomalies based on risk severity

FIG. 2

Metadata validation and AI-powered verification

Metadata Validation and AI-Powered Verification Module 950

Metadata acquisition and reconciliation module 310
— Collects and normalizes metadata from diverse data sources
— Identifies missing or incorrect entries
312 Processor
Memory 314

AI-powered metadata validation module 326
— Uses machine learning and AI models for metadata classification
— Enhances metadata reconciliation with automated verification 322 Graph neural network (GNN) schema matching
— Compares metadata structures 323 Self-Supervised Learning Subsystem
— Identifies patterns for AI model retraining 324 Reinforcement learning-based anomaly detection
— Detects irregularities and assigns risk scores 330 Blockchain-based metadata verification
— Provides tamper-evident recordkeeping for data consistency
— Ensures data integrity with cryptographic proofs
— [Optional] An SSI module or Contract Execution Engine can be integrated here to facilitate secure identity verifications or real-time title escrow conditions Cryptographic hashing module 332
— Generates hash-based metadata Digital signature verification subsystem 334
— Authenticates sources and approvals

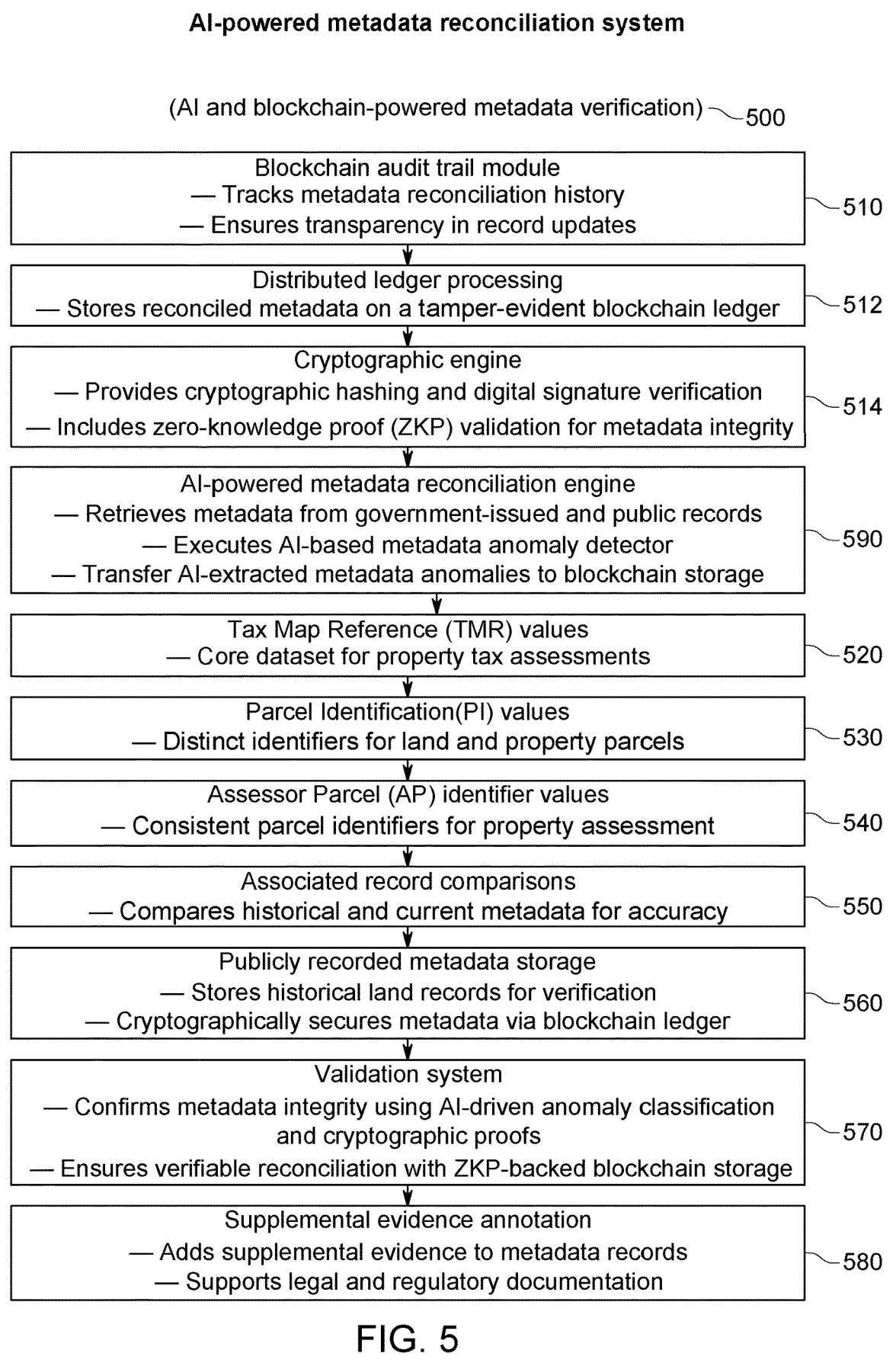

AI-powered metadata reconciliation system

(AI and blockchain-powered metadata verification) 500

Blockchain audit trail module
— Tracks metadata reconciliation history
— Ensures transparency in record updates
510

Distributed ledger processing
— Stores reconciled metadata on a tamper-evident blockchain ledger
512

Cryptographic engine
— Provides cryptographic hashing and digital signature verification
— Includes zero-knowledge proof (ZKP) validation for metadata integrity
514

AI-powered metadata reconciliation engine
— Retrieves metadata from government-issued and public records
— Executes AI-based metadata anomaly detector
— Transfer AI-extracted metadata anomalies to blockchain storage
590

Tax Map Reference (TMR) values
— Core dataset for property tax assessments
520

Parcel Identification(PI) values
— Distinct identifiers for land and property parcels
530

Assessor Parcel (AP) identifier values
— Consistent parcel identifiers for property assessment
540

Associated record comparisons
— Compares historical and current metadata for accuracy
550

Publicly recorded metadata storage
— Stores historical land records for verification
— Cryptographically secures metadata via blockchain ledger
560

Validation system
— Confirms metadata integrity using AI-driven anomaly classification and cryptographic proofs
— Ensures verifiable reconciliation with ZKP-backed blockchain storage
570

Supplemental evidence annotation
— Adds supplemental evidence to metadata records
— Supports legal and regulatory documentation
580

FIG. 5

Geospatial AI risk assessment engine
— Uses predictive models to assess geospatial anomaly risks Classification (Historical Data Pattern Recognition Engine)
— Identifies recurring anomaly patterns Sequence of Stakeholder Interactions for SSI and Ownership Verification:

(1) Government agencies issue digital property credentials.

(2) Sellers/buyers retrieve credentials from a Decentralized Identity Provider.

(3) Sellers present zero-knowledge proof (ZKP) to confirm valid ownership without revealing private information.

(4) Title companies or lenders cross-check blockchain records (via (765)/(770) for geospatial anomalies).

(5) If validated, the system executes a smart contract-based update (772), ensuring real-time reconciliation and tamper-evident finality.

FIG. 7 (Continued)

Example of Potential Stakeholders:
— Prospective homebuyers, homeowners, real estate agents/brokers, property buyers/sellers, developers, lawyers/law firms, city councils, county boards, land-use/zoning commissions, inspectors, planning consultants, property insurers, risk management firms, escrow companies, financial institutions (mortgage lenders, loan originators/servicers, GSEs like Fannie/Freddie), institutional investors (pension funds, hedge funds, etc.), rating agencies, trustees, appraisers/assessors, surveyors, technology/data providers, software/blockchain/AI system integrators, local recorder's offices (clerks recording deeds/liens), local or municipal entities assessing property taxes, and government/regulatory bodies monitoring legal compliance.

Figure 8:
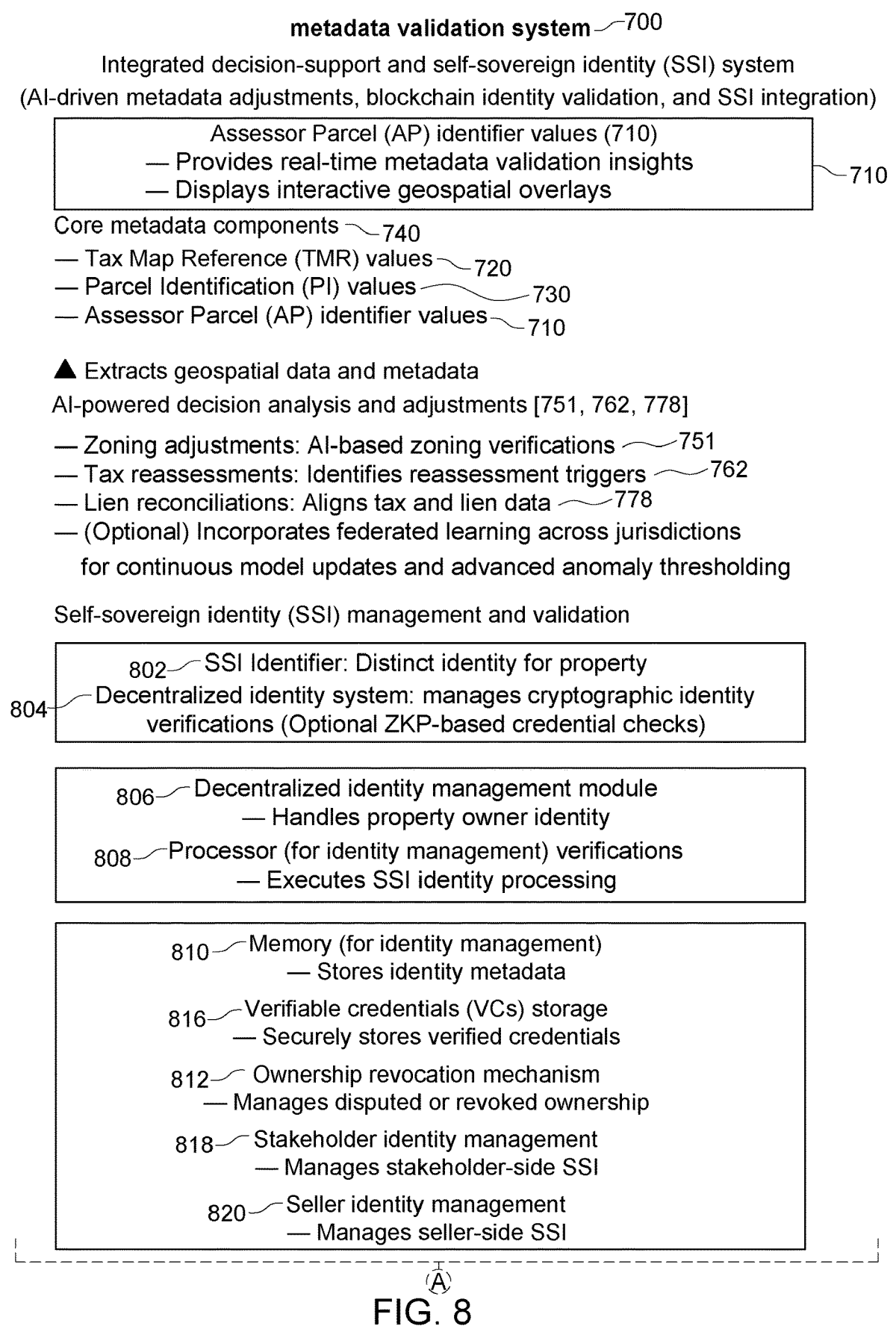

metadata validation system 700

Integrated decision-support and self-sovereign identity (SSI) system
(AI-driven metadata adjustments, blockchain identity validation, and SSI integration)

Assessor Parcel (AP) identifier values (710)
— Provides real-time metadata validation insights
— Displays interactive geospatial overlays
710

Core metadata components 740
— Tax Map Reference (TMR) values 720
— Parcel Identification (PI) values 730
— Assessor Parcel (AP) identifier values 710

▲ Extracts geospatial data and metadata

AI-powered decision analysis and adjustments [751, 762, 778]

— Zoning adjustments: AI-based zoning verifications 751
— Tax reassessments: Identifies reassessment triggers 762
— Lien reconciliations: Aligns tax and lien data 778
— (Optional) Incorporates federated learning across jurisdictions for continuous model updates and advanced anomaly thresholding Self-sovereign identity (SSI) management and validation 802 SSI Identifier: Distinct identity for property
804 Decentralized identity system: manages cryptographic identity verifications (Optional ZKP-based credential checks)

806 Decentralized identity management module
— Handles property owner identity
808 Processor (for identity management) verifications
— Executes SSI identity processing 810 Memory (for identity management)
— Stores identity metadata
816 Verifiable credentials (VCs) storage
— Securely stores verified credentials
812 Ownership revocation mechanism
— Manages disputed or revoked ownership
818 Stakeholder identity management
— Manages stakeholder-side SSI
820 Seller identity management
— Manages seller-side SSI

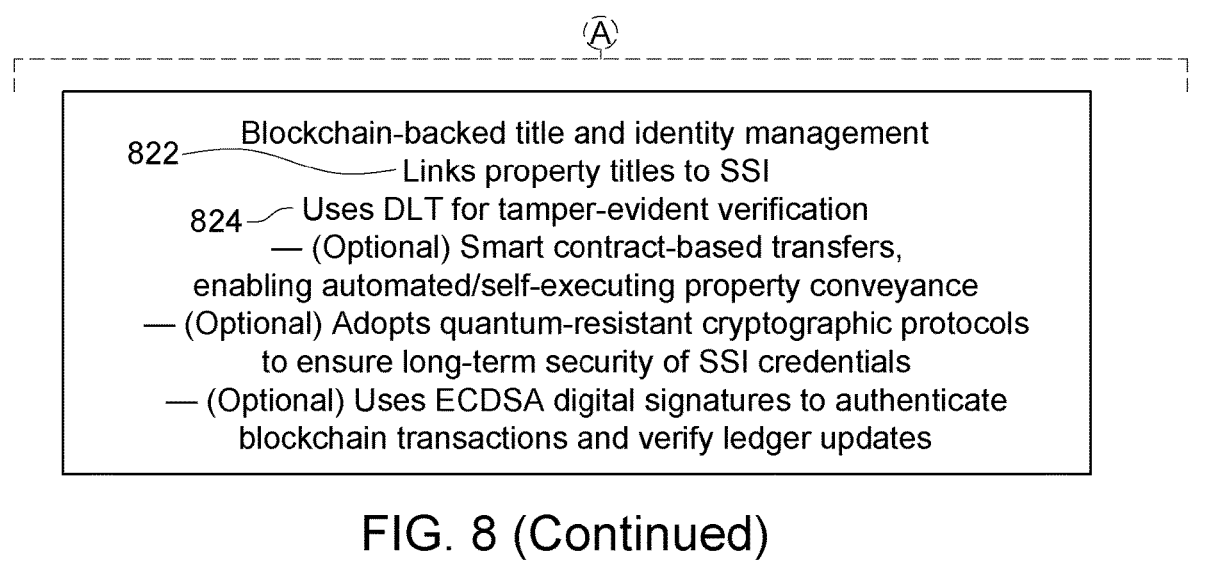

822 Blockchain-backed title and identity management
Links property titles to SSI
824 Uses DLT for tamper-evident verification
— (Optional) Smart contract-based transfers, enabling automated/self-executing property conveyance
— (Optional) Adopts quantum-resistant cryptographic protocols to ensure long-term security of SSI credentials
— (Optional) Uses ECDSA digital signatures to authenticate blockchain transactions and verify ledger updates

FIG. 8 (Continued)

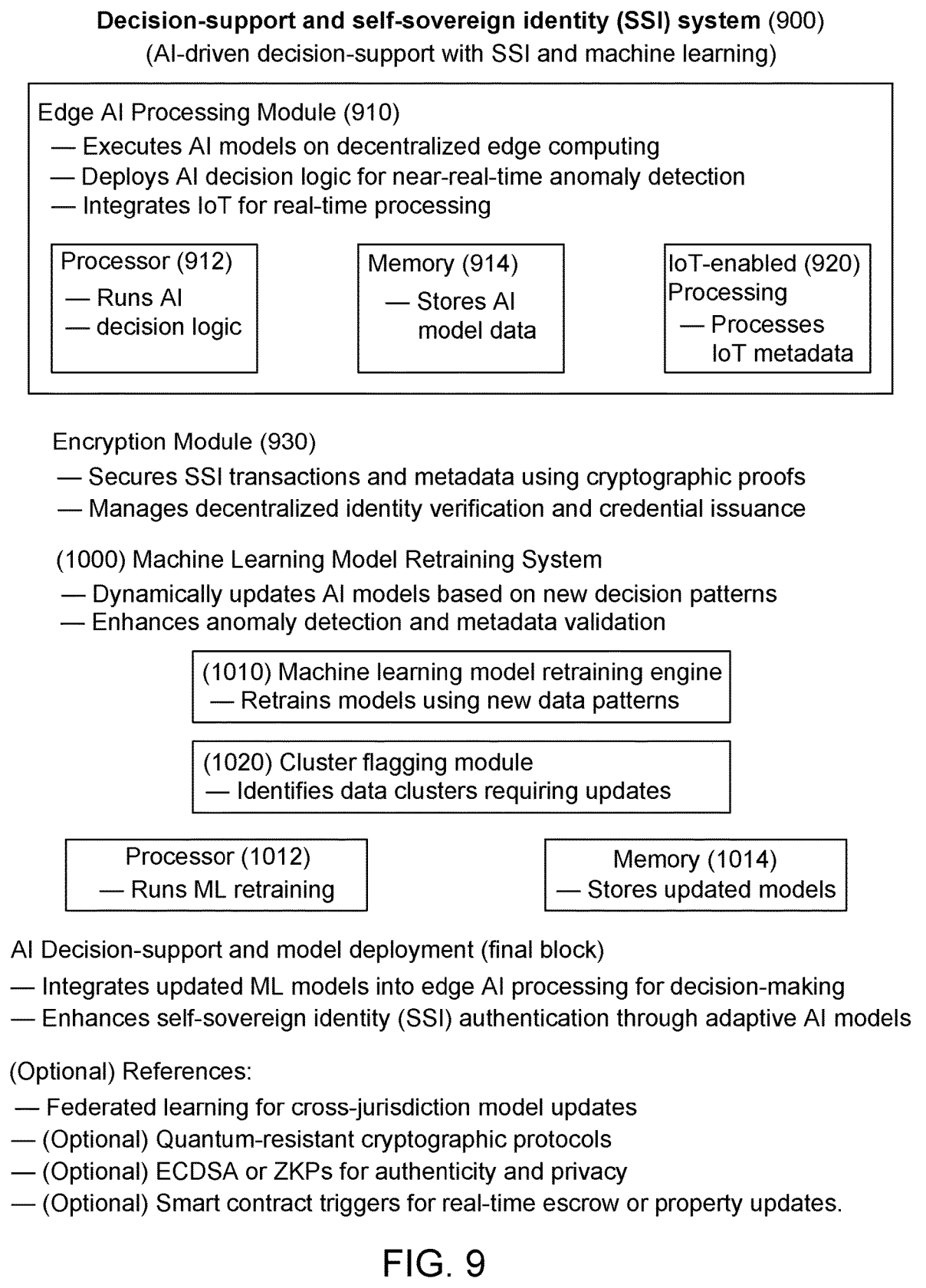

Decision-support and self-sovereign identity (SSI) system (900)
(AI-driven decision-support with SSI and machine learning)

Edge AI Processing Module (910)
— Executes AI models on decentralized edge computing
— Deploys AI decision logic for near-real-time anomaly detection
— Integrates IoT for real-time processing Processor (912)
— Runs AI
— decision logic Memory (914)
— Stores AI model data IoT-enabled (920) Processing
— Processes IoT metadata Encryption Module (930)
— Secures SSI transactions and metadata using cryptographic proofs
— Manages decentralized identity verification and credential issuance (1000) Machine Learning Model Retraining System
— Dynamically updates AI models based on new decision patterns
— Enhances anomaly detection and metadata validation (1010) Machine learning model retraining engine
— Retrains models using new data patterns (1020) Cluster flagging module
— Identifies data clusters requiring updates Processor (1012)
— Runs ML retraining Memory (1014)
— Stores updated models AI Decision-support and model deployment (final block)
— Integrates updated ML models into edge AI processing for decision-making
— Enhances self-sovereign identity (SSI) authentication through adaptive AI models (Optional) References:
— Federated learning for cross-jurisdiction model updates
— (Optional) Quantum-resistant cryptographic protocols
— (Optional) ECDSA or ZKPs for authenticity and privacy
— (Optional) Smart contract triggers for real-time escrow or property updates.

FIG. 9

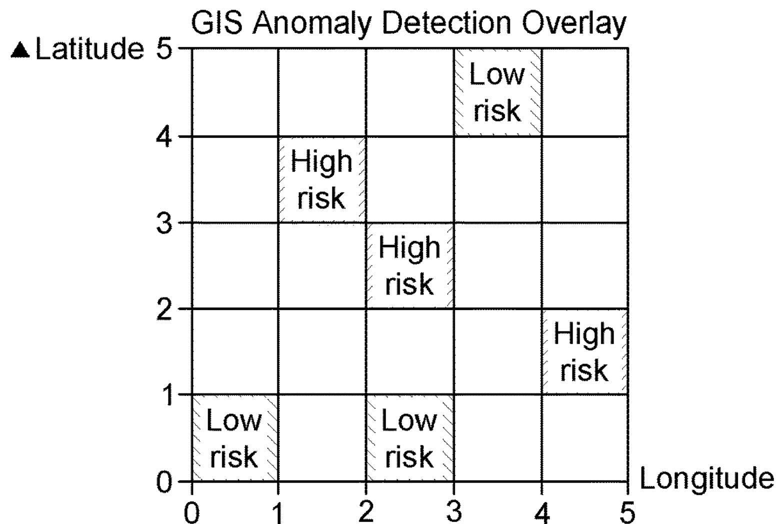

An example U.S. map showing geospatial clusters or heatmaps (some areas flagged as "High Risk" or "Low Risk"):

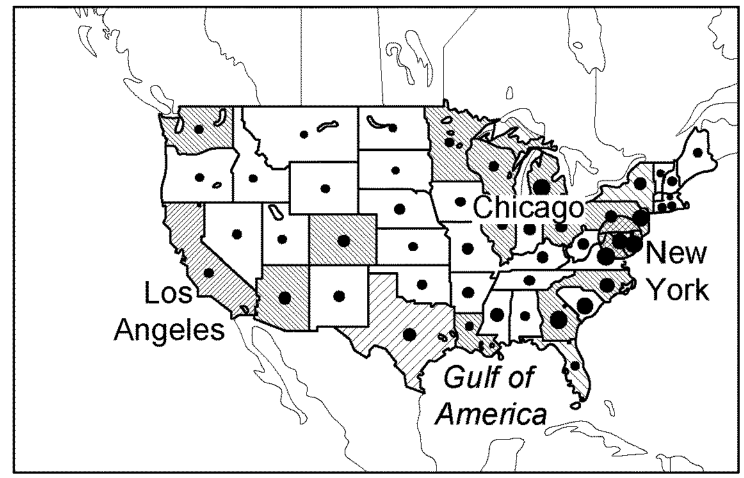

Example government-issued property metadata fields, e.g., building/zoning permit applications, subsequent permits or logs:

- Assessor Parcel (AP) identifier values
- Contractor's legal name
- Lot number
- Owner name
- Parcel Identification (PI) values
- Application/Permit date(s)
- Real property situs address
- Subdivision
- Tax Map Reference (TMR) values

NOTES 1. (100A) Stakeholder Interface
   - Indicates that real users (e.g., prospective homebuyers, homeowners, developers, lenders) may initiate or track requests.
2. (110A) Intelligent Public Record Request Generator
   - Illustrates the use of NLP and AI to create jurisdiction-specific requests.
   - May sign the request using cryptographic methods, reflecting integration with blockchain/cryptography features.
3. (120A) Request Tracking and Deadline Module
   - Automates reminders for the relevant authority.
   - Logs each request in a blockchain ledger through cryptographic anchoring and scheduling logic supporting traceability and verifiable request handling.
4. (130A) Government Authority / Public Office
   - Collects official metadata (e.g., building/zoning permit application(s), as well as from subsequent permits or logs).
   - May respond with cryptographically signed or encrypted data.
   - Returns information to a specific request ID endpoint, preserving traceability.
5. (140A) AI/ML Parsing and Verification Module
   - Uses NLP or GNN-based checks to interpret and validate returned records.
   - Performs cryptographic validation (e.g., ECDSA, ZKPs) to help ensure data integrity.
6. (150A) Real-Time Validation and Publication Interface
   - Publishes validated records for stakeholder review.
   - Displays anomalies (cross-ref to FIG. 10's steps).
   - Allows stakeholder feedback/further requests.

In some embodiments, the system may automatically submit jurisdiction-specific public record requests for government-issued documents—such as building/zoning permit applications, subsequent permits or logs, and historical property ownership records referencing the first owner of record (e.g., a landowner such as a developer or homebuilder). It then extracts structured metadata fields, including TMR values, PI values, or AP identifier values, using AI-driven parsing.

A graph neural network (GNN) can cross-reference these internal government records with last-owner deeds, liens, or other instruments in public registries, verifying authenticity through a cryptographic infrastructure that leverages blockchain-based hashing and zero-knowledge proofs (ZKPs). A blockchain audit trail may tamper-evidently log each transaction, ensuring transparency and traceability.

FIG. 10A (Continued)

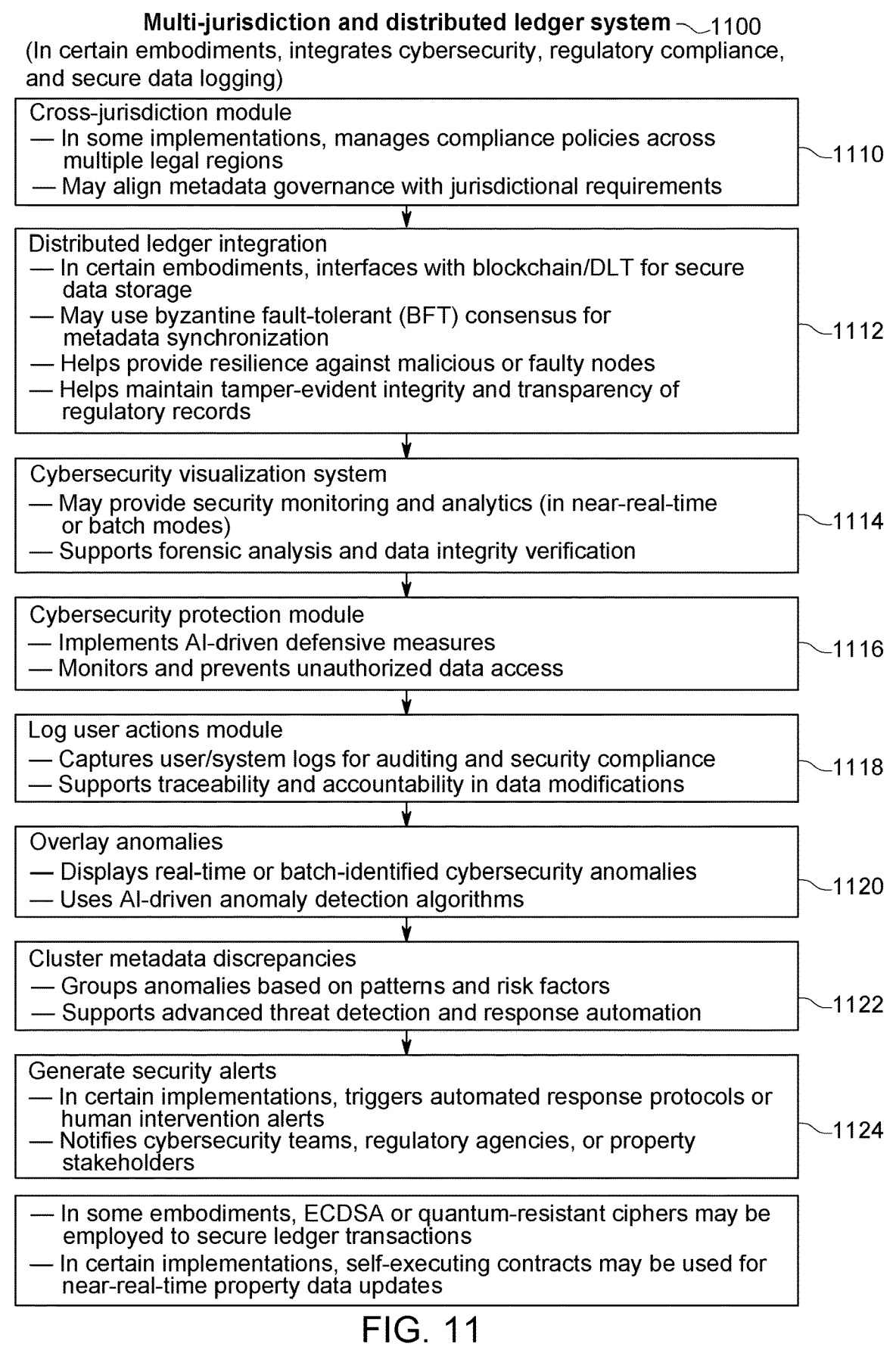

Multi-jurisdiction and distributed ledger system 1100
(In certain embodiments, integrates cybersecurity, regulatory compliance, and secure data logging)

Cross-jurisdiction module 1110
— In some implementations, manages compliance policies across multiple legal regions
— May align metadata governance with jurisdictional requirements Distributed ledger integration 1112
— In certain embodiments, interfaces with blockchain/DLT for secure data storage
— May use byzantine fault-tolerant (BFT) consensus for metadata synchronization
— Helps provide resilience against malicious or faulty nodes
— Helps maintain tamper-evident integrity and transparency of regulatory records Cybersecurity visualization system 1114
— May provide security monitoring and analytics (in near-real-time or batch modes)
— Supports forensic analysis and data integrity verification Cybersecurity protection module 1116
— Implements AI-driven defensive measures
— Monitors and prevents unauthorized data access Log user actions module 1118
— Captures user/system logs for auditing and security compliance
— Supports traceability and accountability in data modifications Overlay anomalies 1120
— Displays real-time or batch-identified cybersecurity anomalies
— Uses AI-driven anomaly detection algorithms Cluster metadata discrepancies 1122
— Groups anomalies based on patterns and risk factors
— Supports advanced threat detection and response automation Generate security alerts 1124
— In certain implementations, triggers automated response protocols or human intervention alerts
— Notifies cybersecurity teams, regulatory agencies, or property stakeholders — In some embodiments, ECDSA or quantum-resistant ciphers may be employed to secure ledger transactions
— In certain implementations, self-executing contracts may be used for near-real-time property data updates

FIG. 11

Figure 12:
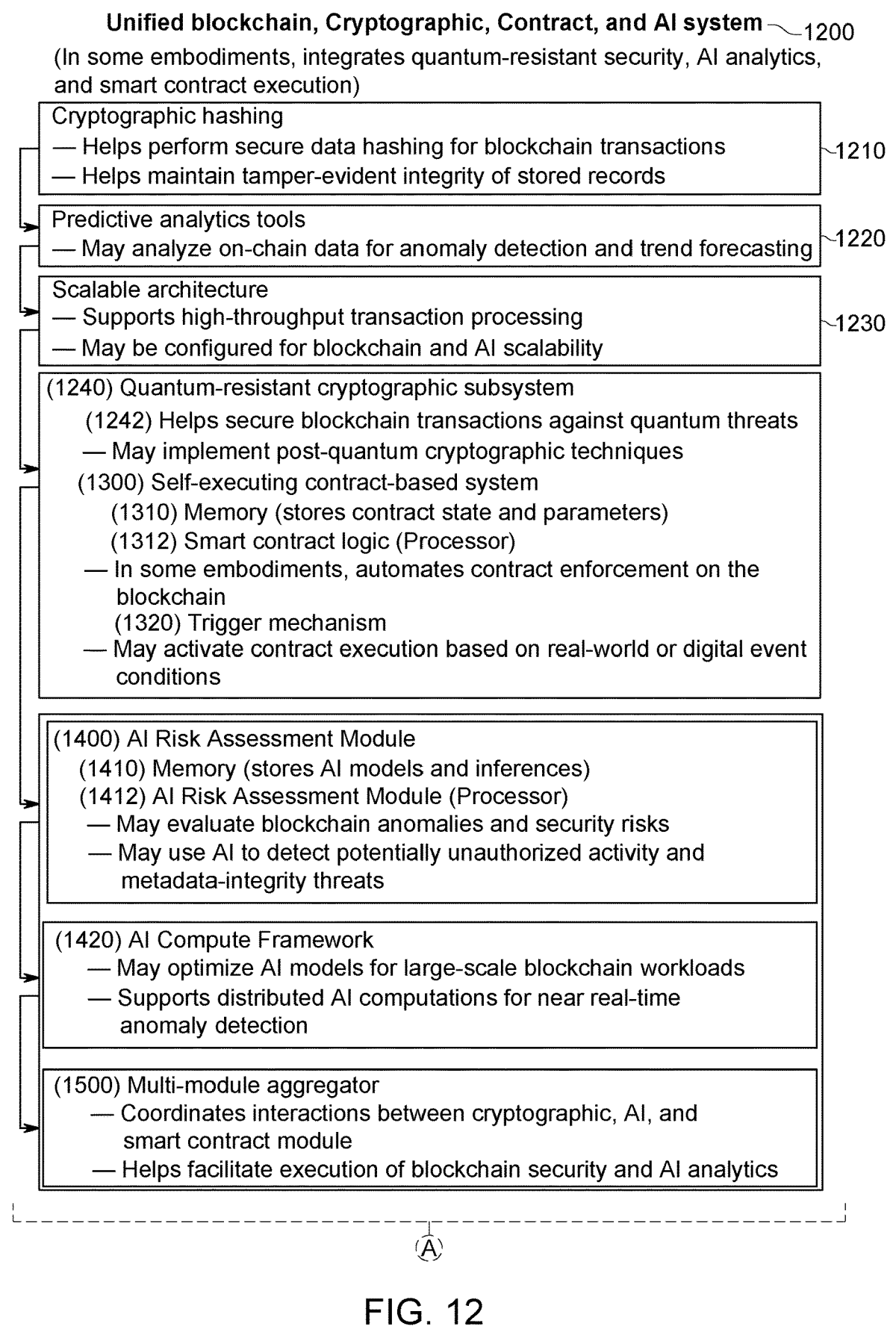

Unified blockchain, Cryptographic, Contract, and AI system 1200

(In some embodiments, integrates quantum-resistant security, AI analytics, and smart contract execution)

Cryptographic hashing 1210
— Helps perform secure data hashing for blockchain transactions
— Helps maintain tamper-evident integrity of stored records Predictive analytics tools 1220
— May analyze on-chain data for anomaly detection and trend forecasting Scalable architecture 1230
— Supports high-throughput transaction processing
— May be configured for blockchain and AI scalability (1240) Quantum-resistant cryptographic subsystem
(1242) Helps secure blockchain transactions against quantum threats
— May implement post-quantum cryptographic techniques
(1300) Self-executing contract-based system
(1310) Memory (stores contract state and parameters)
(1312) Smart contract logic (Processor)
— In some embodiments, automates contract enforcement on the blockchain
(1320) Trigger mechanism
— May activate contract execution based on real-world or digital event conditions (1400) AI Risk Assessment Module
(1410) Memory (stores AI models and inferences)
(1412) AI Risk Assessment Module (Processor)
— May evaluate blockchain anomalies and security risks
— May use AI to detect potentially unauthorized activity and metadata-integrity threats (1420) AI Compute Framework
— May optimize AI models for large-scale blockchain workloads
— Supports distributed AI computations for near real-time anomaly detection (1500) Multi-module aggregator
— Coordinates interactions between cryptographic, AI, and smart contract module
— Helps facilitate execution of blockchain security and AI analytics

FIG. 12 (Continued)
A
(A) OCR Module: may extract text from scanned deeds/liens
(B) NLP Engine: identifies TMR values, PI values, or AP identifier values
(C) Computer Vision: may detect boundary lines, textual overlays
(D) Multi-modal aggregator: merges extracted fields into structured records
(E) Blockchain aggregator: logs final structured metadata for tamper-evident ledger storage
— (Optional) Federated learning for multi-jurisdiction doc scanning
— (Optional) Geospatial or image recognition for boundary detection
— (Optional) ECDSA or quantum-resistant ciphers may be employed to secure ledger transactions
— (Optional) Self-executing contracts may handle near-real-time
— property data updates

COMPUTER-IMPLEMENTED SYSTEMS AND METHODS FOR REAL ESTATE METADATA ACQUISITION, CRYPTOGRAPHIC VERIFICATION, AND SMART-CONTRACT RECONCILIATION USING BLOCKCHAIN AND MACHINE LEARNING

CROSS-REFERENCE TO RELATED APPLICATIONS

[Not Applicable]

STATEMENT REGARDING FEDERALLY SPONSORED RESEARCH OR DEVELOPMENT

[Not Applicable]

STATEMENT REGARDING PRIOR DISCLOSURES

No public disclosures of the subject matter claimed in this application have occurred prior to the filing date.

DESCRIPTION OF RELATED ART

Challenges in Local Government Record Integrity, Unauthorized-Activity Detection, and Regulatory Compliance in Land Use and Property Governance Disclaimer The descriptions, examples, and references provided in this disclosure illustrate various principles, functionalities, and potential implementations of the subject matter described herein. They are provided for illustrative purposes and are not intended to limit the scope of the claimed subject matter, which is defined by the appended claims. The applicant seeks protection for subject matter relating to real estate metadata governance, cryptographic tamper-evident validation, and AI-driven anomaly detection in accordance with 35 U.S.C. §§ 101, 102, 103, and 112, and is not confined to any particular implementation, architecture, or configuration.

The applicant maintains constructive possession of the claimed subject matter through a detailed disclosure of multiple embodiments, alternatives, and equivalents that achieve comparable outcomes. In some implementations, the subject matter described herein provides technological advancements extending beyond routine automation or previously established business processes. For example, various embodiments may leverage multi-modal AI techniques—including optical character recognition (OCR), natural language processing (NLP), and computer vision (CV)—to support intelligent extraction, reconciliation, and anomaly detection across real estate documents. These functionalities can be further enhanced by machine learning architectures such as graph neural networks (GNNs) for schema matching, reinforcement learning for adaptive anomaly detection, and self-organizing maps (SOMs) for unsupervised clustering, thereby enabling contextualization and mitigation of inconsistencies within property metadata.

To bolster security and computational integrity, the described subject matter may incorporate post-quantum cryptographic protocols, including zero-knowledge proofs (ZKPs) for confidential validation and lattice-based cryptographic mechanisms for secure data exchange and quantum-resistant identity verification. These mechanisms support a privacy-centric and tamper-evident infrastructure for real estate metadata processing. In some configurations, additional data integrity protections are provided through distributed ledger technologies, including canonicalized cryptographic digest generation, blockchain hashing, directed acyclic graphs (DAGs), and verifiable timestamping protocols, enabling transparent and auditable data governance beyond traditional relational database systems.

The terminology used throughout this disclosure is interpreted broadly, as understood by those skilled in the art. References to specific systems, methods, or processing flows are non-limiting and do not preclude alternative or functionally equivalent designs. Terms such as Tax Map Reference (TMR) values, Parcel Identification (PI) values, and Assessor Parcel (AP) identifier values are collectively referenced herein as "TMR values, PI values, or AP identifier values," and are used illustratively to support comprehension of applicable metadata structures. These references serve to contextualize the technological framework and are not intended to limit the applicability or jurisdictional reach of the disclosed subject matter.

The following sections summarize selected (1) Federal Government Systems, (2) Local Government Systems, (3) Patented Systems, and (4) Non-Patented Systems. These discussions are provided solely to frame the relevant technological landscape and are not intended as admissions that any referenced system constitutes prior art under 35 U.S.C. §§ 102 or 103 unless explicitly stated. Any citation to previously published patents, applications, or other systems is included to highlight the technological context in which the described subject matter operates. Such references are not limiting, nor do they disclaim or limit any subject matter from the scope of the present claims.

The disclosed subject matter is not limited to real estate transaction facilitation or process automation; it also addresses core computational challenges through the implementation of artificial intelligence, cryptographic digest generation, ZKP-based verification, ECDSA-secured ledger operations, and distributed trust frameworks. These components enhance data integrity, operational transparency, and system resilience. Accordingly, the subject matter is appropriately characterized as a technological solution within Technology Center 2100 (Artificial Intelligence and Machine Learning) and Technology Center 2400 (Cryptography and Distributed Systems), and is not confined to business method categorizations under Technology Center 3600.

The appended claims—whether in original form or as amended during prosecution—define the scope of the protected subject matter. Any fallback positions, refinements, or clarifications introduced during examination are understood to remain within the spirit and scope of this disclosure and do not limit the applicant's constructive possession of the claimed subject matter. Descriptions within the DETAILED DESCRIPTION and associated FIGS. 1-12 support the disclosed implementations and technical variations.

The subject matter described herein is patent-eligible under 35 U.S.C. § 101 for providing a specific, concrete, and technological implementation. It is novel under 35 U.S.C. § 102 for introducing advancements not previously disclosed, and non-obvious under 35 U.S.C. § 103 by integrating AI, cryptographic digest generation, zero-knowledge-proof verification, ECDSA-secured ledger operations, distributed-ledger processing, and optional post-quantum, decentralized identity, or smart-contract mechanisms into a cohesive metadata governance system. Illustrative features, including federated learning and geospatial overlays, represent configurations that do not restrict the scope of equivalent techniques. Such features may be modified, extended, or reconfigured while remaining within the scope of the claimed subject matter.

The principles and architectures described herein apply throughout this disclosure. Variants and technical improvements—whether related to anomaly detection, canonicalized cryptographic digest generation, ZKP-based verification, ECDSA-secured commit operations, ledger-based record-keeping, or intelligent reconciliation workflows—are to be understood as encompassed within the claimed subject matter. Such features may be modified, extended, or reconfigured while remaining within the broader scope of the subject matter described and claimed.

1. Federal Government Systems—Limitations in US Treasury and Internal Revenue Service (IRS) Systems of Records for Property Transactions and Debt Management Overview of IRS Systems and Property Record Management The U.S. Department of the Treasury and Internal Revenue Service (IRS) administer tax and financial reporting procedures related to real estate transactions and secured debt through forms such as 1099-A (Acquisition or Abandonment of Secured Property), 1099-C (Cancellation of Debt), and 1098 (Mortgage Interest Statement). While these forms can assist with documenting specific aspects of financial obligations and asset disposition, they generally do not incorporate automated validation mechanisms for reconciling metadata fields—such as TMR values, PI values, or AP identifier values—with recognized government data before submission. References to IRS workflows are provided to supply contextual information and are not intended as admissions under 35 U.S.C. §§ 102 or 103.

Form 1099-A and Metadata Gaps

Form 1099-A is used to report the acquisition or abandonment of secured property, often in the context of foreclosure or repossession. Although the form captures basic descriptive and financial information, it lacks automatic cross-verification with jurisdictional property registries. In such circumstances, inconsistencies—such as mismatches involving AP identifier values or TMR values—may persist undetected, introducing ambiguity in property disposition workflows. Absent AI-supported metadata validation or reconciliation logic, discrepancies in ownership lineage and title chain may go unflagged, impeding timely remediation.

Form 1099-C and Metadata Alignment Concerns

Form 1099-C, which addresses debt cancellation events, may encounter similar issues regarding metadata alignment. If TMR values, PI values, or AP identifier values are absent or non-uniformly formatted, there may be limited assurance that cancelled encumbrances correspond to the correct property records. This misalignment can lead to ambiguity in chain-of-title resolution. These references highlight operational challenges where the anomaly detection and verification approaches described in this disclosure may contribute improvements. No reference herein concedes that any IRS form or process constitutes prior art.

Form 1098 and Reporting Discrepancies

Form 1098, which reports mortgage interest payments, supports tax deductions and compliance but does not validate metadata fields such as TMR values, PI values, or AP identifier values. When multiple parcels or subdivided lots are involved, the absence of field-level validation can increase the risk of data misalignment. These conditions illustrate a context in which automated reconciliation mechanisms—such as those disclosed herein—may offer technical advantages and are not intended to limit the scope of the claims.

Fragmentation and Interoperability in Local Property Record Systems

Siloed Data and Limited Integration

Property databases maintained at the county or municipal level often operate independently, with jurisdiction-specific protocols for encoding and maintaining TMR values, PI values, and AP identifier values. These decentralized systems typically lack built-in interoperability with federal databases, such as the IRS Automated Lien System (ALS), limiting the ability to identify and reconcile discrepancies in property identifier values. This setting provides context for the subject matter described herein, including modules such as Public Record Request Module 100, which are capable of supporting jurisdiction-spanning compliance and data alignment.

Automation Deficiencies in Validation Workflows

Where no automated validation mechanisms cross-reference building and zoning records, tax assessments, or deed history, unauthorized parcel modifications or identifier duplications may persist. Recitations of TMR values or AP identifier values in this section serve to illustrate use cases and are not limiting. These examples underscore the relevance of AI-driven anomaly detection and secure logging mechanisms that may address such issues, and do not imply that prior approaches implemented similar functionality.

Metadata Integrity, Compliance, and Unauthorized-Activity Detection Considerations IRS Modernization and Metadata Vulnerabilities While modernization initiatives like the ALS-Entity Modernization Program aim to improve internal efficiencies, they generally do not incorporate AI-enabled cross-verification of TMR values, PI values, or AP identifier values with jurisdictional records. Consequently, such systems may remain vulnerable to inaccuracies or manipulations. These observations define a technological backdrop in which the cryptographic and AI-based techniques described herein may be deployed. No aspect of the cited IRS initiatives is admitted as prior art.

Compliance Oversight Limitations

In various jurisdictions, compliance monitoring—such as lien verification or tax record validation—relies on manual workflows. In the absence of real-time anomaly detection and blockchain-based tracking, stakeholders (including lenders, title professionals, and local officials) may experience delays or omissions that affect data reliability. These constraints are referenced to distinguish the present system's features, such as multi-jurisdiction ledger integration and schema-matching AI engines, and are not intended to suggest that these capabilities are known in the art.

Potential for Enhancement Through Blockchain and AI Validation

Modular Metadata Validation Frameworks

The approach described herein may combine internal records acquisition modules (for government-sourced data) with public records acquisition modules (for publicly recorded instruments), creating an interoperable framework for reconciling metadata comprising TMR values, PI values, or AP identifier values. To the extent these elements differ from existing systems, their description does not constitute an acknowledgment of prior art status but serves to illustrate technical capabilities of the present subject matter.

Blockchain-Enabled Audit Trails and Contract Logic

Distributed ledger technologies may be employed to secure property metadata through canonicalized cryptographic digest generation, cryptographic hashing, and blockchain ledger entries and to facilitate self-executing workflows, such as automated lien release verification. These features are described herein to illustrate how the disclosed subject matter can address known data integrity challenges using blockchain and AI analytics. No limitation is intended or inferred by referencing these tools, and their inclusion does not prevent or limit other equivalent implementations.

Operational Advantages and Stakeholder Confidence

Workflow Efficiency and Data Reliability

By enabling interoperability between local property systems and federal documentation processes, components such as the Public Record Request Module 100 may assist in aligning verified metadata fields with lien or foreclosure procedures. This alignment may improve confidence in real estate transactions for a broad range of stakeholders, and does not suggest that existing systems achieve such integration.

Enhancing Governance Through Technological Synergy

Integration of automated validation, distributed ledgers, and anomaly detection modules may improve transparency and accountability in property data governance. References to these functions are intended to demonstrate the technological context addressed by the present disclosure and do not acknowledge that such configurations were previously known or utilized.

In summary, while existing federal and local systems exhibit operational gaps such as limitations in metadata validation and oversight-their discussion herein is non-admissive and non-limiting. The described subject matter provides a multi-layered: approach combining AI-enabled anomaly detection, canonicalized cryptographic digest generation, ZKP-based verification, ECDSA-secured ledger operations, tamper-evident blockchain recordkeeping, and, in some configurations, smart contract functionality. These elements fall within the claimed subject matter, which may, among other features, include the Public Record Request Module 100, and are presented to support enablement, possession, and compliance with statutory criteria under 35 U.S.C. §§ 101, 102, 103, and 112.

2. Federal Government Systems—Government National Mortgage Association (Ginnie Mae)

Overview of Ginnie Mae's Role in Housing Finance

The Government National Mortgage Association (Ginnie Mae), a division of the U.S. Department of Housing and Urban Development (HUD), plays a substantial role in enhancing housing market liquidity by guaranteeing the timely payment of principal and interest on mortgage-backed securities (MBS). These securities often include loans insured or guaranteed under federal programs administered by the Federal Housing Administration (FHA), Department of Veterans Affairs (VA), or U.S. Department of Agriculture (USDA). While Ginnie Mae facilitates securitization efficiency, its operational framework may interface with localized property recording systems that may not regularly employ coordinated or automated procedures for validating or reconciling metadata such as TMR values, PI values, or AP identifier values. References to such systems are included for technical context and do not acknowledge any material as prior art under 35 U.S.C. §§ 102 or 103.

Metadata Handling in Local Property Offices

Jurisdictional property record offices often record TMR values, PI values, or AP identifier values in the absence of systematic validation against recognized reference data sources. This may contribute to the persistence of incomplete or non-uniformly formatted metadata, complicating downstream workflows such as mortgage servicing, lien release, and title transfer. The implementations described herein—including a Public Record Request Module (100)—may provide functionality to enable reconciliation and anomaly detection. Any mention of Ginnie Mae infrastructure or local recording practices is illustrative and does not reflect an admission regarding the scope or novelty of any referenced method.

Jurisdictional Variability and Data Format Disparities

State and local authorities frequently adopt disparate protocols for managing property data, resulting in variation in how TMR values, PI values, or AP identifier values are formatted or applied. To the extent that prior systems do not describe multi-modal AI anomaly detection or real-time metadata reconciliation across jurisdictions, the subject matter herein addresses these gaps through technical implementations that may include cryptographic verification protocols. These discussions do not limit the scope of the claimed modules but serve to highlight potential areas of advancement.

Considerations for Tamper-Evident Recordkeeping

Accurate and verifiable property data supports real estate integrity, particularly in verifying ownership chains or identifying unauthorized changes to parcel boundaries. Existing recordkeeping practices often remain static and may not incorporate cryptographic auditing or AI-enabled anomaly analysis. In some embodiments, the subject matter described herein may leverage canonicalized cryptographic digest generation, cryptographic hashing, or ZKP-based verification to facilitate verification of TMR values, PI values, or AP identifier values. The inclusion of these discussions is intended to contextualize the technology landscape and not to disclaim any subject matter.

AI-Driven Risk Scoring and Geospatial Visualization

Unauthorized-activity detection and metadata validation may benefit from predictive analytics and visual overlays that highlight irregularities such as disputed boundaries or unmatched parcel data. In selected implementations, the described system may calculate risk scores for flagged entries, offering stakeholders—including lenders, servicers, and Ginnie Mae—tools for addressing anomalies in advance of record propagation. These contextual references are not admissions of prior art but are included to outline the environment in which the described techniques may operate.

Enhancing Compliance and Streamlining Workflows

Automated workflows capable of validating fields containing TMR values, PI values, or AP identifier values in near-real time may support jurisdictional reporting timelines and audit preparation. Tamper-evident blockchain logging tools, including canonicalized cryptographic digest entries where implemented, may improve oversight and support regulatory alignment. By citing compliance constraints in existing record systems, this disclosure aims to demonstrate how the described solution—including AI anomaly detection and jurisdiction-spanning metadata alignment—may enhance operational outcomes. These statements do not limit or narrow the claim scope.

Reinforcing Ginnie Mae Securitization Infrastructure

Although Ginnie Mae contributes to expanded housing access, the data frameworks it interfaces with—largely administered at the local or state level—may not incorporate uniform mechanisms for metadata validation or anomaly detection. In various embodiments, the subject matter described herein may employ distributed ledger technologies and reconciliation models that assess alignment of TMR values, PI values, or AP identifier values across sources on an ongoing basis and record corresponding validation results in tamper-evident ledger entries. References to Ginnie Mae's current framework are not admissions of existing limitations or controlling prior art but provide context for how the described systems may enhance transparency, accuracy, and trust.

The foregoing paragraphs present technical observations relevant to metadata workflows supporting federal securitization systems and are not intended to concede novelty or non-obviousness of any existing solution. They illustrate how the subject matter described herein-including a Public Record Request Module (100)—may facilitate real-time reconciliation, AI-enhanced metadata governance, canonicalized cryptographic digest generation, ZKP-based verification, ECDSA-secured ledger operations, and tamper-evident blockchain recordkeeping. These capabilities support enablement and written description under 35 U.S.C. § 112 and reflect compliance with eligibility (§ 101), novelty (§ 102), and non-obviousness (§ 103) criteria, as aligned with the disclosure and illustrated in FIGS. 1-12.

3. Federal Government Systems—Federal Home Loan Mortgage Corporation (Freddie Mac)

Role of Freddie Mac in Housing Finance and Securitization

The Federal Home Loan Mortgage Corporation (Freddie Mac), established through congressional charter, supports liquidity in the housing finance market by purchasing mortgages from approved lenders and packaging them into mortgage-backed securities (MBS). While these processes enhance capital flow and investor access, Freddie Mac's reliance on local property data systems—which may vary significantly in structure and accuracy—can introduce metadata inconsistencies related to TMR values, PI values, or AP identifier values. References to Freddie Mac's procedures are included solely to frame the operational context and do not constitute admissions under 35 U.S.C. §§ 102 or 103.

Metadata Challenges in Pre-Securitization Workflows

Jurisdictional property record offices may not uniformly validate or harmonize TMR values, PI values, and AP identifier values before properties are aggregated into MBS pools. Consequently, metadata irregularities—such as outdated parcel references, non-uniform boundary annotations, or omitted lien data—may persist through securitization stages. Although earlier methods may involve rudimentary data checks, they generally lack multi-modal AI functionality or blockchain-supported cryptographic assurance using tamper-evident ledger entries. The mention of incomplete prior mechanisms is illustrative and not limiting; it contextualizes how the disclosed systems may function within or alongside existing infrastructure.

Proactive AI Reconciliation in Securitization Pipelines

Freddie Mac's operational model depends on accurate and timely access to property-related data. Current industry approaches often focus on error identification during post-closing reviews or foreclosure events. Embodiments described herein may support automated data acquisition and cross-verification using AI-enabled anomaly detection techniques—particularly for reconciliation of TMR values, PI values, or AP identifier values. While some legacy systems may perform batch audits, they typically do not implement dynamic ledger updating or predictive AI scoring. These references serve to delineate the technological field and do not disclaim any subject matter.

Blockchain-Enabled Validation and Tamper Evidencing

Freddie Mac's processes do not uniformly apply distributed ledger protocols for ensuring the integrity of property identifier values or title encumbrances. Where existing systems allow static, unverified data flow, the described approach may integrate canonicalized cryptographic digest generation and blockchain ledger entries to enable auditability and mitigate unauthorized alterations. Such enhancements provide cryptographic assurance and improve data fidelity throughout the mortgage lifecycle. References to previously used workflows are not included as admissions of controlling prior art.

Cross-Jurisdictional Compliance Automation

Because Freddie Mac sources loans from a wide array of jurisdictions, its systems may be configured to address diverse regulatory frameworks and metadata protocols. Existing platforms may not conduct automated compliance validation or apply uniform metadata quality controls. Configurations described herein may support zero-knowledge proof (ZKP) verifications, canonicalized cryptographic digests, ECDSA-secured ledger operations, geospatial overlays, and smart contract triggers that assist in harmonizing disparate datasets. These examples are non-limiting and serve to illustrate the broader functionality covered by the claimed subject matter.

Improved Anomaly Detection and Risk Modeling

Irregularities in property identifiers—such as duplicate entries, unauthorized boundary shifts, or incomplete lien releases—may impair Freddie Mac's ability to model securitization risk and undermine investor trust. The described system may apply AI-driven pattern recognition to flag such anomalies before asset pooling or transfer. In doing so, it provides a proactive mechanism for improving mortgage data accuracy and transparency. These references are included to demonstrate the technical challenge addressed, not to narrow or limit the claimed subject matter's scope.

References to Freddie Mac workflows or data management practices are presented for technical context and are not offered as prior art under 35 U.S.C. §§ 102 or 103. The subject matter described herein—including multi-modal AI analytics, blockchain-based validation, canonicalized cryptographic digest generation, ZKP-based verification, ECDSA-secured ledger operations, and jurisdiction-aware compliance tracking—represents a technical implementation capable of enhancing property data governance. FIGS. 1-12 collectively demonstrate constructive possession and enablement of the disclosed subject matter. Features such as the Public Record Request Module (100) exemplify, but do not limit, the technical components described. The disclosed subject matter addresses operational shortcomings in legacy workflows and supports patent eligibility under § 101, novelty under § 102, non-obviousness under § 103, and descriptive adequacy under § 112.

4. Federal Government Systems—Federal National Mortgage Association (Fannie Mae)

Overview of Fannie Mae's Role in the Housing Market

The Federal National Mortgage Association (Fannie Mae), a government-sponsored enterprise (GSE) established in 1938, facilitates housing market liquidity and affordability by purchasing mortgage loans, aggregating them into mortgage-backed securities (MBS), and offering these securities to investors. Although this model broadens credit access, its effectiveness may be affected by reliance on decentralized property recording systems, which often lack integrated, automated mechanisms for metadata validation, reconciliation, or unauthorized-activity detection. References to Fannie Mae's operational processes are offered solely to establish contextual background and are not intended to imply recognition of any system as prior art under 35 U.S.C. §§ 102 or 103.

Decentralized Recordkeeping and Metadata Alignment Issues

Fannie Mae depends on local and state-level government offices to maintain core documentation such as deeds, zoning records, and lien filings. These offices may record TMR values, PI values, or AP identifier values but frequently lack uniform cross-referencing practices across official databases. Non-uniformly formatted or incomplete metadata may limit Fannie Mae's capacity to maintain clear chain-of-title and lien priority information. Although basic recordkeeping approaches have been described in prior sources, such approaches typically do not implement the multi-modal AI and blockchain-enabled methods described herein, which may include the use of a Public Record Request Module (100).

Jurisdictional Disparities and Land Record Fragmentation

Varying protocols among local land records systems contribute to inconsistencies in the assignment and formatting of metadata comprising TMR values, PI values, or AP identifier values. This variability may result in challenges across securitization, property transfers, and ownership verification processes. In some situations, conflicting mortgage assignment records or lien documentation may lead to transaction delays or legal uncertainties. These references are not offered to restrict the scope of the claimed subject matter but to illustrate prevailing conditions that the disclosed system may address through reconciliation tools and real-time data validation features.

Foreclosure Workflow Constraints and Automation Gaps

Foreclosure processes under Fannie Mae's oversight can involve numerous legal filings and procedural steps, such as trustee appointments and deed transfers. Local record systems, when reliant on manual input or static formats, may introduce inefficiencies in tracking and verifying such documents. The system described herein may support automated workflows that cross-reference and validate metadata comprising TMR values, PI values, or AP identifier values associated with these events, and is not intended to restrict coverage under §§ 101, 102, 103, or 112.

Metadata Tampering and Systemic Vulnerabilities

Unauthorized edits to parcel metadata—including falsified boundaries or tampered identifiers—may introduce risks into MBS structures and impair investor confidence. Traditional record systems often lack built-in mechanisms to detect such changes in advance. In some configurations, the disclosed system may utilize canonicalized cryptographic digest generation, ZKP-based verification, ECDSA-secured ledger operations, and anomaly detection models to help mitigate these risks. References to gaps in current practices are illustrative of known limitations and do not concede or disclaim the novelty or coverage of the present disclosure.

Distributed Ledger Validation and Traceability Enhancements

The subject matter described herein may utilize blockchain-backed audit trails to secure metadata fields comprising TMR values, PI values, or AP identifier values. These canonicalized cryptographic digest records offer tamper-evident tracking capabilities that may support validation of property records with reduced administrative burden. In addition to enhancing transparency and verification, such distributed ledger approaches may integrate with broader features such as quantum-resistant encryption or cross-jurisdictional compliance frameworks. Mentions of these elements are not limiting and are intended to support technical description.

Internal Record Acquisition and Intelligent Reconciliation

A system configuration may include an internal record acquisition module—optionally including the Public Record Request Module (100)—that retrieves property records and applies intelligent data extraction techniques, such as OCR and NLP. In some implementations, predictive AI models may flag mismatched or anomalous entries, including inconsistencies in data comprising TMR values, PI values, or AP identifier values or indicators of unauthorized boundary changes. These references distinguish the present approach from less comprehensive or static record systems and are not intended as admissions regarding the status or scope of any prior art.

Auditability and Real-Time Compliance Monitoring

Blockchain-enabled recordkeeping may document validation and anomaly detection events as tamper-evident entries including, in some implementations, canonicalized cryptographic digests or ECDSA-secured ledger updates that support oversight by government-sponsored enterprises (GSEs), loan servicers, and jurisdictional authorities. These features may be used to enhance compliance posture and potentially reduce audit latency. The subject matter described herein maintains constructive possession of these functionalities, in alignment with the modules enumerated in the claims, and does not confine the disclosure to any single architecture or implementation.

Predictive Analytics with Geospatial Visualization

The system may integrate visual geospatial overlays and predictive anomaly scoring to identify metadata irregularities, including potential unauthorized-activity risks or mapping errors. These capabilities provide real-time insights that may enhance both federal and local data governance workflows. References to current manual or static processes are intended to contrast with these technical improvements and do not narrow claim scope.

Integrated Framework for Modernized Compliance and Transparency

The described system combines distributed ledger validation, canonicalized cryptographic digest generation, ZKP-based verification, ECDSA-secured ledger operations, predictive anomaly detection, and automated workflow coordination into a modular framework compatible with Fannie Mae's objectives. These capabilities may be implemented independently or in combination and are reflected across FIGS. 1-12. The described subject matter supports constructive possession and satisfies the statutory criteria for patent eligibility (§ 101), novelty (§ 102), non-obviousness (§ 103), and written description and enablement (§ 112).

5. Federal Government Systems—U.S. HUD Programs

Overview of HUD Programs and Property Record Challenges

The U.S. Department of Housing and Urban Development (HUD) administers various programs designed to expand access to affordable housing and support community development, including the Federal Housing Administration (FHA) loan program and Government National Mortgage Association (Ginnie Mae) mortgage-backed securities (MBS) platform. While these initiatives may increase homeownership opportunities, particularly among underserved populations, HUD frequently depends on decentralized state and local property offices that manage deeds, lien releases, mortgages, and zoning permits under diverse procedural frameworks. References to HUD's reliance on these systems are offered solely to provide technical context and are not intended as admissions under 35 U.S.C. §§ 102 or 103.

Historical Recordkeeping and Oversight Limitations

Various legacy challenges within HUD—such as administrative oversight concerns and record inconsistencies reported in the 1980s—highlight conditions in which limited metadata validation and audit control contributed to avoidable financial exposures. These historical references underscore the importance of implementing verifiable, secure, and structured property data workflows. They do not imply acknowledgment of any prior art or restrict the scope of the subject matter disclosed herein, which may include validation of metadata fields such as TMR values, PI values, or AP identifier values.

Variability in Local Metadata Practices

Local property offices operate within jurisdiction-specific frameworks and may not employ interoperable systems capable of cross-referencing building permits, zoning applications, approved permits or logs, and property ownership documentation against coordinated datasets. This lack of cross-validation may result in metadata inconsistencies affecting the traceability of property records. Although some existing tools may offer partial verification, they generally do not deploy integrated multi-modal AI or blockchain-based validation workflows using tamper-evident ledger entries. The present disclosure describes a system that may facilitate early-stage reconciliation and automation, distinguishing it from reactive or manually initiated processes.

Operational Fragmentation in Property Record Systems

The structural variation among local recording offices—particularly regarding the formats and workflows used for deeds, trustee appointments, lien filings, and foreclosure notices—can introduce process inefficiencies. These inefficiencies may be magnified under high-volume programs administered by HUD. The methods and systems described herein may be configured to reduce such burdens by reconciling metadata across jurisdictions. References to local processes serve to illustrate operational diversity and are not intended to reflect prior art status.

Foreclosure Processing Gaps and Automation Opportunities

HUD's foreclosure mitigation tools, including FHA Loss Mitigation Programs, may be impacted by manual or fragmented recordkeeping systems. By comparison, implementations of the subject matter described herein may offer automated compliance checks and real-time metadata validation, enhancing record fidelity and reducing documentation delays. Mentions of incomplete foreclosure processes are contextual and do not narrow or disclaim coverage of automated, AI-based, or cryptographically reinforced solutions.

Risks Posed by Metadata Manipulation

Tampering incidents involving falsified parcel identifiers, unauthorized boundary changes, or improper lien recordings can degrade metadata reliability and disrupt real estate transactions. Metadata fields such as TMR values, PI values, and AP identifier values serve as anchor points across regulatory, zoning, and tax systems. The present system may implement canonicalized cryptographic digest generation, blockchain hashing, and distributed ledger technologies to secure such data. These references provide contextual background and do not limit or define the scope of the disclosed subject matter.

Advanced Reconciliation and Predictive Anomaly Detection

In some embodiments, the system may include an internal records acquisition module—optionally configured to retrieve and validate jurisdictionally relevant documents using OCR, NLP, and multi-modal AI. Geospatial overlays may further assist in detecting boundary discrepancies, conflicting identifiers, or other data irregularities. Such capabilities highlight the proactive nature of the subject matter and differentiate it from static or manual recordkeeping approaches. These descriptions are non-limiting and do not disclaim coverage.

Blockchain-Supported Compliance and Auditability

The described system may employ blockchain-backed audit trails to document validation actions and anomaly detection processes in a transparent, tamper-evident format using canonicalized cryptographic digests, ZKP-based verification, or ECDSA-secured ledger operations in some implementations. These audit mechanisms may help align records with applicable local, state, and federal regulations, while reducing administrative and litigation exposure. References to older compliance strategies are included to contextualize improvements in system design and implementation.

Gaps in HUD Modernization and Digital Infrastructure

Although HUD has promoted modernization initiatives, such as electronic recording systems, many of these efforts do not currently support continuous validation or dynamic anomaly identification. By comparison, the subject matter described herein introduces real-time, AI-enabled monitoring and blockchain-based verification that may extend and strengthen HUD's existing systems. These references are illustrative of implementation gaps and not limiting.

Enhanced Recordkeeping Infrastructure for Affordable Housing Programs By combining blockchain-based validation, canonicalized cryptographic digest generation, ZKP-based verification, ECDSA-secured ledger operations, automated compliance workflows, and anomaly detection algorithms, the present disclosure proposes a scalable, secure infrastructure for property data governance. This configuration may be applied to HUD-aligned programs and supports broad interoperability. Mentions of existing HUD platforms are provided for illustrative purposes and do not disclaim or narrow the claims. Features such as the Public Record Request Module (100) are described as non-limiting examples that fall within the system components reflected in FIGS. 1-12.

6. Federal Government Systems—Federal Housing Administration's (FHA) Direct Endorsement (DE) Program Overview of the FHA Direct Endorsement (DE) Program and Metadata Considerations The FHA Direct Endorsement (DE) Program authorizes approved lenders to underwrite and close FHA-insured loans, promoting accessibility to mortgage financing for low- and moderate-income borrowers. This decentralized underwriting structure often interfaces with local property data systems that may not uniformly apply metadata reconciliation or AI-driven anomaly detection. The present disclosure, including components such as the Public Record Request Module (100) and a Metadata Reconciliation Engine, describes implementations that may enhance validation workflows in ways not typically observed in previously encountered or fragmented processes.

Challenges in Metadata Verification Across Jurisdictions

Jurisdictionally maintained data—such as building permits, approved zoning applications, property ownership documents, and tax assessments—may not be uniformly cross-referenced or validated using external data sources. In some cases, these datasets remain isolated from AI-based reconciliation workflows, which may increase the risk of metadata irregularities (e.g., undetected boundary changes or omitted lien releases). Implementations of the subject matter described herein may facilitate proactive alignment of TMR values, PI values, or AP identifier values prior to final record updates. These contextual references illustrate operational constraints, not admissions of prior art.

Title and Custodial Chain Integrity

In some jurisdictions, property instruments such as deeds, lien releases, and foreclosure-related notices may be recorded with limited validation of significant identifiers such as TMR values, PI values, or AP identifier values. The approach described herein may apply blockchain and AI-assisted reconciliation to improve identifier accuracy, supporting enhanced chain-of-title and chain-of-custody outcomes. References to administrative burdens in legacy workflows are provided to contextualize the benefits of an integrated ledger-based framework, and are not intended to limit the disclosure.

Blockchain Integration for Metadata Validation

Select implementations may incorporate a decentralized blockchain framework to secure property metadata fields (e.g., TMR values, PI values, or AP identifier values, permit logs, or tax data). These records may be represented by canonicalized cryptographic digests and validated against verified sources prior to public registration. In some configurations, tamper-evident logs contribute to traceability and reduce the likelihood of improper modifications. These mechanisms are intended to support data fidelity in FHA-backed lending environments and are not restrictive of other possible validation approaches.

AI Anomaly Detection and Preemptive Risk Management

The described system may employ machine learning and geospatial techniques to identify metadata anomalies in near real time. Examples may include irregular boundary designations or conflicting AP entries. In some embodiments, predictive scoring engines generate alerts or risk levels associated with specific discrepancies. These functions are designed to facilitate early resolution and reduce friction in FHA transactions. References to existing manual review practices are included for contrast and are not limiting.

Automated Compliance Monitoring and Dynamic Reconciliation

Compliance workflows may be configured to monitor metadata against relevant jurisdictional rulesets. In some configurations, unresolved anomalies are logged in a distributed ledger as tamper-evident ledger entries, including canonicalized cryptographic digests where applicable, for audit purposes, and alerts are generated for authorized users. These automation layers may help reduce human error and expedite resolution pathways in FHA lending workflows. Mentions of these mechanisms are illustrative and do not preclude additional configurations or compatible features.

Efficiency Gains and Stakeholder Confidence

Manual processes and decentralized records management may impact data accuracy and processing timelines within the FHA DE Program. In some configurations, the Public Record Request Module (100) and blockchain-supported verification components (see FIG. 12) may enable improved metadata access, validation, and transparency. Stakeholders—including borrowers, lenders, and regulatory bodies—may benefit from tamper-evident audit trails and streamlined workflows that support compliance with HUD criteria. These references do not concede or limit scope but illustrate potential operational improvements.

System Design for Regulatory Alignment

The described system may integrate blockchain-based validation, canonicalized cryptographic digest generation, ZKP-based verification, ECDSA-secured ledger operations, anomaly detection models, and compliance automation features to support record integrity and mitigate legal or administrative risks in FHA transactions. These capabilities may provide structured enhancements to existing frameworks and reinforce real-time auditability.

Technological Advancements for FHA-Backed Lending Systems

This disclosure outlines approaches that may transform record governance in FHA-backed mortgages, particularly by aligning metadata identifier values with canonicalized cryptographic digest generation, ZKP-based verification, ECDSA-secured ledger operations, and anomaly detection techniques. These implementations are capable of reducing unauthorized edits, preserving historical metadata, and enabling jurisdiction-aware compliance monitoring. References to improved accuracy, trust, and workflow dependability do not limit the subject matter to any specific implementation and are intended to demonstrate its applicability to the FHA DE Program. The subject matter supports enablement, novelty, and patent eligibility under 35 U.S.C. §§ 101, 102, 103, and 112.

7. Federal Government Systems—VA Credit Underwriting Program.

The VA Credit Underwriting Program, described in VA Pamphlet 26-7 (VA Lenders Handbook), authorizes VA-approved lenders to originate and close VA-guaranteed loans under a delegated underwriting framework. This model supports accessibility in veteran homeownership while placing operational reliance on property data systems maintained by decentralized state and local entities. These recordkeeping environments may not uniformly apply AI-based metadata reconciliation or anomaly detection techniques. References to such systems are presented solely to provide contextual background and do not concede any recognition of prior art under 35 U.S.C. §§ 102 or 103.

Metadata Reconciliation in Loan Origination and Underwriting

While the VA Credit Underwriting Program emphasizes process efficiency, current workflows may not incorporate structured validation of zoning or building permits, issued certificates, or historical property records. In some jurisdictions, metadata such as TMR values, PI values, or AP identifier values may not be reconciled across data sources, contributing to gaps in transaction history verification. Although some systems implement partial validation, they do not appear to deploy multi-modal AI, blockchain-based integrity checking, or predictive anomaly identification as described herein. Implementations such as the Public Record Request Module (100) may facilitate secure, proactive metadata alignment and are not intended to limit the broader applicability of the disclosed subject matter.

Limitations of Disparate Local Record Practices

Variability in local recordkeeping protocols may lead to non-uniform data treatment, such r.

as duplicate identifier values or undocumented parcel boundary changes. These non-uniformities may impede title verification or lien reconciliation in mortgage workflows. The subject matter described herein may provide tamper-evident blockchain-based anomaly detection tools that draw from multiple data sources and jurisdictions. References to these non-uniformities illustrate challenges addressed by the disclosed subject matter and are not intended as admissions regarding any existing solution.

Blockchain Validation and Metadata Traceability

Select embodiments of the disclosed system may employ decentralized ledger technology to generate canonicalized cryptographic digests for, and cross-reference, TMR values, PI values, and AP identifier values and related property data (e.g., tax or permit records) prior to registration. This approach may enable enhanced traceability, verifiability, and protection against retroactive modifications. While existing solutions typically perform validation post-filing, some implementations of proactive ledger integration may help establish a secure chain-of-title from the outset. Such references are included for illustrative purposes and do not limit the scope of the disclosed subject matter.

Predictive Analytics for Anomaly and Unauthorized-Activity Detection Machine learning algorithms and geospatial overlays may be implemented to identify record anomalies, including non-uniform ownership histories or potentially unsupported encumbrances. Predictive models may generate risk scores, prioritizing potential issues for early review. These features may allow stakeholders—such as lenders, borrowers, or oversight bodies—to take preventive action, differing from more reactive approaches. These examples are non-limiting and intended to support the technical context.

Automation in Compliance Workflows and Record Oversight

Automated workflows may validate metadata fields against recognized property databases while monitoring applicable jurisdictional regulations. When discrepancies arise, alerts and tamper-evident blockchain-based audit trails, including canonicalized cryptographic digest entries where applicable, may be generated to facilitate prompt review and resolution. Such workflows may help mitigate risks of non-compliance or data loss while supporting uniform governance. References to existing systems do not restrict the claim scope and are used to illustrate the problem domain.

Secure Acquisition and Integration of Public Records

In some configurations, an internal module may acquire jurisdictionally maintained documents and reconcile them with structured metadata fields using canonicalized cryptographic digest generation and ledger-based storage. This may include deeds, zoning permits, and lien releases, among others. References to public record requests are included to explain use cases in which the described system may operate. These discussions are not limiting and do not concede prior art status.

Governance Impact and Data Confidence for Stakeholders

The described system, through its integration of distributed ledger validation, canonicalized cryptographic digest generation, ZKP-based verification, ECDSA-secured ledger operations, real-time anomaly detection, and metadata reconciliation, may strengthen property data reliability and workflow transparency. Stakeholders—including veteran homebuyers, lenders, title providers, and government agencies—may benefit from improved record traceability and fewer disputes. These implementations are illustrated in FIGS. 1-12, and are intended to support constructive possession, enablement, and statutory compliance under 35 U.S.C. §§ 101, 102, 103, and 112.

8. Federal Government Systems—Bear Stearns Asset Backed Securities I Trust 2004-FR3

Overview of Mortgage Pass-Through Securitization and Data Limitations

The BEAR STEARNS ASSET BACKED SECURITIES I TRUST 2004-FR3 (2004-FR3 trust) exemplifies mortgage pass-through securitization structures in which pooled residential loans are held in trust and used to issue asset-backed securities. While this approach expanded secondary market liquidity, it also underscored limitations in metadata validation, property record traceability, and unauthorized-activity risk mitigation. The subject matter described herein may address such limitations through technical configurations that incorporate AI-supported anomaly detection and tamper-evident blockchain-based ledger systems for verifying property metadata, including TMR values, PI values, or AP identifier values.

Static Recordkeeping and Metadata Disparities

The 2004-FR3 trust's securitized portfolio included over 15,000 residential loans with an aggregate value exceeding $2.5 billion. The loan pool drew on decentralized and static recordkeeping infrastructures that typically lacked real-time metadata validation capabilities. By comparison, some implementations of the present disclosure may validate property documentation—such as zoning applications, approved permits, or ownership history records—and reconcile TMR values, PI values, or AP identifier values throughout the transaction lifecycle. Any reference to past solutions is presented as illustrative of reactive methods and does not limit or disclaim the subject matter described herein.

Chain-of-Title Gaps and Documentation Mismatches

Enforceability of security interests in mortgage pass-through trusts may be affected by inconsistencies in deed, lien release, and foreclosure documentation. The 2004-FR3 trust, operating across fragmented local jurisdictions, risked gaps in chain-of-title where fields containing TMR values, PI values, or AP identifier values were recorded in a non-uniform manner or not validated. The subject matter described herein may introduce distributed ledger tools, canonicalized cryptographic digest generation, ZKP-based verification, and ECDSA-secured ledger operations to support secure reconciliation of such records. These examples highlight known vulnerabilities but do not concede that prior systems represent controlling prior art.

Administrative Overload During Foreclosure Surges

During the 2008 financial crisis, elevated foreclosure volumes placed administrative strain on county-level offices managing legal filings. Static workflows and manual review processes led to documentation errors and processing delays. The subject matter described herein may offer enhancements such as AI-driven anomaly detection, cross-jurisdictional schema matching, and geospatial overlays to expedite validation and reinforce the integrity of title records. These references are intended to provide background for technical improvement, not to limit the claims.

Blockchain Validation Framework and Metadata Alignment

In some embodiments, a validation and reconciliation engine may apply blockchain mechanisms to secure property data, such as building permit records, approved permits, and property ownership histories. Canonicalized cryptographic digest generation of TMR values, PI values, or AP identifier values may be performed before public registration, with outputs recorded in a tamper-evident ledger. Schema-matching and automated cross-referencing techniques may enable parallel integration with transaction-focused systems, and are not intended to limit coverage to any particular platform.

Machine Learning-Driven Anomaly Detection

The described system may employ ML algorithms and geospatial mapping to identify irregularities in recorded data—such as boundary discrepancies, lien conflicts, or fabricated document assignments. In some configurations, risk scoring prioritizes flagged anomalies for investigation. Although many existing approaches rely on retrospective auditing practices, the mechanisms described here are provided for context and do not limit or disclaim the broader scope of the disclosed subject matter.

Compliance Automation and Auditable Oversight

In some configurations, automated compliance modules may monitor data uniformity against local, state, and federal criteria. When discrepancies are detected, audit logs-anchored in blockchain—may document the validation history and reconciliation decisions as tamper-evident ledger entries, including canonicalized cryptographic digest entries where applicable. These tools can reduce reliance on manual intervention, lower the risk of overlooked filings, and support the data reliability typically sought in securitization workflows. These descriptions are illustrative and maintain full claim alignment.

Distributed Recordkeeping Infrastructure for Scalability

A decentralized framework may support scalable metadata reconciliation across diverse jurisdictions. Implementations may combine blockchain protocols, AI-driven anomaly identification, and ledger-based data preservation. This arrangement can address fragmentation observed in the 2004-FR3 trust, but does not suggest that any prior system included the solutions described herein. The inclusion of such examples is provided to support enablement and does not disclaim any scope.

Stakeholder Benefits from Verified Metadata Alignment

The subject matter described herein may facilitate ongoing verification of metadata comprising TMR values, PI values, or AP identifier values through schema-matching and integration with trusted sources and, in some implementations, through canonicalized cryptographic digest generation, ZKP-based verification, ECDSA-secured ledger operations, and tamper-evident blockchain recordkeeping. These technical configurations may improve data reliability for a wide array of stakeholders—such as lenders, investors, title agents, and regulators—by offering enhanced property record traceability and reduced error propagation. This disclosure supports the technical scope reflected in FIGS. 1-12, including potential integration of the Public Record Request Module (100) as part of a broader real estate governance platform.

9. Local Government Systems—State-Level Systems

Overview of Judicial and Non-Judicial Foreclosure Workflows and Recordkeeping

The subject matter described herein may support improvements to property data management in both judicial and non-judicial foreclosure environments, as exemplified by jurisdictions such as Loudoun County, Virginia. Judicial foreclosure procedures typically involve court-supervised determinations, while non-judicial processes (e.g., pursuant to Deeds of Trust) proceed through statutory channels with trustee oversight. In both cases, supporting documents—such as "Account of Trustee Under Deed of Trust" reports—are submitted to describe the distribution of proceeds. In many jurisdictions, metadata fields (e.g., TMR values, PI values, or AP identifier values) associated with these filings are not subject to automated reconciliation or validation across datasets such as zoning permits, approved development logs, or tax filings. References to these processes are included for contextual background and are not intended as admissions under 35 U.S.C. §§ 102 or 103.

Challenges in Local Record Metadata Uniformity

As seen in Loudoun County and elsewhere, property metadata is often maintained in siloed systems that lack standardized validation methods. This may result in unverified TMR values, PI values, or AP identifier values, incomplete ownership chains, and non-uniformities in lien documentation. By comparison, the approaches described herein may use tamper-evident blockchain-backed reconciliation tools and multi-modal AI validation to cross-reference jurisdictional records, reduce risks of misalignment, and improve transparency for stakeholders. Mentions of current gaps are illustrative and do not imply acknowledgment of prior art.

Blockchain Integration for Metadata Verification

In some embodiments, a blockchain-enabled protocol may validate property data—such as zoning, building, or occupancy permits—by applying canonicalized cryptographic digest generation and schema-matching to metadata fields such as TMR values, PI values, and AP identifier values. This verification may occur prior to the finalization of public records, enabling the creation of tamper-evident audit trails. These features support traceability and data confidence and are described here to illustrate technical implementations, not to limit claim coverage.

Scalability Across Jurisdictional Variations

While Loudoun County serves as one example, metadata reconciliation challenges affect both judicial and non-judicial foreclosure systems nationwide. Manual filings in judicial states may lead to court backlog, while trustee-based oversight in non-judicial states may omit formal data verification. In some implementations, scalable automation tools—including ledger-based reconciliation engines and real-time AI anomaly detection—may be deployed to address these issues across varying jurisdictions. These systems are not limited to any one jurisdictional model.

Foreclosure Data and Securitization Integrity

Accurate trustee documentation, lien validation, and ownership tracking are foundational to the enforceability of assets underpinning mortgage-backed securities. Where metadata discrepancies exist, such as outdated or unverified TMR values, PI values, or AP identifier values, the enforceability of the security interest may be challenged. By comparison, the systems described herein may utilize AI-enabled anomaly scoring, canonicalized cryptographic digest records, and preemptive reconciliation protocols to support record integrity from origination through disposition.

Metadata-Integrity Risk Mitigation Through Predictive Analytics

In some approaches, machine learning models and geospatial tools may assist in detecting metadata-integrity anomalies—such as disputed boundary adjustments, conflicting lien assignments, or documentation anomalies. These features may generate prioritized alerts to stakeholders, enabling timely resolution. Examples of current reactive systems are provided for comparative reference and do not disclaim the scope of the disclosed subject matter.

Automation in Compliance and Reconciliation

Real-time compliance frameworks may be implemented to align property records with governing statutes and administrative procedures. In some embodiments, tamper-evident blockchain-based audit logs, including canonicalized cryptographic digest entries where applicable, may record validation checkpoints and unresolved conflicts, while automated notifications prompt stakeholder intervention. These configurations aim to enhance oversight, expedite approvals, and support auditability in real estate data flows.

Support for Regulatory Conformity Across Levels of Government

The described subject matter may be adaptable to a range of legal and regulatory contexts, including federal and state foreclosure protocols. Configurations integrating canonicalized cryptographic digest generation, ZKP-based verification, ECDSA-secured ledger operations, AI analysis, and metadata traceability may aid compliance with statutes such as the Securities Exchange Act or Federal False Claims Act. Mentions of such frameworks are illustrative of environments in which the system may be beneficial and are not limiting.

Security, Transparency, and Stakeholder Trust

The disclosed system may improve data reliability and reduce transaction risk by unifying AI-based anomaly detection with blockchain-backed validation, canonicalized cryptographic digest generation, ZKP-based verification, and ECDSA-secured ledger operations. These features may benefit property owners, courts, local agencies, and financial institutions by providing tamper-evident metadata and improving confidence in real estate records. These references illustrate the potential benefits to stakeholders and support the claimed subject matter.

Modernization of Real Estate Record Governance

Legacy recordkeeping often depends on isolated, manual systems that introduce risk and delay. The subject matter described herein proposes an integrated platform using AI, distributed ledgers, canonicalized cryptographic digest generation, ZKP-based verification, ECDSA-secured ledger operations, and cross-jurisdiction schema matching to ensure accurate chain-of-title tracking and metadata verification. These configurations reflect the advancements described in FIGS. 1-12, demonstrating support for technical enablement, patent eligibility, and statutory compliance.

10. Local Government Systems—AlertMe Notification System

Overview of AlertMe Notification System and Metadata Verification Considerations The subject matter described herein may relate to existing county-level systems such as the "AlertMe Notification System" (AlertMe) used in Loudoun County, Virginia, which provides property owners with alerts when land records are filed referencing their names or associated properties. While this service offers a transparency benefit, it is designed primarily as a reactive measure, relying on individual property owners to monitor, interpret, and respond to alerts manually. This section references such practices solely for context and does not constitute an admission that the AlertMe system is prior art under 35 U.S.C. §§ 102 or 103.

Proactive Validation Using Blockchain-Based Property Record Governance While many existing solutions rely on reactive alert mechanisms, some embodiments disclosed herein may apply blockchain technologies to validate core metadata before it enters the public record. Canonicalized cryptographic digest generation of TMR values, PI values, or AP identifier values, among other property data, may be used to help ensure that records remain tamper-evident from the initial phases of a property transaction. These approaches may provide stakeholders—including prospective homebuyers, property owners, lenders, and regulatory bodies—with greater confidence in the integrity of recordkeeping operations.

Metadata Integrity Through Pre-Registration Validation Workflows Some implementations may verify property metadata—including TMR values, PI values, and AP identifier values—in coordination with records associated with development permits, approved zoning applications, and tax assessments. These checks may occur prior to final recording, enabling anomaly identification during early processing stages. In some configurations, this early-stage validation may complement or operate alongside post-registration alerts while reducing dependence on user monitoring for error detection.

AI-Driven Anomaly Detection for Unauthorized-Activity Risk Mitigation Machine learning models and geospatial analytics may assist in identifying record anomalies such as duplicate entries, unauthorized boundary changes, or unusual ownership transitions. Risk scoring mechanisms may prioritize high-impact anomalies, allowing stakeholders to address discrepancies before they impact downstream workflows. These features contrast with manual, post-recordation reviews, providing proactive capabilities within an automated architecture.

Automated Compliance Monitoring and Blockchain Audit Trails

The system may include configurable compliance workflows that validate record submissions against statutory frameworks and authenticated datasets. Blockchain audit logs may document any validation and reconciliation step, creating a tamper-evident trail for compliance oversight including, in some implementations, canonicalized cryptographic digest entries or ECDSA-secured ledger operations. These mechanisms may help reduce administrative burden and support timely conformance with applicable legal criteria.

Comparison with Notification-Based Approaches

While systems like AlertMe can notify users of completed filings, they may not prevent discrepancies, errors, or unauthorized filings from entering the record. By comparison, the subject matter described herein focuses on validation at the pre-recordation stage, offering canonicalized cryptographic digest generation, ZKP-based verification, ECDSA-secured ledger operations, and automated tools to help maintain metadata accuracy and integrity prior to public dissemination. These distinctions are not limiting but demonstrate potential enhancements to legacy alert frameworks.

Unified Framework for Secure and Scalable Record Governance

The disclosed system may combine secure metadata validation, canonicalized cryptographic digest generation, ZKP-based verification, ECDSA-secured ledger operations, compliance automation, and predictive anomaly detection to address structural weaknesses in decentralized property data practices. By reducing dependency on fragmented monitoring and introducing tamper-evident protections, the described implementations may benefit a broad range of real estate participants while maintaining support for jurisdictional diversity.

Internal Records Acquisition and Early Metadata Reconciliation

An Internal Records Acquisition Module may retrieve and cross-verify TMR values, PI values, or AP identifier values from official repositories before public registration. By identifying discrepancies at earlier stages, this module may help prevent propagation of inaccurate or unauthorized data. This approach may operate in conjunction with, or as a supplement to, traditional post-recordation monitoring systems.

Proactive Integrity for Property Transactions and Securitization

The subject matter described herein supports tamper-evident, verifiable real estate workflows by combining blockchain-enabled metadata protection, canonicalized cryptographic digest generation, ZKP-based verification, ECDSA-secured ledger operations, automated reconciliation, and compliance monitoring. These features may reduce legal exposure, streamline title processing, and enhance confidence in property data ecosystems. Unlike reactive alerts alone, these approaches align with FIGS. 1-12, reinforcing a proactive and scalable approach to real estate record management.

11. Local Government Systems—LandMARC Program

Overview of Loudoun County's LandMARC Program

The subject matter described herein may relate to initiatives such as Loudoun County's Land Management, Applications, Research, Coordination (LandMARC) program, which was launched on Aug. 14, 2023, to centralize permitting, zoning, and code enforcement processes. Although LandMARC provides GIS-enabled mapping, online access to records, and real-time interface updates, it may not fully incorporate digital and legacy property data—such as land development permit applications, approved zoning logs, or tax-related filings-within a unified validation architecture. References to LandMARC are presented solely for background and are not intended as an acknowledgment of prior art under 35 U.S.C. §§ 102 or 103.

Metadata Fragmentation and Validation Considerations

Documentation relevant to land use, title verification, and regulatory compliance may be handled across disparate systems, which may not apply uniform metadata reconciliation. This may result in non-uniform or incomplete records that affect downstream processes, such as ownership transfer, permit reviews, and development planning. In various implementations, the subject matter described herein may support proactive validation of metadata fields—including TMR values, PI values, and AP identifier values—using cross-referencing tools and automated verification workflows, offering improvements over fragmented record architectures.

Risks Associated with Metadata Tampering

In some instances, property record systems may not include mechanisms to detect unauthorized or unverified changes to metadata. The LandMARC system, for example, may not employ canonicalized cryptographic digest generation or AI-based anomaly detection as part of its metadata management. In some implementations, the disclosed system may incorporate ledger-backed tracking tools to document changes in TMR values, PI values, or AP identifier values, enabling traceability of chain-of-title and chain-of-custody records throughout a transaction. References to existing local systems are illustrative and do not limit the scope of the subject matter.

Blockchain Validation for Distributed Record Oversight

In some approaches, a blockchain-enabled verification protocol may be applied to validate metadata records—including building permits, zoning filings, and historical ownership data—prior to formal public registration. Canonicalized cryptographic digests may be generated for metadata fields comprising TMR values, PI values, and AP identifier values and cross-validated against trusted data sources, allowing for tamper-evident compliance checkpoints. These mechanisms may operate independently or in coordination with existing administrative platforms.

Anomaly Detection Via AI and Geospatial Analysis

In some embodiments, anomaly detection algorithms and geospatial visualization tools may identify property data irregularities, such as duplicate TMR values, missing zoning approvals, or ambiguous parcel boundaries. Predictive scoring models may assign priority rankings for review by local officials or stakeholders, enabling early intervention. These capabilities are described as complementary to legacy workflows and are not intended to constrain the applicability of the disclosed subject matter.

Automated Compliance Monitoring and Metadata Reconciliation

The disclosed system may facilitate automated compliance verification in accordance with local, state, or federal guidelines. Validation events may be recorded in tamper-evident blockchain audit logs, including canonicalized cryptographic digest entries where applicable, while unresolved issues may trigger escalation or alert notifications. In some cases, the system may streamline record submission and improve throughput by reducing manual validation bottlenecks.

Comparison with LandMARC Functionalities

Although LandMARC offers real-time access and digital document management, it does not appear to incorporate preemptive data reconciliation, blockchain-based traceability, or AI-supported anomaly detection. The subject matter described herein may extend these capabilities by offering modular integration of canonicalized cryptographic digest generation, ZKP-based verification, ECDSA-secured ledger operations, automated anomaly scoring, and real-time compliance tracking, allowing greater assurance in property data governance.

Stakeholder Benefits and Scalability Across Jurisdictions

The present system may support improved accuracy, traceability, and workflow efficiency for stakeholders such as title professionals, government agencies, developers, and landowners. Tamper-evident records and dynamic reconciliation may mitigate disputes, reduce delays, and help maintain metadata alignment across jurisdictions. These advantages are not presented as restricted to any one configuration but exemplify the technical functionality described in the claims.

Framework for Modernized Land Record Validation

The disclosed techniques integrate blockchain protocols, canonicalized cryptographic digest generation, ZKP-based verification, ECDSA-secured ledger operations, AI-supported reconciliation, and internal metadata acquisition to support real-time, proactive land record validation. These configurations address vulnerabilities present in decentralized and legacy systems—such as those referenced in LandMARC—and align with the technical features illustrated in FIGS. 1-12.

12. MERS® System—Limitations in Real Estate Records Management and Metadata Reconciliation Overview of the MERS® System The Mortgage Electronic Registration Systems, Inc. (MERS®), operated by MERSCORP Holdings, Inc. (now a subsidiary of Intercontinental Exchange, Inc.), was described in an Aug. 20, 2003 filing with the United States Securities and Exchange Commission as a National Mortgage Rights Registry. The MERS® system centralizes mortgage servicing rights and ownership data by designating itself as the named mortgagee or beneficiary in public land records. For instance, according to the *MERS® System Integration Handbook, Volume I, Business Integration Environment—Release* 30.0, dated Dec. 14, 2015, page 6: "With MERS as the mortgagee/beneficiary in the land records, the chain of title stops at MERS; therefore problems relating to breakage in the chain of title are eliminated."

While this model may streamline certain aspects of document recording and mitigate some occurrences of title chain breakage, it does not appear to incorporate systematic extraction, reconciliation, or validation of TMR values, PI values, or AP identifier values as generated by governmental sources (e.g., land development applications, zoning or building permits—whether pending, issued, or archived—or property tax documentation).

Any reference to MERS® herein is provided solely for contextual purposes and does not concede or characterize any element, feature, or embodiment as prior art under 35 U.S.C. §§ 102 or 103.

Metadata Reconciliation Gaps in Transaction-Centric Frameworks

Although MERS® may help prevent some disruptions in title records by centralizing lienholder identification, it does not address upstream metadata validation, particularly when land development, permit issuance, or title transitions occur before mortgage registration. Discrepancies in unvalidated TMR values, PI values, or AP identifier values might lead to chain-of-title ambiguity or heightened exposure to unauthorized-activity risk and regulatory inconsistencies. The subject matter described herein references earlier-stage metadata reconciliation and anomaly detection, with additional technical examples described elsewhere in this disclosure.

Opportunity for Enhanced Metadata Validation

While MERS® facilitates digital mortgage workflows, it does not appear to verify foundational real estate metadata—such as parcel identifier values, zoning histories, or permit records—during initial transaction phases. In some implementations, earlier validation of data comprising TMR values, PI values, or AP identifier values prior to deed recording or lien processing (e.g., using AI models and blockchain verification, canonicalized cryptographic digest generation, ZKP-based verification, or ECDSA-secured ledger operations) could support alignment across multiple jurisdictions. These examples of potential integration gaps are not limiting nor disclaimed.

Illustrative Prior Solutions and Their Scope

For reference, U.S. Pat. No. 7,340,608 (application Ser. No. 10/463,646) discloses digital record tracking using identifiers and digital signatures, though it does not appear to reconcile metadata according to relevant jurisdiction-specific protocols or perform real estate-centric validation of government-issued documents (e.g., land development building or zoning permit applications, subsequently issued permits or logs, or tax filings). References to such solutions are provided to illustrate the features addressed by the broader architecture described herein and are not intended to limit the scope of the present claims.

eRegistry Legal Opinion Context

A legal memorandum by Covington & Burling LLP (authored by Mark E. Plotkin, dated Oct. 21, 2004) notes that the MERS® eRegistry furnishes near real-time control tracking for eNotes and complies with E-SIGN and UETA criteria. While these features may improve digital mortgage enforceability, they may not fulfill broader metadata reconciliation tasks. The subject matter described herein contemplates real-time validation of TMR values, PI values, or AP identifier values using blockchain-based validation, AI, cross-jurisdiction verification, canonicalized cryptographic digest generation, ZKP-based verification, or ECDSA-secured ledger operations.

Decentralized Validation Framework and Metadata Security

In some embodiments, a blockchain-based system can validate and reconcile TMR values, PI values, or AP identifier values alongside government-issued permit records, zoning documents, and tax data using canonicalized cryptographic digest generation, ZKP-based verification, ECDSA-secured ledger operations, or tamper-evident blockchain recordkeeping. This configuration may foster traceable, tamper-evident metadata alignment and facilitate correction of anomalies before they propagate into servicing systems. Such validation can complement MERS®-type systems, offering an approach that may not replicate their structure or scope.

Real-Time Anomaly Detection and Record Protection

AI and geospatial tools may support the detection of outliers or inconsistencies in metadata—for instance, overlapping boundary descriptors or incorrectly assigned parcel identifier values—before public recordation. Predictive scoring might prioritize these issues for correction, enabling faster resolution by relevant stakeholders. These technologies are designed to supplement existing transactional frameworks.

Workflow Automation for Regulatory Coordination

Some implementations may allow automated workflows for statutory compliance, flagging unresolved discrepancies and maintaining a tamper-evident blockchain audit trail, including canonicalized cryptographic digest entries where applicable, to enhance accountability. These modules differ from MERS®'s primarily servicing-focused role by promoting metadata reliability throughout the record lifecycle, not solely at lien assignment or mortgage registration.

Comparative Contextualization of MERS® Functionality

While MERS® provides a transaction registry utility, it may not reconcile foundational property records or confirm jurisdictional data points prior to mortgage registration. The system described in this application may operate in parallel or function as a supplement, enabling comprehensive metadata verification across real estate processes.

Scalability and Institutional Value

By employing dynamic validation, canonicalized cryptographic digest generation, ZKP-based verification, ECDSA-secured ledger operations, and near real-time reconciliation, approaches referenced herein may serve a spectrum of institutional and regulatory participants. By addressing record reliability at earlier junctures, this subject matter may offer scalable advantages for lenders, title professionals, and government agencies.

Advancing Record Integrity Through Technical Synergy

The system presented may address limitations in existing record infrastructures—including those partially covered by MERS®—by merging distributed ledger verification, canonicalized cryptographic digest generation, ZKP-based verification, ECDSA-secured ledger operations, AI-driven anomaly detection, and multi-jurisdiction data governance. These mechanisms support the claimed subject matter as illustrated in FIGS. 1-12, upholding legal defensibility, technical enablement, and constructive possession.

13. Patented Systems—Contextual Reference to U.S. Pat. No. 11,748,371

Overview of U.S. Pat. No. 11,748,371 B2

The subject matter described herein may intersect with or diverge from features disclosed in U.S. Pat. No. 11,748,371 B2 (application Ser. No. 17/346,684), titled "Systems and Methods for Searching for and Translating Real Estate Descriptions from Diverse Sources Utilizing an Operator-Based Product Definition." While that patent addresses techniques for normalizing descriptive language across distributed property datasets, it does not appear to perform metadata validation involving TMR values, PI values, or AP identifier values, nor does it describe cross-verification involving jurisdictionally maintained documents such as zoning permits, approved building logs, or tax filings. References to U.S. Pat. No. 11,748,371 B2 are provided for context and are not offered as disclaimers or acknowledgments of prior art under 35 U.S.C. §§ 102 or 103.

Gaps in Metadata Reconciliation and Record Validation

While U.S. Pat. No. 11,748,371 B2 offers improvements in searchability and normalization, it may not encompass early-stage metadata verification of metadata fields comprising TMR values, PI values, or AP identifier values. The absence of reconciliation mechanisms for zoning records, permit histories, or tax data may expose systems to inconsistencies or errors. The present subject matter may address these challenges through the integration of AI-based anomaly detection, blockchain-supported metadata validation, canonicalized cryptographic digest generation, and jurisdiction-aware metadata reconciliation.

Blockchain Validation Architecture for Property Data Integrity

In some implementations, the system described herein may include a decentralized blockchain environment configured to validate and log metadata fields, including TMR values, PI values, or AP identifier values, as well as records related to development permits, zoning applications, and ownership histories. These records may be represented by canonicalized cryptographic digests and stored to form tamper-evident audit trails. Unlike U.S. Pat. No. 11,748,371 B2, which focuses on descriptive data harmonization, this approach supports traceable record provenance through secure metadata verification.

Proactive Unauthorized-Activity Risk Mitigation via Predictive Anomaly Detection The disclosed system may employ machine learning, geospatial analytics, and predictive risk scoring to detect and prioritize discrepancies—such as irregular TMR values, missing permits, or boundary inconsistencies—prior to their inclusion in public registries. These measures may enhance record accuracy and reduce regulatory or transactional risk. Prior solutions are referenced to illustrate narrower problem scopes and do not limit the claims.

Automated Compliance Tracking and Validation Logging

In some configurations, natural language processing (NLP) and optical character recognition (OCR) tools may extract property metadata from physical or digital sources and validate them against recognized rulesets. Real-time validation events and compliance statuses may be recorded in tamper-evident blockchain audit logs, including canonicalized cryptographic digest entries where applicable, supporting regulatory alignment across federal, state, and local jurisdictions. These capabilities may address process inefficiencies that are not explicitly contemplated in the framework of U.S. Pat. No. 11,748,371 B2.

Integration of Historical Records with Modern Reconciliation Tools

The disclosed subject matter may unify legacy and contemporary property datasets, including zoning applications, issued permits, and tax filings, within a secure and interoperable architecture. This approach may assist with maintaining continuity of records containing TMR values, PI values, or AP identifier values while providing transparency for stakeholders. Mentions of U.S. Pat. No. 11,748,371 B2 serve to distinguish prior art based on scope, not to disclaim compatibility or functionality.

Framework for Enhanced Property Governance and Transaction Integrity Many existing solutions employ static data harmonization models. The present disclosure combines blockchain validation, canonicalized cryptographic digest generation, ZKP-based verification, ECDSA-secured ledger operations, AI-supported anomaly detection, and compliance automation to support dynamic metadata integrity from the point of origination through subsequent transactions. These capabilities may help prevent unauthorized record changes, support defensible title continuity, and improve auditability across real estate transactions. These features are illustrated in FIGS. 1-12 and are presented as illustrative of flexible, scalable property data governance.

14. Patented Systems—Contextual Reference to U.S. Patent Application No. US20220067117A1

Overview of U.S. Patent Application No. US20220067117A1

The subject matter described herein may relate to, or be distinguishable from, aspects of U.S. Patent Application No. US20220067117A1 (arising from application Ser. No. 17/372,313, now abandoned), titled "System and Method for Linking Data Records for Parcels." That application describes address-based methods for linking parcel data across disparate systems. While these techniques may assist with data indexing, they do not appear to validate core metadata fields such as TMR values, PI values, or AP identifier values, nor do they appear to reconcile zoning permits, issued building logs, or ownership history records with jurisdiction-maintained datasets. Any reference to US20220067117A1 is presented for contextual discussion and is not offered as a disclaimer or admission under 35 U.S.C. §§ 102 or 103.

Metadata Lineage and Verification Limitations

In some implementations, blockchain-enabled validation can be used to store canonicalized cryptographic digest records containing TMR values, PI values, or AP identifier values, along with relevant documentation such as zoning permits, construction approvals, or tax assessments. These mechanisms may support decentralized metadata reconciliation, reducing reliance on manual address matching and increasing resilience against data manipulation.

Machine Learning Capabilities and Anomaly Detection

Although US20220067117A1 supports data linking, it does not appear to incorporate machine learning tools or predictive analytics for detecting discrepancies in property metadata. Some implementations of the present system may feature anomaly detection and early-stage compliance screening, identifying issues before records are finalized or propagated through land registries. These distinctions illustrate technical advancements and are not limiting.

Blockchain Architecture for Metadata Security

In some implementations, blockchain-enabled validation can be used to store canonicalized cryptographic digest records containing TMR values, PI values, or AP identifier values, along with relevant documentation such as zoning permits, construction approvals, or tax assessments. These mechanisms may support decentralized metadata reconciliation, reducing reliance on manual address matching and increasing resilience against data manipulation.

Predictive Anomaly Scoring and Risk Mitigation

In some configurations, AI-driven models may identify metadata inconsistencies, such as incomplete permit references or duplicate parcel identifier values, before they impact processes like title transfer or underwriting. Geospatial overlays and predictive scoring may guide timely stakeholder intervention. References to prior techniques, including those described in US20220067117A1, are provided for context and do not limit the disclosed implementations.

Compliance Monitoring and Blockchain-Based Logging

The subject matter described herein may include automated workflows that monitor property metadata submissions for compliance with jurisdiction-specific criteria. Audit checkpoints may be stored in tamper-evident blockchain ledgers as ledger entries that may include canonicalized cryptographic digests, ZKP-based verification results, or ECDSA-secured ledger operations where applicable, documenting validation activities and regulatory deadlines. This process may complement existing frameworks and reduce manual reconciliation dependencies.

Integration with Address-Based Frameworks

Where address-linked datasets are used, the disclosed system may enhance metadata validation through schema matching, OCR, NLP, and multi-modal AI. These tools may help verify that TMR values, PI values, or AP identifier values align with property records and jurisdiction-maintained logs. Inclusion of this comparison illustrates the applicability of the described system and does not restrict its compatibility or scope.

Scalability and Cross-Jurisdictional Data Transparency

The disclosed techniques may be used to aggregate and reconcile metadata fields comprising TMR values, PI values, and AP identifier values with associated documentation through scalable, blockchain-backed and AI-assisted architectures that may include canonicalized cryptographic digest generation, ZKP-based verification, ECDSA-secured ledger operations, and tamper-evident blockchain recordkeeping.

These configurations may promote stakeholder confidence, jurisdictional interoperability, and data reliability across property record ecosystems. References to prior filings, including US20220067117A1, are presented to contextualize metadata integration challenges and do not disclaim or limit the subject matter addressed in FIGS. 1-12.

15. Patented Systems—Contextual Overview of U.S. Pat. No. 11,593,901B2 and U.S. Pat. No. 10,885,597B1

Overview of U.S. Pat. No. 11,593,901B2

The subject matter described herein may intersect with or diverge from some aspects of U.S. Pat. No. 11,593,901 B2 (application Ser. No. 17/112,585), titled "Systems and Methods for Using Blockchains to Record, Manage, and Transfer Ownership Rights to Land Titles." That patent describes the use of a permissioned blockchain to manage title-related data via sequential block creation. While the specification outlines methods for capturing information such as property addresses, ownership, and construction year, it does not appear to validate jurisdiction-specific metadata, such as TMR values, PI values, or AP identifier values. Nor does it describe cross-referencing zoning permits, approved building logs, or other government-maintained documents. Any reference to U.S. Pat. No. 11,593,901B2 is provided for illustrative context and does not disclaim or characterize the claimed subject matter under 35 U.S.C. §§ 102 or 103.

Metadata Reconciliation and Traceability Enhancements

Although U.S. Pat. No. 11,593,901B2 demonstrates how blockchain may preserve data order and persistence, it does not appear to integrate active reconciliation of metadata fields with external regulatory datasets. Discrepancies in zoning status, owner lineage, or parcel identifier values may persist unless proactively detected and resolved. Some implementations described herein may include schema-matching tools and AI-assisted comparison engines to improve metadata reliability and establish early-stage traceability.

Cross-System Validation and Compliance Support

While U.S. Pat. No. 11,593,901B2 references permissioned network validators, it does not appear to integrate cross-jurisdiction validation protocols or automated regulatory compliance tracking. The subject matter described herein may include distributed compliance workflows and tamper-evident blockchain-anchored logs, including canonicalized cryptographic digest entries where applicable, capable of documenting validation checkpoints for fields containing TMR values, PI values, or AP identifier values, supporting flexible conformance across local, state, or federal guidelines.

Reference to U.S. Pat. No. 10,885,597 B1

U.S. Pat. No. 10,885,597 B1 (application Ser. No. 16/208,097), titled "Method and System for Retrieving and Serving Regulatory History for a Property," discusses aggregation of historical regulatory data but does not appear to include blockchain-backed validation or predictive anomaly detection mechanisms. References to this patent are provided for context, illustrating potential areas where integrated record governance may extend functionality beyond centralized aggregation.

Blockchain-Supported Validation for Metadata Alignment

Some configurations described herein may reconcile TMR values, PI values, or AP identifier values against jurisdiction-maintained datasets by retrieving data from public record repositories and cross-referencing with recorded instruments. These reconciliations may occur using canonicalized cryptographic digests stored within blockchain ledgers and aligned using schema-matching models. This approach may support real-time or near real-time validation during pre-recordation workflows.

Anomaly Detection and Predictive Prioritization

Machine learning models, geospatial overlays, and risk-based scoring engines may be used to identify and prioritize metadata irregularities-including duplicate AP identifier values, missing permits, or inconsistencies in property boundaries. These tools may support proactive reconciliation before title issuance or lien registration, enhancing stakeholder trust and transaction reliability.

Audit Logging and Compliance Review at Scale

Some embodiments may record compliance checkpoints, metadata discrepancies, and escalation paths within a tamper-evident ledger structure. These entries may document interactions involving regulatory agencies, title professionals, or property owners, helping to reduce ambiguity and improve efficiency in real estate workflows. Support for fields containing TMR values, PI values, and AP identifier values may be embedded within broader audit mechanisms, including canonicalized cryptographic digest entries where applicable.

System-Level Advantages and Stakeholder Confidence

Many existing systems focus on address-matching or static data presentation. The subject matter described herein may enable multi-jurisdiction reconciliation of property metadata through distributed ledger infrastructure, canonicalized cryptographic digest generation, ZKP-based verification, ECDSA-secured ledger operations, anomaly detection, and workflow automation. These approaches support transparency, operational scale, and defensible chain-of-title continuity, aligning with the architecture illustrated in FIGS. 1-12.

16. Patented Systems—Contextual Reference to U.S. Pat. No. 10,074,145 B2

Overview of U.S. Pat. No. 10,074,145 B2

U.S. Pat. No. 10,074,145 B2 (application Ser. No. 15/610,274), titled "Methods for the Transformation of Complex Zoning Codes and Regulations to Produce Usable Search," discloses a system for converting municipal zoning ordinances into structured, machine-readable formats. This technology may facilitate tasks such as zoning rule analysis, site suitability assessments, and visualization of development parameters for planning and entitlement workflows. References to this patent are provided for context and do not represent any concession regarding scope, validity, or relevance as prior art under 35 U.S.C. §§ 102 or 103.

Limitations in Property Metadata Integration and Record Traceability

While the referenced system may enhance accessibility of zoning regulations, it does not appear to support validation or reconciliation of parcel-specific metadata-such as building permits, zoning approvals, property ownership histories, or metadata fields comprising TMR values, PI values, or AP identifier values. These elements, when unverified or not cross-referenced, may introduce non-uniformities into downstream recordkeeping or transaction workflows. The subject matter described herein may address such challenges by aligning metadata reconciliation processes with recognized datasets.

Blockchain Validation Framework for Property Metadata

In some implementations, the disclosed system may apply a blockchain-backed framework that generates and stores canonicalized cryptographic digests for verified metadata—including TMR values, PI values, and AP identifier values—alongside associated documents such as building permits, tax assessments, or occupancy records. A records acquisition module may retrieve jurisdiction-maintained data for cross-referencing, with schema matching and anomaly detection tools identifying inconsistencies. These tools are designed to support metadata accuracy and auditability.

Anomaly Identification and Predictive Risk Management

Machine learning techniques and geospatial overlays may be used to detect irregularities in boundary delineations, metadata structure, or missing approvals. Predictive scoring algorithms may assign priority to these anomalies for stakeholder review. These capabilities may operate upstream of zoning interpretation and are provided for reference relative to the functionality described in U.S. Pat. No. 10,074,145 B2.

Automated Compliance Review and Ledger-Based Documentation

In some approaches, compliance workflows may automatically validate building and zoning documents in relation to recognized jurisdictional guidelines. Tamper-evident blockchain-based audit logs, including canonicalized cryptographic digest entries where applicable, may record review events, deadlines, and unresolved inconsistencies. This structure can supplement zoning translation platforms by maintaining verified metadata aligned with property records.

Interoperability and Record Governance Support

The subject matter described herein may unify zoning data translation with broader record governance protocols—including metadata verification, canonicalized cryptographic digest generation, ZKP-based verification, ECDSA-secured ledger operations, jurisdiction-aware compliance, and anomaly flagging—through integrated, blockchain-secured infrastructure. By linking zoning-related information with validated property data, the system may improve operational transparency, reduce error propagation, and support stakeholder trust. These configurations align with FIGS. 1-12 and are not limited to any specific zoning framework or application domain.

17. Patented Systems—Contextual Analysis of U.S. Pat. No. 11,567,904 B2:

Overview of U.S. Pat. No. 11,567,904 B2

U.S. Pat. No. 11,567,904 B2 (application Ser. No. 16/864,581), titled "Distributed Ledger Systems and Methods for Importing, Accessing, Verifying, and Comparing Documents," describes a decentralized system using cryptographic hashing to support document verification. While this system may enhance document integrity in general workflows, it does not appear to apply to real estate-specific metadata reconciliation involving TMR values, PI values, or AP identifier values, or to verification of property records such as zoning applications, building permits, or ownership histories. References to U.S. Pat. No. 11,567,904 B2 are included for technical comparison and do not limit or disclaim the scope of the present disclosure.

Metadata Reconciliation in Domain-Specific Workflows

Although the referenced patent introduces distributed ledger security concepts, it does not address reconciliation of property-related metadata with jurisdiction-maintained datasets. Some configurations described herein may apply blockchain-based data alignment tools, canonicalized cryptographic digest generation, schema matching models, and AI-based validation techniques to identify and resolve discrepancies in zoning records, ownership documentation, and permit histories.

Dynamic Anomaly Detection and Early Irregularity Identification

The approaches described herein may incorporate adaptive anomaly detection using machine learning, geospatial data overlays, and metadata clustering techniques. These tools may identify variances such as non-uniform TMR value formats, ambiguous boundary descriptions, or duplicate parcel identifier values earlier in the record lifecycle. These implementations provide additional dynamic detection mechanisms beyond the more static validation described in U.S. Pat. No. 11,567,904 B2.

Configurable Compliance and Jurisdictional Monitoring

Unlike generic document verification systems, the subject matter described herein may include rule-based workflows for validating fields containing TMR values, PI values, or AP identifier values against applicable jurisdictional statutes or administrative timelines. These workflows may escalate flagged issues, monitor zoning or occupancy statuses, and maintain tamper-evident audit trails including canonicalized cryptographic digest entries where applicable for cross-agency reporting and resolution.

Blockchain-Based Record Review Architecture

In some embodiments, the system may incorporate a permissioned ledger for logging canonicalized cryptographic digests of real estate metadata and related records. These entries may be compared against official registries to assist with verifying historical lineage, detecting unauthorized changes, or reinforcing trust in transactional records.

AI-Powered Risk Classification and Visualization Tools

Machine learning classifiers may evaluate property metadata integrity across various parameters, such as permit completeness, identifier distinctness, or zoning alignment. Visualization layers may present risk heatmaps or flagged record summaries, supporting decision-making by lenders, regulators, or other involved parties. These tools add intelligence to compliance and review processes.

Cross-Jurisdiction Audit Logging and Distributed Oversight

Blockchain-anchored audit mechanisms may log metadata validation checkpoints and record digitally signed and timestamped review steps, including ECDSA-secured ledger operations or canonicalized cryptographic digest entries where applicable. These records may support distributed compliance coordination across municipalities, counties, or regulatory agencies, promoting structured oversight and transparency in multi-stakeholder contexts.

Summary of Real Estate Metadata Reconciliation Features

The subject matter described herein may integrate distributed ledger verification, canonicalized cryptographic digest generation, ZKP-based verification, ECDSA-secured ledger operations, adaptive anomaly detection, and jurisdictionally aware compliance workflows to address metadata discrepancies in real estate transactions. In addition to document verification functionality, the system supports structured property metadata management with traceability, auditability, and proactive error resolution. These capabilities are visualized in FIGS. 1-12.

18. Patented Systems—Contextual Reference to U.S. Pat. No. 10,248,731 B1

Overview of U.S. Pat. No. 10,248,731 B1

U.S. Pat. No. 10,248,731 B1 (application Ser. No. 14/713,663), titled "System and Method for Linking Data Records for Parcels," describes techniques for organizing and indexing parcel-related data through address-based relationships. While these indexing methods may assist with retrieval tasks, the referenced system does not appear to validate or reconcile parcel-specific metadata—such as TMR values, PI values, or AP identifier values—against jurisdiction-maintained records, including building or zoning permit applications, approved permit logs, or ownership history documents. References to this patent are included to contextualize prior efforts and do not disclaim or limit the scope of the present disclosure.

Metadata Reconciliation with Jurisdictional Datasets

Although address-based linking may support access to property-related records, it may not resolve metadata non-uniformities unless fields such as TMR values, PI values, or AP identifier values are actively validated against recognized datasets. The present subject matter may address this by incorporating real-time reconciliation between jurisdictionally maintained data sources and public filings using blockchain-based validation, canonicalized cryptographic digest generation, ZKP-based verification, or ECDSA-secured ledger operations in some implementations, supporting increased confidence in property record accuracy.

Chain-of-Title Continuity and Structured Validation

Where validation of metadata is deferred or absent, errors may propagate unnoticed until late in transactional workflows. In some implementations, the subject matter described herein may perform early reconciliation of data comprising TMR values, PI values, or AP identifier values using structured comparisons across private and public record systems, thereby supporting transparency in ownership history and reducing downstream inconsistencies.

Adaptive Reconciliation and Metadata Alignment

The described approaches may include modular tools that compare TMR values, PI values, or AP identifier values across building permits, zoning approvals, tax records, and recorded ownership documents. These comparisons may assist with anomaly detection prior to final recordation. Such implementations may function independently from or alongside address-based indexing techniques.

AI-Supported Discrepancy Scoring and Spatial Analysis

In some implementations, machine learning and geospatial analytics may be used to detect irregularities, such as missing metadata, conflicting zoning references, or duplicate identifier values. These tools may generate predictive risk scores to assist stakeholders—including assessors, title agents, and public administrators—in prioritizing records for further review.

Compliance-Linked Workflows and Ledger-Based Audit Logging

Compliance workflows may support review of metadata fields in accordance with applicable regulatory frameworks. In some configurations, audit checkpoints and validation results may be stored in a tamper-evident, distributed ledger format as ledger entries that may include canonicalized cryptographic digests, ZKP-based verification results, or ECDSA-secured ledger operations where applicable to enhance transparency, traceability, and dispute resolution.

Ledger-Based Metadata Management Across Systems

Metadata fields—such as TMR values, PI values, or AP identifier values—and their linked records may be stored as canonicalized cryptographic digest entries in a permissioned or distributed ledger. This framework may support integration across jurisdictions and private entities, providing a means to verify metadata alignment across independent systems.

Dynamic Real Estate Metadata Evaluation in Distributed Contexts

The disclosed system may operate across multi-jurisdictional environments to evaluate and reconcile metadata in near real-time. Using adaptive modules, machine learning analytics, tamper-evident audit trails, canonicalized cryptographic digest generation, ZKP-based verification, and ECDSA-secured ledger operations, the framework may help stakeholders monitor metadata alignment over time. These features are illustrated in FIGS. 1-12 and may enhance operational transparency and accuracy in property-related data management.

19. Patented Systems—Contextual Comparison to Patent Application No. WO2019033090A1

Overview of Patent Application No. WO2019033090A1

The subject matter described herein may reference concepts found in WO2019033090A1 (from application Ser. No. 16/637,828), titled "Distributed Ledger Based System and Method for the Settlement and Transfer of Title to Real Estate." This application discloses a system using distributed ledgers and spatial models (e.g., centroid and altitude data) to define parcel boundaries and support digital title transactions. While the geometry-driven model may assist in spatial representation, it does not appear to incorporate structured validation of metadata fields—such as TMR values, PI values, or AP identifier values—nor does it describe verification processes for property-related documents such as zoning permits, building logs, or historical ownership records. Any mention of WO2019033090A1 is provided as background context and does not disclaim or limit the present subject matter.

Cross-Referencing and Metadata Reconciliation

Although WO2019033090A1 includes transparency-enhancing ledger techniques, it does not appear to implement reconciliation protocols involving jurisdiction-maintained property records. Some configurations described herein may include modules that align metadata fields—including TMR values, PI values, or AP identifier values—with recognized datasets using blockchain-based validation, canonicalized cryptographic digest generation, ZKP-based verification, or ECDSA-secured ledger operations in some implementations to improve ownership lineage tracking and regulatory integration.

Metadata-Driven Multi-Jurisdiction Coordination

While geometric data may aid in spatial delineation, metadata fields often differ across jurisdictions. The approaches described herein may support cross-jurisdiction coordination by aligning geospatial information with TMR values, PI values, or AP identifier values and jurisdiction-specific records. These configurations may support improved reconciliation in regions with diverse land management protocols.

Ledger-Based Metadata Validation and Storage

In some implementations, metadata records—such as parcel identifier values, building permits, or zoning approvals—may be represented by canonicalized cryptographic digests and stored within a distributed ledger. This framework may allow for structured metadata tracking and support alignment between public land records and internal data environments.

Document Acquisition and Regulatory Verification

The described system may incorporate modules for obtaining zoning approvals, tax records, deeds, liens, and building permits from public or government-maintained systems. These documents may be cross-referenced with internal records to support metadata validation and traceability. Outcomes from validation events may be documented and made accessible for stakeholder reference.

AI-Supported Discrepancy Identification and Risk Scoring

Machine learning and geospatial overlays may assist with identifying metadata irregularities, including conflicting parcel boundaries, record duplication, or misaligned identifier values. Risk scoring outputs may help prioritize resolution during workflows such as land use review, loan underwriting, or title insurance evaluation.

Automated Compliance Workflows and Ledger-Based Logging

In some implementations, automated routines may track metadata compliance related to zoning and property verification milestones. Tamper-evident blockchain-based audit logs can preserve verification activity with canonicalized cryptographic digest entries, cryptographic signatures, timestamps, or ECDSA-secured ledger operations where applicable, enhancing accountability across regulated or institutional processes.

Distinction from Geometry-Focused Models

While WO2019033090A1 focuses primarily on spatial delineation, the subject matter described herein may expand system capabilities to include metadata validation, cross-jurisdiction record integration, anomaly detection, and audit-ready compliance workflows. These complementary approaches do not disclaim geometric models but serve to broaden their functional breadth.

Scalable Property Data Governance Across Jurisdictions

The present system may facilitate real estate metadata alignment and validation across diverse regulatory frameworks through modular reconciliation engines, AI-supported analysis, distributed ledger structures, canonicalized cryptographic digest generation, ZKP-based verification, ECDSA-secured ledger operations, and tamper-evident blockchain recordkeeping. These capabilities are reflected in FIGS. 1-12 and are designed for interoperability and extensibility in complex data environments.

20. Patented Systems—Contextual Reference to U.S. Patent Application No. US20200111068A1

Overview of U.S. Patent Application No. US20200111068A1

U.S. Patent Application No. US20200111068A1 (application Ser. No. 16/704,017), titled "Title Registration System and Protocol," describes a blockchain-based platform intended to support asset title registration workflows—such as those used for gemstones—via tamper-evident asset identifiers. While the system introduces protocols that may facilitate traceability in select asset domains, it does not appear to address reconciliation of real estate-specific metadata, such as TMR values, PI values, or AP identifier values, or cross-referencing of such identifiers against zoning, permitting, or ownership history documentation. This reference is presented for illustrative context and does not disclaim or narrow the scope of the present disclosure.

Metadata Challenges in Property-Specific Record Contexts

The approach described in US20200111068A1 emphasizes static asset identifier values but does not appear to integrate jurisdiction-aware validation tools capable of aligning real estate-specific metadata across regulatory records. For real property contexts, the subject matter described herein may provide additional layers of metadata alignment, jurisdictional traceability, and compliance review, addressing complexities often encountered in real estate governance and ownership transitions.

Distributed Ledger Configurations for Lifecycle Metadata Validation

In some implementations, the described system may apply a blockchain-based architecture that supports authentication, validation, and structured reconciliation of TMR values, PI values, or AP identifier values using canonicalized cryptographic digest generation, ZKP-based verification, ECDSA-secured ledger operations, or tamper-evident blockchain recordkeeping in some implementations. These identifier values may be linked with government-issued regulatory records and monitored throughout property transaction workflows. Machine learning-enabled models may assist in identifying discrepancies, irregular property boundaries, or conflicting metadata entries.

Geospatial Evaluation and Compliance-Linked Reconciliation

In some configurations, the metadata validation process may incorporate zoning and planning policies into automated workflows. Visual or geospatial overlays can assist in evaluating whether recorded metadata aligns with geographic or jurisdiction-specific parameters. These reconciliation tools may operate alongside compliance monitoring modules, providing broader operational coverage than static title platforms.

Real-Time Detection and Stakeholder Coordination

The system may also include real-time anomaly detection, metadata verification scoring, and escalation mechanisms that alert stakeholders to potential irregularities in records, including mismatches in parcel identifier values, missing permit associations, or ownership lineage gaps. These capabilities may be configured to activate before or in parallel with formal recordation, enhancing transparency and early issue resolution.

Structured Metadata Validation Across Transaction Phases

The subject matter described herein may employ a Meta-data Reconciliation Engine to cross-verify TMR values, PI values, or AP identifier values across property records associated with both a first owner of record and a last owner of record. These verification steps may be recorded in tamper-evident ledgers using canonicalized cryptographic digest entries, ZKP-based verification results, or ECDSA-secured ledger operations where applicable to support review, compliance, and downstream auditing. These configurations align with the architectural framework described in FIGS. 1-12 and are presented to demonstrate enhancements over generalized title registration systems.

21. Patented Systems—Contextual Reference to U.S. Patent Application No. US20210319059A1

Overview of U.S. Patent Application No. US20210319059A1

The subject matter described herein may reference concepts disclosed in U.S. Patent Application No. US20210319059A1 (application Ser. No. 17/228,360), titled "System and Method for Geocoding," which outlines a method for generating geographically relevant identifiers using parcel data, georeferenced imagery, and descriptive property attributes. While the geocoding techniques described may contribute to improved spatial precision, the referenced system does not appear to perform reconciliation of real estate metadata fields—such as TMR values, PI values, or AP identifier values—with jurisdiction-maintained documents, including building permits, zoning applications, or ownership histories. Any mention of US20210319059A1 is included for background context and is not intended to limit or disclaim any aspect of the subject matter disclosed herein.

Metadata Reconciliation and Multi-Source Validation

The system described herein may include functionality for iterative metadata validation, comparing fields such as TMR values, PI values, or AP identifier values across data sources, including zoning records, tax filings, and ownership documentation using blockchain-based validation, canonicalized cryptographic digest generation, ZKP-based verification, or ECDSA-secured ledger operations in some implementations. These reconciliation workflows may assist in resolving inconsistencies and improving metadata alignment in a manner that does not prescribe a single document format or data hierarchy. US20210319059A1 appears focused on spatial resolution and may not address metadata verification across jurisdictional records.

Real-Time Anomaly Detection and Governance Features

While geocoding techniques improve location granularity, they may not identify anomalies in real estate transaction data or ownership lineage. In some implementations, the subject matter described herein may support real-time anomaly detection, including automated monitoring for missing or conflicting parcel identifier values. These tools may facilitate earlier detection of metadata issues, thereby reducing downstream disruption in title transfers or permit workflows.

Ledger-Based Auditability and Predictive Prioritization

In some embodiments, canonicalized cryptographic digest generation may be used to store metadata fields comprising TMR values, PI values, or AP identifier values within distributed ledger systems. These records may be accessed to verify data provenance or detect unauthorized changes. Predictive scoring models, supported by AI, may also be used to rank the potential impact of metadata discrepancies, providing stakeholders with decision support tools that are complementary to spatial mapping systems.

Automated Compliance Pathways and Process Logging

The system may include configurable compliance workflows tailored to local or multi-jurisdictional frameworks. These may trigger escalation of unresolved metadata issues or log validation checkpoints using a tamper-evident blockchain audit trail, including canonicalized cryptographic digest entries, ZKP-based verification results, or ECDSA-secured ledger operations where applicable. These process enhancements are designed to augment—not replace—existing administrative protocols and offer optional automation tools to streamline conformance tasks.

Cross-Jurisdiction Data Governance for Real Estate Records

In selected implementations, the subject matter described herein may assist in harmonizing metadata records across regulatory boundaries by applying modular AI detection, cross-referenced validation, canonicalized cryptographic digest generation, ZKP-based verification, ECDSA-secured ledger operations, and real-time reconciliation tools. These configurations may enhance metadata quality and transparency for fields containing TMR values, PI values, or AP identifier values and may operate across institutional or geographic boundaries. The examples and features described herein correspond to, but do not limit, the subject matter illustrated in FIGS. 1-12.

22. Patented Systems—Contextual Reference to U.S. Pat. No. 11,277,260 B2

Overview of U.S. Pat. No. 11,277,260 B2

U.S. Pat. No. 11,277,260 B2 (application Ser. No. 16/573,865), titled "Off-chain Notification of Updates from a Private Blockchain," discloses a system that facilitates communication between private blockchain networks and external applications via off-chain notification protocols. These mechanisms may enhance general responsiveness in data synchronization environments. The disclosed system does not appear to validate real estate-specific metadata—such as TMR values, PI values, or AP identifier values—nor does it reconcile property data against jurisdiction-maintained sources. This reference is included for background context and does not limit or disclaim any aspect of the subject matter described herein.

Real Estate Metadata Alignment and Risk Management

Although the referenced system provides update notifications to external stakeholders, it does not appear to include verification or reconciliation of real estate-specific metadata fields across public datasets. As a result, property-related discrepancies—such as unauthorized modifications or incorrect parcel identifier values—may not be identified or mitigated. The system described herein may include cross-referenced metadata validation, tamper-evident blockchain-secured records, canonicalized cryptographic digest generation, ZKP-based verification, ECDSA-secured ledger operations, and AI-enabled anomaly detection tools tailored for use in real estate transaction workflows.

Regulatory and Interoperability Considerations

The emphasis in U.S. Pat. No. 11,277,260B2 on private blockchain environments may limit interoperability with government or jurisdictional property datasets and may not offer automated compliance checks. Some implementations described herein may enable dynamic verification of property metadata fields against zoning, permitting, and ownership documentation, providing a foundation for enhanced transparency, traceability, and cross-jurisdictional alignment.

Traceability and Metadata Continuity

In selected configurations, the disclosed system may store canonicalized cryptographic digest records containing TMR values, PI values, or AP identifier values in distributed ledgers and periodically verify their alignment with authenticated sources. Real-time validation and structured reconciliation of metadata fields may assist in sustaining chain-of-title and chain-of-custody documentation. These features are presented as complementary to, and more domain-specific than, generalized update notification frameworks.

Stakeholder-Centric Verification Tools

The described system may provide verification access for stakeholders such as property owners, regulatory agencies, and financial institutions through records authenticated using canonicalized cryptographic digests, ZKP-based verification, ECDSA-secured ledger operations, or tamper-evident blockchain recordkeeping. These mechanisms promote trust in the validity of associated property documents, offering enhanced assurance compared to broader off-chain alert systems not designed for transactional real estate integrity.

Anomaly Detection and Escalation Protocols

AI-driven anomaly models may detect boundary discrepancies, mismatches in permit data, or duplicate TMR values and classify them by risk potential. Escalation pathways may notify relevant stakeholders, enabling timely intervention. These proactive measures extend beyond passive update systems and support stronger oversight in property metadata governance.

Compliance Workflow Automation and Auditability

The system may also incorporate compliance routines that track statutory milestones and flag unresolved issues, maintaining a tamper-evident audit log, including canonicalized cryptographic digest entries where applicable, across jurisdictions. These workflows support accountability, reduce risk exposure, and assist in multi-agency collaboration for record validation and oversight.

Integrated Real Estate Data Governance Architecture

Together, the described features offer a modular framework for managing real estate metadata accuracy, from validation through compliance and anomaly detection. Unlike the off-chain notification structure described in U.S. Pat. No. 11,277,260 B2, the present system may apply domain-specific reconciliation of metadata comprising TMR values, PI values, and AP identifier values using canonicalized cryptographic digest generation, ZKP-based verification, ECDSA-secured ledger operations, or tamper-evident blockchain recordkeeping in some implementations, supporting the technical framework outlined in FIGS. 1-12. These configurations are designed for scalable, adaptable use across complex, multi-jurisdictional real estate environments.

23. Patented Systems—Contextual Reference to U.S. Pat. No. 11,373,257 B1

Overview of U.S. Pat. No. 11,373,257 B1

U.S. Pat. No. 11,373,257 B1 (application Ser. No. 16/198,665), titled "Artificial Intelligence-Based Property Data Linking System," describes a platform for organizing and visualizing property information through AI-driven linking of datasets from multiple sources. While the system may assist with general harmonization of real estate records, it does not appear to validate relevant metadata fields-such as TMR values, PI values, or AP identifier values-against jurisdiction-maintained sources, nor does it reconcile such identifier values with building or zoning permit applications, approved permits or logs, property ownership histories, or tax data: References to U.S. Pat. No. 11,373,257 B1 are included for contextual purposes and do not limit the scope of the present disclosure.

Metadata Traceability and Tamper-Evident Validation

Although AI linking can improve access to property data, the referenced system does not appear to incorporate blockchain-based reconciliation or verification of TMR values, PI values, or AP identifier values with public records. In the absence of tamper-evident structures, property metadata may be more vulnerable to undetected inconsistencies or falsified updates. Some implementations described herein may utilize canonicalized cryptographic digest generation, ZKP-based verification, ECDSA-secured commit operations, or tamper-evident blockchain recordkeeping to establish tamper-evident audit trails that promote secure, verifiable chains of title and metadata lineage.

Proactive Blockchain-Based Metadata Reconciliation

The subject matter described herein may implement distributed ledger frameworks configured to cross-verify metadata fields comprising TMR values, PI values, and AP identifier values against building permits, zoning approvals, and recorded ownership documents. These records may be acquired from jurisdiction-maintained repositories and represented by canonicalized cryptographic digests recorded in a blockchain ledger to support real-time metadata alignment and dispute mitigation. This approach differs from static AI linking by enabling dynamic validation of data authenticity across transactional stages.

Anomaly Detection and Predictive Risk Evaluation

Machine learning and geospatial analytics may be used to detect metadata irregularities such as duplicate parcel entries, incomplete permit trails, or altered boundaries. Predictive scoring algorithms may assign risk profiles to flagged anomalies and support stakeholder decision-making prior to formal recordation or transaction completion. These proactive methods may reduce exposure to legal or regulatory issues and go beyond visualization-focused frameworks.

Automated Compliance Monitoring and Escalation Support

In some embodiments, compliance workflows may use natural language processing (NLP) and optical character recognition (OCR) to extract metadata from scanned or digital records. These values may be validated against relevant jurisdiction-specific protocols, and anomalies may be escalated automatically based on risk priority or statutory timelines. Compared with the data-linking framework described in U.S. Pat. No. 11,373,257 B1, this approach may enable greater adaptability for multi-jurisdictional governance.

Blockchain-Based Tamper-Evident Validation and Record Security Cryptographically secured entries may provide tamper-evident validation of property metadata fields by creating blockchain ledger records. These ledgers may store canonicalized cryptographic digest records corresponding to TMR values, PI values, and AP identifier values along with cross-referenced zoning and ownership documentation. This recordkeeping approach offers traceability and authenticity safeguards not addressed in the system described in U.S. Pat. No. 11,373,257 B1.

Operational Transparency and Enhanced Record Management

Collectively, the described system may extend real estate data management functionality by combining AI anomaly detection, metadata reconciliation, blockchain validation, canonicalized cryptographic digest generation, ZKP-based verification, and ECDSA-secured commit operations. These mechanisms may support the claims of the present disclosure, reduce operational inefficiencies, and assist in delivering scalable, transparent solutions for title, permit, and compliance workflows across diverse regulatory environments.

24. Patented Systems—Contextual Reference to U.S. Pat. No. 10,121,215 B2

Overview of U.S. Pat. No. 10,121,215 B2

U.S. Pat. No. 10,121,215 B2 (application Ser. No. 14/811,234), titled "Systems and Methods for Managing Real Estate Titles and Permissions," discloses a system for managing access to electronic devices linked to physical properties using boundary-based permission protocols. While this architecture may support digital control in smart environments, it does not appear to validate real estate-specific metadata such as TMR values, PI values, or AP identifier values. Nor does it integrate official records—including land development permits, zoning approvals, ownership histories, or tax filings-into a reconciliation workflow. Any mention of U.S. Pat. No. 10,121,215 B2 is offered solely for contextual comparison and does not limit or disclaim the scope of the present disclosure.

Metadata Validation and Record Integrity Considerations

Although the referenced system provides boundary-based access control, it does not appear to include mechanisms to cross-reference real estate metadata against jurisdiction-maintained datasets. In such cases, TMR values, PI values, or AP identifier values may remain unverified, increasing the potential for errors, misalignment, or unauthorized changes. The absence of tamper-evident safeguards further limits traceability of title lineage or property-related records. The system described herein may address these challenges through secure reconciliation tools, canonicalized cryptographic digest generation, ZKP-based verification, ECDSA-secured ledger operations, and real-time metadata validation workflows.

Tamper-Evident Reconciliation and Metadata Oversight

The architecture described in U.S. Pat. No. 10,121,215 B2 does not appear to include tamper-evident metadata structures or ongoing reconciliation of official property data. In some implementations, the subject matter described herein may support validation of property-related metadata—including TMR values, PI values, and AP identifier values—using tamper-evident ledger records, including canonicalized cryptographic digest entries where applicable. This configuration may assist in maintaining uniform metadata alignment across administrative and transactional systems.

Blockchain-Enabled Auditability for Real Estate Metadata

To support improved traceability, the subject matter described herein may implement canonicalized cryptographic digest generation and permissioned ledger systems to monitor changes to property records. Metadata fields may be validated against government-sourced zoning and permit databases. This approach supports secure, auditable metadata lifecycles and may operate in conjunction with other title management systems to increase confidence in recorded information.

Anomaly Detection and Predictive Governance Tools

Machine learning models and geospatial analytics may assist in identifying property record anomalies such as non-uniform boundary data, missing permit references, or duplicate parcel identifier values. These anomalies may be scored for risk and used to trigger stakeholder notifications. These features may offer functional improvements beyond the boundary-access methods disclosed in U.S. Pat. No. 10,121,215 B2.

Compliance Workflow Automation Across Jurisdictions

Automated workflows may also be implemented to assist with compliance review tasks by extracting metadata through natural language processing (NLP) and optical character recognition (OCR). Events such as missed deadlines or unverified data may be escalated and logged in a tamper-evident blockchain-based audit system, including canonicalized cryptographic digest entries, ZKP-based verification results, or ECDSA-secured ledger operations where applicable. These workflows may assist agencies, lenders, and other stakeholders in reducing error exposure across multi-jurisdictional environments.

Secure Metadata Reconciliation Supporting Real Estate Transactions

Overall, the system described herein may deliver improvements over permission-based access systems by providing domain-specific metadata validation, predictive anomaly detection, tamper-evident blockchain-secured compliance logging, canonicalized cryptographic digest generation, ZKP-based verification, and ECDSA-secured commit operations. These features collectively align with the system functionalities described in FIGS. 1-12 and may assist in supporting secure, transparent, and reliable real estate workflows.

25. Patented Systems—Contextual Reference to U.S. Patent Application No. 20180268504A1 and Related Patents Overview of U.S. Patent Application No. 20180268504A1

U.S. Patent Application Publication No. 20180268504A1 (application Ser. No. 15/459,061), titled "Indexing Mortgage Documents via Blockchains," describes a system for enabling auditors to trace mortgage document histories using hashed data stored on a tamper-evident blockchain ledger. While such indexing may improve document accessibility and auditing, it does not appear to validate or reconcile core real estate metadata—such as TMR values, PI values, or AP identifier values—nor does it cross-reference government-issued records, such as zoning permits, building approvals, or property ownership histories. This reference is presented for comparative context and does not limit the present disclosure.

Analysis of U.S. Pat. No. 7,945,495 B2

U.S. Pat. No. 7,945,495 B2, titled "Integrated On-line System for Identifying and Valuing Foreclosure Properties," introduces a centralized platform for foreclosure-related notices. While this system supports foreclosure processing, it does not include tamper-evident data protection or ongoing metadata reconciliation across validated property datasets. TMR values, PI values, or AP identifier values are not cross-verified using blockchain or public repositories, which may reduce visibility into ownership changes or property record anomalies.

Contextual Review of AU US2017101089A4

Australian Patent No. 2017101089A4 discloses a geospatial system for land parcel visualization and filtering based on regional planning inputs. While useful for geographic and visual analytics, it does not appear to provide blockchain-backed metadata reconciliation or mechanisms for maintaining synchronized metadata fields across distributed property registries.

Considerations on U.S. Pat. No. 10,885,597 B1

U.S. Pat. No. 10,885,597 B1 facilitates aggregation of property records, such as permits and regulatory approvals. The system described in that patent does not appear to reconcile inconsistencies among those records, nor does it employ blockchain-supported verification or AI-driven anomaly detection. These missing components may limit reliability in unauthorized-activity detection or early error resolution.

Overview of U.S. Pat. No. 11,593,901 B2

U.S. Pat. No. 11,593,901 B2 describes a permissioned blockchain for storing property ownership data. The patent does not appear to describe ongoing reconciliation of TMR values, PI values, or AP identifier values or dynamic anomaly detection based on regulatory datasets. Static validation alone may leave metadata discrepancies unresolved in evolving real estate environments.

Present System's Reconciliation and Traceability Features

The system described herein may include a framework to acquire and reconcile both government-issued and publicly recorded property documents, such as zoning permits, deed records, and tax documentation, including through a public-record acquisition subsystem in some implementations. Metadata such as TMR values, PI values, or AP identifier values may be represented by canonicalized cryptographic digests and recorded in a blockchain ledger to form tamper-evident chains-of-title and custody. This supports real-time data alignment and traceability across registry systems.

Real-Time Validation with Enhanced Security Features

Cryptographic consensus and AI-powered detection models may be employed to ensure that boundary changes, duplicated identifiers, or erroneous metadata entries are flagged before being adopted into broader datasets. This proactive security model may increase transparency and reduce exposure to data irregularities or potentially unauthorized activity.

Anomaly Detection Using AI and Geospatial Overlays

In some implementations, machine learning, image recognition, and reinforcement learning may be used to analyze permit data, parcel dimensions, and building survey maps. Anomalies may be scored by severity and escalated to stakeholders for timely resolution, helping prevent corrupted metadata from affecting downstream workflows.

Workflow Automation for Compliance Across Jurisdictions

Compliance routines may be automated to monitor property metadata activity, validate permits, and ensure updates conform to jurisdictional statutes. These activities may be logged in tamper-evident distributed ledgers, including canonicalized cryptographic digest entries where applicable, enabling audit transparency while reducing manual administrative demands.

Scalable and Proactive Governance Architecture

Taken together, the described system addresses several limitations noted in prior references—by uniting blockchain-secured validation, canonicalized cryptographic digest generation, ZKP-based verification, ECDSA-secured commit operations, AI-based anomaly detection, and structured reconciliation of metadata comprising TMR values, PI values, and AP identifier values. These features align with FIGS. 1-12, offering flexible, proactive support for scalable and compliant real estate transaction workflows.

26. Patented Systems—Contextual Reference to Patent Application No. WO2023192304A1 Overview of Patent Application No. WO2023192304A1

Patent Application No. WO2023192304A1 (Application No. 2023/016,603), titled "Boundary-Based Property Identifiers," describes a system for generating property identifiers using spatial data such as geographic coordinates, topological features, and architectural diagrams. While this approach may enhance parcel identification by integrating geographic and cadastral inputs, it does not appear to emphasize validation or reconciliation of real estate metadata fields—such as TMR values, PI values, or AP identifier values—with jurisdiction-maintained documents, including zoning applications, permit logs, ownership histories, or tax filings. References to WO2023192304A1 are included for technical background and do not limit or disclaim the scope of the subject matter described herein.

Metadata Validation Across Recognized Records

Although the referenced system introduces property identifiers based on boundary geometry, it does not appear to include validation of core metadata against recognized data sources. The present system may include tools for reconciling metadata fields comprising TMR values, PI values, or AP identifier values with trusted external records-such as deeds, liens, permit documents, or foreclosure filings-helping to reduce errors and increase transparency throughout the transaction lifecycle.

Static Identifier Models Versus Dynamic Reconciliation

WO2023192304A1 appears to rely on static spatial identifiers that do not account for ongoing metadata reconciliation or real-time detection of discrepancies. Some implementations described herein may support dynamic monitoring and cross-referencing of TMR values, PI values, or AP identifier values, enabling earlier identification of unauthorized updates, non-uniform records, or boundary anomalies.

Blockchain-Based Metadata Alignment and Verification

The present system may include a blockchain-supported framework for tracking and validating metadata comprising TMR values, PI values, or AP identifier values. These fields may be periodically reconciled against jurisdiction-maintained datasets and represented by canonicalized cryptographic digests recorded in a tamper-evident blockchain ledger. This process may assist with maintaining accurate metadata chains and preserving traceability to historical property states.

Schema Matching and Anomaly Prioritization

In some implementations, schema-matching algorithms may be used to harmonize metadata fields across varying formats and jurisdictions. Anomaly detection routines may flag discrepancies based on cross-referenced values and assign scores to support prioritization. These features may reduce the risk of propagating unresolved inconsistencies in complex property workflows.

Tamper-Evident Infrastructure and Metadata Integrity

The disclosed system may implement canonicalized cryptographic digest generation to secure metadata and associated property records, creating tamper-evident chains-of-title and chains-of-custody. These audit trails may assist stakeholders—including title professionals, regulators, and financial institutions—in confirming metadata reliability and supporting transactional confidence.

AI-Driven Anomaly Detection with Geospatial Integration

The present framework may incorporate geospatial visualization and machine learning techniques to detect data anomalies, such as conflicting boundaries, missing permit documentation, or irregular identifier formats. These tools may support both reactive and proactive resolution strategies and enhance operational readiness.

Automated Compliance and Multi-Jurisdictional Oversight

Compliance workflows may be configured to validate zoning approvals, monitor regulatory timelines, and track metadata updates. Tamper-evident blockchain-anchored audit logs, including canonicalized cryptographic digest entries where applicable, may record escalation paths, verification actions, and regulatory interventions to promote oversight across local, state, or national frameworks.

Integrated Property Metadata Governance

Unlike WO2023192304A1, which focuses on geometric representation, the present system may provide a coordinated governance architecture for property metadata reconciliation. This includes automated detection, tamper-evident ledger-based auditability, canonicalized cryptographic digest generation, ZKP-based verification, ECDSA-secured commit operations, and jurisdictional record alignment, supporting traceable and scalable real estate data management.

Enhancing Accuracy, Transparency, and Operational Confidence

By combining dynamic metadata reconciliation, AI anomaly detection, distributed ledger validation, canonicalized cryptographic digest generation, ZKP-based verification, ECDSA-secured commit operations, and tamper-evident blockchain recordkeeping, the disclosed approaches may offer extended capabilities beyond those described in WO2023192304A1. These features align with the technical implementations outlined in FIGS. 1-12, and are intended to support accuracy, security, and transparency in property record workflows.

27. Non-Patented Solutions-Limitations of Simplifile LC LLC's eRecording System in Real Estate Metadata Validation and Regulatory Compliance Overview of Simplifile's eRecording Services Simplifile LC LLC provides an electronic recording (eRecording) platform designed to streamline submission, review, and recording of real estate documents. While this service improves operational efficiency—offering automated payment processing, expedited document submission, and jurisdiction-aware submission formats—it does not appear to validate foundational real estate metadata. For example, Simplifile's system does not reconcile TMR values, PI values, or AP identifier values against government-maintained datasets or publicly recorded instruments. Any mention of Simplifile LC LLC's platform is offered for contextual reference and does not limit or disclaim the subject matter disclosed herein.

Metadata Reconciliation and Verification Limitations

Although Simplifile's infrastructure may support more efficient recording workflows, it does not appear to verify TMR values, PI values, or AP identifier values against zoning applications, building permit records, tax documentation, or historical ownership records. If structured reconciliation is not implemented, metadata mismatches or unauthorized changes may go undetected, potentially affecting transaction accuracy and increasing exposure to risk in regulatory or litigation contexts.

Blockchain-Supported Reconciliation for Metadata Integrity

The present system may implement a blockchain-enabled framework that verifies property metadata against government and publicly recorded records. Through near real-time reconciliation of TMR values, PI values, or AP identifier values, the platform may maintain tamper-evident audit trails using canonicalized cryptographic digest generation, ZKP-based verification, ECDSA-secured ledger operations, or blockchain ledger recordation in some implementations to confirm data lineage and title accuracy. Unlike Simplifile's emphasis on processing efficiency, this approach emphasizes traceability, integrity, and continuous metadata alignment.

AI-Enabled Anomaly Detection and Predictive Analytics

Machine learning models and geospatial data overlays may support anomaly detection in real estate metadata, identifying boundary anomalies, permit irregularities, or mismatched identifier values before errors become entrenched. These predictive mechanisms provide additional functionalities beyond transactional systems that lack built-in unauthorized-activity detection or preemptive error prevention.

Metadata-Integrity Risk Mitigation and Regulatory Monitoring

The disclosed system may incorporate automated compliance workflows with integrated predictive risk scoring. This includes escalation mechanisms for unresolved discrepancies and tamper-evident audit logging, including canonicalized cryptographic digest entries where applicable, for statutory tracking. While the operational model used by Simplifile addresses some aspects of document recordation, the framework described herein may prioritize active metadata integrity management and unauthorized-activity risk mitigation through distributed, verifiable systems.

Comprehensive Metadata Governance Across Jurisdictions

The described implementation may support dynamic monitoring of property metadata across jurisdictions, integrating zoning, permit, tax, and ownership datasets. Blockchain-supported validation, canonicalized cryptographic digest generation, ZKP-based verification, and ECDSA-secured ledger operations may provide continuous oversight, reducing downstream conflicts and decreasing manual resolution efforts. While Simplifile's platform may have a narrower scope of metadata verification, the approach described herein can encompass additional datasets and functionalities.

Comparative Summary of Simplifile and Disclosed System

While Simplifile offers accelerated document recording, it does not appear to integrate blockchain-backed metadata validation, or AI-driven anomaly resolution. The subject matter described herein may augment data accuracy by cross-referencing multiple sources and, in some implementations, recording canonicalized cryptographic digests in a tamper-evident blockchain ledger, reducing the risk of erroneous or potentially unauthorized transactions.

Operational Transparency and Stakeholder Value

In some implementations, the described system may deliver real-time metadata validation and anomaly detection tools that benefit lenders, regulators, and property owners. Stakeholders may gain earlier visibility into data risks, enhancing due diligence, transaction readiness, and regulatory compliance.

Summary of System Benefits Relative to eRecording Platforms

Overall, the disclosed framework may provide enhanced real estate metadata governance by combining blockchain validation, canonicalized cryptographic digest generation, ZKP-based verification, ECDSA-secured ledger operations, machine learning detection, and compliance automation. These features support the technical subject matter described in FIGS. 1-12 and offer improvements beyond the scope of transactional eRecording services like those provided by Simplifile LC LLC.

28. Non-Patented Solutions—Limitations of Fidlar Technologies' Property Record Alert System in Real Estate Metadata Validation and Regulatory Compliance Overview of Fidlar Technologies' Property Record Alert System The subject matter described herein may reference functionalities offered by Fidlar Technologies' Property Record Alert system, which is designed to notify property owners when documents referencing their property are filed in public land records. While this alert mechanism may improve awareness of potentially unauthorized activity, it operates primarily in a reactive capacity-alerting users after recordation occurs. The system does not appear to incorporate pre-recording validation of property metadata fields such as TMR values, PI values, or AP identifier values, nor does it cross-reference foundational documents such as zoning permits, building logs, or property ownership histories. Any reference to Fidlar Technologies' services is provided for illustrative background and does not limit the subject matter described herein.

Observed Gaps in Pre-Recording Validation and Record Traceability Due to its post-recordation focus, Fidlar's system may not validate TMR values, PI values, or AP identifier values prior to document entry in public registries. If such fields are not reconciled against recognized records-such as zoning permits or ownership logs-metadata conflicts, unauthorized edits, or non-uniformities may propagate undetected. These limitations may result in higher dispute frequency, delayed issue resolution, or increased unauthorized-activity exposure during title transfers or property transactions.

Proactive Metadata Validation Through Blockchain Architecture

The present system may implement a blockchain-based architecture to perform real-time reconciliation of property metadata across both government-issued and publicly recorded sources. This includes validation of TMR values, PI values, and AP identifier values, as well as relevant permit and title data. Tamper-evident chains-of-title and chains-of-custody may be supported by canonicalized cryptographic digest generation, ZKP-based verification, ECDSA-secured commit operations, or blockchain ledger recordation in some implementations, helping to ensure data provenance and detect or deter unauthorized modifications.

Geospatial Analytics and AI-Driven Anomaly Detection

Machine learning models and geospatial tools may be integrated to monitor for irregularities in boundary records, ownership histories, or permit workflows. Predictive risk scoring may prioritize high-risk anomalies for stakeholder review. These enhancements offer early intervention capabilities that may not be provided by systems focusing on post-recording alerts.

Enhanced Unauthorized-Activity Detection and Regulatory Compliance The disclosed system may employ automated compliance workflows that escalate unresolved discrepancies and track regulatory timelines. Tamper-evident blockchain-anchored audit logs, including canonicalized cryptographic digest entries where applicable, may be used to preserve verification events and compliance status. Although Fidlar's system does not appear to include continuous unauthorized-activity detection, the approach described herein focuses on proactive data governance and lifecycle compliance.

Real Estate Record Lifecycle Management

This framework may offer a more comprehensive approach to property data management than reactive alert platforms. Through AI-supported metadata analysis, continuous reconciliation, canonicalized cryptographic digest generation, ZKP-based verification, ECDSA-secured commit operations, and blockchain-backed storage, the system may reduce risk exposure while promoting operational efficiency and transparency for property stakeholders.

Distinctions from Fidlar's Service Model

While Fidlar's Property Record Alert may improve document monitoring, it does not appear to include mechanisms for preemptive metadata validation or distributed auditability. The system described herein may supplement or improve upon such workflows by validating data across multiple sources and offering near real-time anomaly detection.

Benefits to Stakeholders and Real-Time Governance

Property owners, title professionals, regulators, and financial institutions may benefit from earlier detection of record inconsistencies, supported by predictive scoring and compliance automation. The integration of AI tools and tamper-evident blockchain-backed metadata logging, including canonicalized cryptographic digest entries where applicable, may reduce delays, increase audit transparency, and promote confidence in real estate transaction data.

Comparison and Summary

In summary, the subject matter described herein addresses limitations associated with reactive property record alert platforms by integrating real-time metadata validation, canonicalized cryptographic digest generation, ZKP-based verification, ECDSA-secured commit operations, automated anomaly detection, and tamper-evident recordkeeping.

These features align with the technical implementations illustrated in FIGS. 1-12, offering scalable, proactive tools for transparent and secure property record governance.

29. Non-Patented Solutions—Limitations of Document Technology Systems' AlertMe Program in Real Estate Metadata Validation and Compliance Overview of DTS' Post-Recordation Notification System The subject matter described herein may reference some features of Document Technology Systems' (DTS) AlertMe program, which is designed to notify property owners when public land records referencing their property or personal information are filed. While this service may support awareness of potentially unauthorized filings via post-recordation email alerts, it generally operates reactively and does not appear to perform validation of real estate metadata-such as TMR values, PI values, or AP identifier values-prior to public recordation. Nor does it appear to reconcile such metadata with zoning applications, permit records, or property ownership histories. Any mention of DTS' AlertMe system is provided for background context and does not disclaim or limit the scope of the present disclosure.

Reactive Workflows and Metadata Oversight Gaps

Due to its reliance on post-recordation notifications, DTS' system does not appear to incorporate mechanisms for verifying metadata fields before documents are entered into public land records. If cross-checking against jurisdiction-maintained sources does not occur, unverified TMR values, PI values, or AP identifier values may contribute to inconsistent ownership data, boundary inconsistencies, or undetected errors in public registries. This reactive posture may reduce traceability and delay dispute resolution.

Blockchain-Based Metadata Verification and Reconciliation

The present system may include blockchain-supported tools to reconcile property metadata against authenticated sources before public recordation. By validating TMR values, PI values, or AP identifier values and related data—such as land development permits, tax records, and ownership logs—the system may help establish chains-of-title and chains-of-custody that are tamper-evident and reliably traceable.

Tamper-Evident Record Structures and Auditability

In some embodiments, property metadata may be processed to generate canonicalized cryptographic digests and logged into a distributed ledger to support tamper-evident detection of unauthorized alterations or data loss. This infrastructure may improve transparency and provide stakeholders with verifiable assurance of data integrity. Compared to DTS' notification framework, this approach promotes record stability through verifiable, preemptive validation.

AI-Driven Anomaly Detection and Predictive Risk Scoring

Machine learning and geospatial analytics may detect anomalies-such as unrecorded boundary changes, duplicate identifiers, or non-uniform zoning history. Predictive risk scores may support prioritization of review tasks and escalate flagged entries before they impact transaction workflows. These features distinguish the disclosed subject matter from the more passive architecture of DTS' AlertMe program.

Compliance Monitoring and Unauthorized-Activity Detection Tools

The described system may also include automated compliance workflows capable of identifying metadata conflicts and tracking resolution deadlines. Blockchain-anchored audit logs may preserve verification events and support accountability for public and private sector stakeholders. DTS' platform does not appear to provide continuous unauthorized-activity monitoring or multi-jurisdictional compliance support.

Lifecycle Property Data Management and Early Risk Mitigation

By incorporating real-time reconciliation, anomaly detection, and tamper-evident audit trails, the disclosed system supports an end-to-end approach to metadata reliability. This infrastructure may reduce litigation risk and assist property professionals in resolving discrepancies prior to formal title issuance or financing milestones.

System Comparison and Value to Stakeholders

While DTS' AlertMe service contributes to record transparency, the system described herein may enhance real estate data governance by ensuring early-stage metadata validation. Stakeholders—including title agents, municipal authorities, and financial institutions—may benefit from earlier detection of issues and reduced exposure to risk.

Transactional Accuracy and Operational Efficiency

Near real-time verification of property records may streamline administrative review, expedite underwriting, and reduce manual corrections. By reducing reliance on retrospective alert mechanisms, the system may provide durable improvements in efficiency and confidence throughout the record lifecycle.

Governance Enhancement Beyond Notification Systems

Taken together, the described implementations may extend the utility of metadata management systems beyond post-recordation alerts by delivering proactive monitoring, cryptographic validation, and intelligent reconciliation tools. These configurations align with the architecture depicted in FIGS. 1-12 and the technical subject matter described herein.

Legal Scope and Contextual Use of AlertMe References

References to DTS' AlertMe platform are provided for contextual analysis of reactive metadata monitoring systems and do not limit, disclaim, or narrow the present disclosure.

30. Non-Patented Solutions—Limitations of the Title Lock Fraud Detection Service in Real Estate Metadata Validation and Compliance Overview of Title Lock's Post-Recording Monitoring Approach The subject matter described herein may reference functionalities associated with the Title Lock Fraud Detection Service (Reg. No. 4,921,876), which offers post-recordation alerts to notify property owners when deeds, liens, or other documents are filed against their properties. While this model may increase awareness of unauthorized filings, it generally functions reactively and does not appear to include pre-recordation validation of metadata—such as TMR values, PI values, or AP identifier values—against official or jurisdiction-maintained repositories. As a result, data discrepancies or potentially unauthorized filings may not be identified until after entry into the public record, which may lead to disputes, delays, or administrative complexity. References to Title Lock are provided for background and do not disclaim or limit the claimed subject matter.

Proactive Validation and Metadata Integrity

Although some notification-focused systems rely on reactive unauthorized-filing alert systems, the subject matter described herein may implement a blockchain-based architecture for verifying TMR values, PI values, or AP identifier values against authenticated sources prior to public recordation. Permit applications, ownership histories, and zoning approvals may also be reconciled. This real-time validation approach helps reduce the risk of unauthorized or inconsistent entries and promotes tamper-evident, traceable metadata chains.

Tamper-Evident Ledger and Lifecycle

Blockchain-backed logging may support verification that changes to property metadata are authenticated using canonicalized cryptographic digests and recorded in an auditable, tamper-evident manner to improve traceability and accountability. These features may assist stakeholders in identifying unauthorized modifications prior to public recordation, reducing reliance on after-the-fact alerts and remediation.

AI-Supported Anomaly Detection and Geospatial Analytics

Machine learning models and geospatial overlays may support early detection of inconsistencies in parcel data, ownership history, or building records. Predictive risk scores may be used to prioritize review and guide regulatory or financial oversight. These techniques extend beyond Title Lock's passive notification framework to provide review information before issues propagate.

Advanced Compliance Automation

In some implementations, automated compliance workflows may track document timelines, validate completeness, and escalate discrepancies. These features support alignment with jurisdiction-specific rules and reduce manual oversight burdens. Unlike post-recording monitoring services, the present framework emphasizes pre-recordation assurance.

Distributed Audit Logging for Regulatory and Transactional Oversight

Tamper-evident audit logs may be used to document metadata verification events and compliance review steps. This infrastructure may provide agencies, title insurers, and lenders with a consolidated view of document status, improving coordination and reducing fragmented oversight.

Preemptive Risk Mitigation Across Property Data Workflows

Unlike Title Lock's post-recordation alerts, the present disclosure may support anomaly review and resolution at or before recordation, reducing exposure to unauthorized or inconsistent record entries and facilitating prompt stakeholder response. These capabilities may reduce the downstream costs of legal intervention or correction.

Interoperability and Jurisdiction-Aware Governance

By applying jurisdiction-specific reconciliation rules across datasets, the described system may support metadata accuracy in varied regulatory environments. Integration with local, state, or national frameworks may be supported by coordinated validation criteria and tamper-evident ledger records.

Scalable and Transparent Property Record Management

Together, blockchain-supported validation, AI-driven anomaly detection, and automated compliance may form a comprehensive, scalable property record system. This architecture may offer improved operational clarity and resilience compared with reactive monitoring models.

Elevated Stakeholder Confidence and Transactional Integrity

Near real-time verification and preemptive resolution workflows may promote transparency, reduce litigation risk, and assist parties in resolving title inconsistencies. This approach aligns with the technical implementations illustrated in FIGS. 1-12.

Contextual Summary of Title Lock and Claimed Subject Matter

The implementations described herein are provided in a technical context different from notification services such as Title Lock by supporting validation at earlier transaction phases. By integrating tamper-evident ledger structures, machine learning analytics, and compliance workflows, the present framework addresses limitations in post-recordation alert models and supports more reliable, tamper-evident, and transparent land recordkeeping.

31. Non-Patented Solutions—Limitations of Tyler Technologies' iasWorld® in Real Estate Metadata Validation and Compliance Overview of Tyler Technologies' iasWorld® Platform The subject matter described herein may reference selected functionalities associated with Tyler Technologies' iasWorld® platform, which is used to support land record management through document indexing, submission, and retrieval processes. While iasWorld® includes features such as GIS-enabled map queries, text-based searches, and imaging integration, its primary emphasis appears to be on post-submission document workflows. The system does not appear to validate real estate metadata—such as TMR values, PI values, or AP identifier values—or reconcile zoning permits, building logs, property ownership history, or tax records against government-maintained sources. References to iasWorld® are included to illustrate existing administrative platforms and do not disclaim or limit the scope of the subject matter described herein.

Metadata Reconciliation and Tamper-Evident Validation

Although iasWorld® may support operational efficiency in land record management, it does not appear to include systematic cross-verification of property metadata fields against authenticated or jurisdiction-maintained sources. In the absence of tamper-evident security and near real-time reconciliation, discrepancies or unauthorized changes may propagate across jurisdictions, increasing risk in real estate transactions or regulatory reviews. The system described herein may mitigate these concerns through preemptive validation techniques.

Enhanced Record Integrity via Blockchain and Cross-Referenced Metadata The subject matter described herein may integrate blockchain-supported validation with metadata reconciliation protocols that verify TMR values, PI values, or AP identifier values—and supporting permit, tax, and ownership documents—against jurisdiction-maintained datasets. These reconciliations may help generate tamper-evident, auditable chains-of-title and chains-of-custody, reducing exposure to metadata conflicts and supporting stakeholder review.

Tamper-Evident Ledger Storage for Metadata Provenance

Property metadata may be processed to generate canonicalized cryptographic digests and recorded in a blockchain ledger, allowing for traceable lineage and verifiable metadata control. This method may preserve metadata integrity and enable early detection of unauthorized changes.

Anomaly Detection and Early Risk Flagging

AI-supported geospatial models may be applied to assess permit histories, boundary alignment, and metadata alignment. When inconsistencies are detected-such as duplicated identifiers or unverified permit filings-predictive risk scoring may guide prioritization of issue resolution. These features may improve stakeholder visibility and support record quality assurance.

Compliance Monitoring and Cross-Jurisdiction Workflows

Automated compliance workflows may be configured to validate property metadata in accordance with local, state, and national rules. These workflows may track documentation milestones, escalate unresolved anomalies, and generate tamper-evident audit trails to support administrative oversight.

Near Real-Time Data Governance and Interoperability

The described architecture may actively monitor and validate property record updates using AI models, cross-referenced record matching, and tamper-evident blockchain logs. Compared to the post-submission structure of iasWorld®, this model may provide additional governance tools for early validation and multi-source reconciliation.

Scalable Metadata Validation Framework

By integrating blockchain-supported metadata reconciliation with relevant jurisdiction-specific protocols, the system may serve as a modular solution adaptable to various real estate data ecosystems. These capabilities may reduce fragmentation and support uniform record quality across different geographic or regulatory contexts.

Strengthening Transparency and Transaction Reliability

Stakeholders—including financial institutions, municipalities, and property developers—may benefit from improved metadata accuracy, early unauthorized-activity detection, and simplified regulatory compliance. These improvements may promote operational transparency and strengthen public confidence in the integrity of land records.

Contextual Comparison and Operational Improvements

While iasWorld® offers process efficiencies in document routing and retrieval, it does not appear to provide near real-time metadata reconciliation, blockchain validation, or anomaly detection as described herein. The subject matter disclosed supports the technical implementations illustrated in FIGS. 1-12, and may improve upon current workflows by enhancing data accuracy and resilience.

Summary of Benefits and Alignment with Technical Implementations

In sum, the subject matter described herein presents a coordinated metadata governance solution—incorporating blockchain, machine learning, and compliance automation—to address issues associated with post-submission and post-recordation record validation systems such as iasWorld®. These implementations may help support property data integrity, improve record accuracy, and facilitate more transparent, efficient real estate transactions.

32. Non-Patented Solutions—Limitations of Old Republic National Title Insurance Company (ORTIC) Services in Property Metadata Validation and Regulatory Compliance Overview of ORTIC's Post-Transaction Risk Management Model The subject matter described herein may reference offerings by Old Republic National Title Insurance Company (ORTIC), which include title insurance, escrow services, and related transaction support aimed at reducing ownership risk. These services are typically structured around post-closing protection against undisclosed liens, encumbrances, or claims. While such services may address certain ownership or record risks after closing, ORTIC's service model does not appear to include proactive validation or metadata reconciliation workflows involving TMR values, PI values, or AP identifier values. Nor does it appear to integrate zoning permits, ownership logs, or building record validation against government-maintained sources. Any references to ORTIC are presented for contextual understanding and are not intended to limit or disclaim the subject matter disclosed herein.

Proactive Metadata Validation and Cross-Verification

Although some transaction-support processes rely on post-closing protections, the subject matter described herein may incorporate near real-time reconciliation of property metadata with authenticated or jurisdiction-maintained sources. TMR values, PI values, or AP identifier values—as well as building permits, zoning records, and historical ownership data—may be cross-verified before public recordation. This early validation framework may help stakeholders address inconsistencies or unauthorized changes prior to transaction finalization, supporting the reliability of recorded property information.

Near Real-Time Anomaly Detection and Unauthorized-Activity Monitoring

Machine learning models and geospatial tools may support detection of metadata anomalies, such as unauthorized boundary changes, conflicting parcel data, or misaligned ownership histories. Predictive risk scoring may prioritize review workflows and flag issues for timely stakeholder intervention. These mechanisms may provide earlier review information for unauthorized-activity detection than reactive insurance-based models.

Automated Compliance Review and Regulatory Logging

Unlike ORTIC's services, which focus on risk remediation, the system described herein may use automated workflows to support near real-time metadata verification and compliance with applicable statutes. Escalation pathways and tamper-evident audit logs may document review events, promoting accountability and reducing review omissions. Stakeholders—including title professionals, municipal clerks, and regulators—may benefit from reduced administrative burden and more efficient issue resolution.

Integrated Framework for Metadata Governance

By combining blockchain-supported validation, schema-matching reconciliation, AI anomaly detection, and jurisdiction-aware compliance automation, the described subject matter may provide an end-to-end property data management solution. These tools may assist in detecting and addressing inconsistencies before public recordation, reducing post-transaction remediation and supporting uniform data governance across regions.

Data Integrity and Stakeholder Assurance

Proactive metadata management tools may promote transparency and reduce litigation risks associated with undetected errors. This approach may extend beyond the scope of services offered by ORTIC by maintaining property records in a validated, tamper-evident format across their lifecycle. Predictive analytics and cryptographic verification may enhance trust and support regulatory readiness.

Framework for Enhanced Oversight in Real Estate Transactions

The disclosed subject matter may address limitations in traditional title insurance by applying distributed ledger validation, anomaly detection, and structured metadata reconciliation. These enhancements may reduce reliance on post-recordation risk management by validating property metadata before recordation or downstream transaction processing. Features described herein align with the technical implementations illustrated in FIGS. 1-12, offering operational continuity, enhanced accuracy, and data integrity across real estate ecosystems.

33. Non-Patented Solutions—Limitations of Title One Settlement Group, LLC's Transaction Services in Property Metadata Validation and Unauthorized-Activity Detection Limitations of Transaction-Focused Real Estate Services The subject matter described herein may reference offerings provided by Title One Settlement Group, LLC, aimed at facilitating real estate transactions through title insurance, settlement management, deed preparation, escrow support, virtual notary services, and compliance assistance. Although these services may enhance workflow efficiency and administrative coordination—particularly in closing procedures and FIRPTA (Foreign Investment in Real Property Tax Act) compliance—they do not appear to incorporate systematic, proactive data validation or unauthorized-activity detection measures. Specifically, Title One's services do not appear to reconcile metadata fields (e.g., TMR values, PI values, or AP identifier values) with official records (e.g., land-development, building-permit, or zoning-permit applications, subsequently issued permits or logs, and property ownership history documents), nor do they appear to implement tamper-evident blockchain recordkeeping. Consequently, potential inaccuracies or unauthorized changes may remain undetected until they affect public land registries, thereby creating ownership disputes or regulatory non-compliance. References to Title One Settlement Group, LLC's services are offered here solely for contextual background and do not disclaim or limit coverage of the subject matter described herein.

Proactive Unauthorized-Activity Detection and Metadata Reconciliation

In some approaches, this disclosure addresses such challenges by incorporating machine learning-based anomaly detection and geospatial analysis at the pre-recordation stage. The system may flag potentially unauthorized boundary modifications, inconsistent metadata entries, or conflicting metadata fields using near real-time mapping and metadata visualization tools. By detecting these inconsistencies before they enter public registries, stakeholders—including homebuyers, lenders, and title agents—may initiate review or correction workflows before potentially unauthorized filings are recorded. Unlike Title One's post-closing compliance and risk management focus, the approaches described herein emphasize proactive data validation to support earlier detection of potential disputes, unauthorized activity, and ownership conflicts early in the transaction lifecycle.

Automated Compliance and Risk Mitigation

In some approaches, the system automates compliance tasks aligned with federal, state, and local regulations to promote property record integrity. These automated workflows may verify the completeness of relevant metadata, track statutory deadlines, and escalate unresolved discrepancies, streamlining administrative tasks and facilitating prompt intervention. The system may also maintain tamper-evident audit logs of verification-related activities, providing a transparent record of compliance milestones. By validating property data before recordation, stakeholders may address potential legal or regulatory issues proactively, thereby reducing the likelihood of post-transaction challenges arising from unverified or inaccurate records.

Integrated Framework for Property Record Management

In some configurations, the system unifies blockchain-supported data validation, AI-driven anomaly detection, and metadata reconciliation to deliver a property record management framework that helps detect altered, inconsistent, or unauthorized data before entry into public land registries. By relying on tamper-evident ledger technology, predictive risk scoring, and compliance automation, the system may support data accuracy and stakeholder review through transparent oversight of recorded information. This design reduces reliance on reactive measures that address issues after records are finalized.

Advancing Property Data Accuracy and Integrity

Unlike Title One's transaction-focused services, which concentrate on closing and post-closing processes, the subject matter described herein may systematically validate metadata fields—such as TMR values, PI values, or AP identifier values—and local permitting documents. This preemptive approach helps reduce the likelihood of inaccurate or unauthorized data entering official land registries, thereby mitigating disputes, operational inefficiencies, or regulatory concerns. By establishing tamper-evident chains-of-title and chains-of-custody, the system promotes data integrity throughout the real estate lifecycle.

Additionally, its scalable and interoperable framework may support multiple jurisdictions, allowing property owners, lenders, and regulatory bodies to access uniformly validated records. Through rigorous oversight and process automation, in some approaches, these methods support reliability of real estate operations, offering advantages that exceed the scope of reactive, transaction-focused services that may not incorporate pre-recordation data validation.

34. Non-Patented Solutions—Limitations of LANDAMERICA FINANCIAL GROUP, INC.'s Risk Management Systems in Property Metadata Validation and Unauthorized-Activity Detection Limitations of Legacy Risk Management Systems The subject matter described herein may reference real estate transaction services once provided by LANDAMERICA FINANCIAL GROUP, INC. (hereinafter "LANDAMERICA"), a Virginia corporation operating through subsidiaries such as Commonwealth Land Title Insurance Company and Lawyers Title Insurance Corporation. Although LANDAMERICA offered title insurance, escrow management, and other transaction-related solutions to mitigate financial risks, these offerings appear to have operated mainly on a post-transaction basis. Consequently, the legacy systems do not appear to include a framework for near real-time unauthorized-activity detection, metadata reconciliation, or preemptive verification of metadata fields (e.g., TMR values, PI values, or AP identifier values; land-development, building-permit, or zoning-permit applications; subsequently issued permits or logs; and property ownership history documents). In the absence of proactive measures, data integrity and traceability may remain vulnerable—especially if inaccuracies or unauthorized changes enter the record before stakeholders may intervene. References to LANDAMERICA's services are provided for contextual understanding of reactive risk management methods and do not disclaim or limit coverage of the subject matter described herein.

Proactive Record Validation and Metadata Reconciliation

The subject matter described herein may address these limitations by presenting a proactive framework that validates and reconciles property records throughout the transaction lifecycle. A blockchain-based system may support tamper-evident chains-of-title and chains-of-custody, preserving auditability and traceability of relevant metadata fields—such as TMR values, PI values, or AP identifier values; land-development, building-permit, or zoning-permit applications; subsequently issued permits or logs; and: property ownership history documents. By cross-referencing these fields with official records or jurisdiction-maintained sources before public recordation, this approach may reduce the risk of unauthorized or inconsistent entries. Consequently, stakeholders may gain increased confidence in the reliability of recorded data, and the likelihood of future disputes, operational inefficiencies, or regulatory breaches may be lowered.

Advanced Unauthorized-Activity Detection and Anomaly Resolution Unlike LANDAMERICA's primarily reactive risk management strategies, the approaches described herein may incorporate advanced anomaly detection supported by machine learning algorithms and geospatial analysis. By identifying unauthorized boundary modifications, potentially conflicting metadata entries, or other potentially unauthorized updates, the system may notify stakeholders before inaccuracies propagate to official land registries. In some implementations, geospatial visualization facilitates near real-time mapping of parcel boundaries and associated metadata, enabling computer-supported detection and resolution of potential conflicts. This practice may help reduce the probability of title disputes, ownership conflicts, and transaction delays, thereby promoting more reliable and transparent real estate operations.

Compliance Automation and Operational Efficiency

In some implementations, the system may further integrate automated workflows that streamline compliance with federal, state, and local regulations. Tasks such as monitoring statutory deadlines, verifying metadata completeness, and escalating unresolved discrepancies may be embedded, thereby reducing the administrative burdens often associated with traditional real estate compliance. Tamper-evident audit logs capture relevant steps, enhancing both accountability and confidence in property record authenticity. Through proactive detection and resolution of anomalies, the disclosed system may support a more efficient transaction cycle than the post-transaction risk management paradigms typically employed by legacy systems.

Integrated Framework for Modernized Property Records Management

Although LANDAMERICA's approach focuses on post-closing remedies, the disclosed system unites blockchain-supported data validation, predictive anomaly detection, metadata reconciliation, and compliance automation into a cohesive system. By verifying property records and addressing potential discrepancies at the outset, the system helps mitigate vulnerabilities that might otherwise be carried into public land registries. This integrated model helps detect and address unverified or inaccurate data, thereby reinforcing traceability, data integrity, and unauthorized-activity detection across the real estate ecosystem.

B By leveraging a scalable, tamper-evident, and transparent infrastructure, the disclosed system offers tangible improvements beyond historical risk management approaches. Property owners, lenders, title insurers, and regulators may benefit from early anomaly resolution, records authenticated using canonicalized cryptographic digests or tamper-evident blockchain recordkeeping, and automated compliance oversight. The result is a forward-looking model of property record governance that helps mitigate systemic risks and reinforces stakeholder confidence in transactional integrity and data security.

35. Non-Patented Solutions—Limitations of Stewart Title Company and Stewart Title Guaranty Company's Post-Transaction Services in Property Metadata Validation and Unauthorized-Activity Detection Limitations in Title Risk Management Systems The subject matter described herein may reference title risk management solutions offered by Stewart Title Company and Stewart Title Guaranty Company, intended to mitigate financial risks associated with real estate transactions through services such as title insurance and escrow administration. Although these offerings may help protect property owners and lenders against issues like liens, encumbrances, and undisclosed title defects, they appear to function mainly on a post-transaction basis. Consequently, they do not appear to include proactive measures for unauthorized-activity detection, metadata reconciliation, or blockchain-supported validation of metadata fields (e.g., TMR values, PI values, or AP identifier values; land-development, building-permit, or zoning-permit applications; subsequently issued permits or logs; and property ownership history documents) prior to recordation. This reactive model may leave property data susceptible to inaccuracies or omissions that can become embedded in public land registries, potentially affecting transaction integrity and posing ongoing risks for stakeholders. References to Stewart Title services are presented solely for contextual understanding of post-transaction models and do not disclaim or limit coverage of the subject matter described herein.

Proactive Validation and Record Reconciliation

In some approaches, this disclosure addresses these challenges by describing a proactive framework that validates and reconciles property records throughout the transaction lifecycle. A blockchain-based system may support tamper-evident chains-of-title and chains-of-custody, helping preserve auditability and traceability of relevant metadata fields—such as TMR values, PI values, or AP identifier values; land-development, building-permit, or zoning-permit applications; subsequently issued permits or logs; and property ownership history documents. By verifying these fields against official records or jurisdiction-maintained sources before public recordation, the approach may help reduce the risk of unauthorized or inconsistent entries. As a result, stakeholders may gain increased confidence in recorded data reliability, and the likelihood of future disputes, operational inefficiencies, or regulatory breaches may be lowered.

Incorporation of Property Metadata for Enhanced Accuracy

In some configurations, the disclosed system integrates a range of property metadata fields—including TMR values, PI values, or AP identifier values; land-development, building-permit, or zoning-permit applications, subsequently issued permits or logs, and property ownership history documents issued by government agencies. By cross-referencing these data fields against official records or jurisdiction-maintained sources, the system may identify issues such as mismatched TMR values, PI values, or AP identifier values, boundary discrepancies, or incomplete data early in the transaction process. One advantage of preemptive validation is the ability to detect and address anomalies before they become recorded, while Stewart Title's insurance-based solutions typically address defects after discovery. Any mention of Stewart Title's approach is for contextual understanding and does not limit the scope of the subject matter described herein.

Near Real-Time Anomaly Detection and Risk Identification

Some implementations may incorporate machine learning-based anomaly detection and geospatial analysis to identify potentially unauthorized activities or metadata inconsistencies. By flagging indicators such as unauthorized boundary modifications, conflicting metadata entries, or duplicate record identifiers, the system may detect conditions associated with increased risk levels using predictive risk scoring techniques. Timely detection of such conditions may help mitigate transaction delays, support early resolution of potential discrepancies, and reduce the likelihood of problematic data propagating into public land records. Compared to post-closing monitoring approaches, this configuration may assist in strengthening data reliability during earlier stages of the property recording process.

Automated Compliance Workflows

The subject matter described herein may include automated compliance workflows aligned with federal, state, and local regulations. By systematically tracking statutory deadlines, verifying metadata completeness, and escalating unresolved inconsistencies, these workflows may reduce administrative burdens associated with traditional real estate compliance. Compliance steps may be documented within a tamper-evident audit log, improving accountability and stakeholder confidence in property records. Through proactive anomaly detection and near real-time resolution, this system may support a more efficient transaction cycle than legacy, post-transaction risk models.

Integrated Framework for Modernized Property Record Management

Unlike Stewart Title's post-transaction approach, which focuses on title and escrow services after a transaction is finalized, the subject matter described herein combines blockchain-supported data validation, predictive anomaly detection, metadata reconciliation, and automated compliance into a cohesive framework. By verifying records and resolving potential discrepancies at the pre-recordation stage, the system helps reduce vulnerabilities that might otherwise propagate into public land registries. This synergy addresses the accumulation of unverified or inaccurate data, supporting better traceability, data integrity, and unauthorized-activity detection across diverse real estate contexts.

Advancing Transaction Integrity and Stakeholder Confidence

In summary, the subject matter described herein enhances the integrity and reliability of property record management by validating metadata, detecting anomalies early, and maintaining tamper-evident audit trails. These measures address vulnerabilities that can arise when property data remains unvalidated until after transactions close, as seen in some legacy systems. By combining cryptographic verification, predictive analytics, and automated compliance workflows, this framework promotes data governance, reduces the risk of unauthorized activity, and improves the overall real estate transaction lifecycle. This strategy may support review by property owners, lenders, regulators, and other stakeholders, expanding beyond the scope of traditional post-transaction services.

36. Non-Patented Solutions—Limitations of the American Land Title Association's (ALTA) Framework in Property Metadata Validation and Unauthorized-Activity Detection Limitations in Industry Frameworks for Property Record Management The subject matter described herein may reference guidelines and procedures established by the American Land Title Association (ALTA), aimed at coordinating property development, title governance, and real estate management practices. Although these measures may enhance trust and efficiency in property transactions by emphasizing data integrity, risk mitigation, and compliance assurance, they do not appear to incorporate specific computer-implemented validation mechanisms—such as proactive anomaly detection, metadata reconciliation, or blockchain-supported validation—to support tamper-evident verification of property records. Consequently, property data may remain vulnerable to unauthorized changes or metadata inconsistencies that might undermine transaction integrity. References to ALTA's framework are provided here for contextual understanding and do not disclaim or limit coverage of the subject matter described herein.

Blockchain-Supported Validation and Enhanced Traceability

In some approaches, this disclosure addresses these limitations by introducing a blockchain-supported system that establishes tamper-evident chains-of-title and chains-of-custody. Through canonicalized cryptographic digest generation or blockchain ledger recordation, the system may preserve auditability and traceability throughout property transactions. This approach may support stakeholder review and help verify that property data—such as TMR values, PI values, or AP identifier values, along with land-development, building-permit, or zoning-permit applications, subsequently issued permits or logs, and property ownership history documents—remain verifiable. By validating property metadata at an earlier stage, the system may reduce the likelihood of unauthorized or inconsistent records entering public land registries, thereby supporting transaction transparency and metadata integrity.

Metadata Reconciliation for Data Integrity

In some approaches, near real-time reconciliation of metadata (e.g., land-development, building-permit, or zoning-permit applications, subsequently issued permits or logs, and property ownership history documents) may address potential vulnerabilities that ALTA's recommended guidelines may not address. By cross-referencing official records or jurisdiction-maintained sources with received property metadata, the system may detect and support resolution of discrepancies—such as boundary conflicts, mismatched TMR values, PI values, or AP identifier values, or incomplete metadata—before recordation. Although ALTA's framework encourages coordinated procedures and protocols, the approaches disclosed here provide computer-implemented validation structures that support these principles, thereby supporting data reliability and accuracy from the outset.

Anomaly Detection and Unauthorized-Activity Detection

Some implementations may incorporate AI-based anomaly detection and geospatial visualization to review real estate data for unauthorized modifications, duplicate entries, or boundary inconsistencies prior to recordation. The system may generate predictive risk scores to flagged anomalies, enabling stakeholders—including lenders, title agents, and regulatory bodies—to focus on high-impact issues. By identifying potential unauthorized activity or metadata conflicts in near real time, this design may reduce the likelihood of disputes, transaction delays, and erroneous recordings in public land databases.

Automated Compliance Workflows for Regulatory Adherence

The subject matter described herein may also integrate automated compliance workflows to support conformance with federal, state, or local regulations. These workflows systematically validate metadata completeness, track statutory deadlines, and escalate anomalies, thereby reducing administrative overhead in real estate compliance. Tamper-evident audit trails capture validation and compliance events, increasing transparency and accountability in property records throughout their lifecycle.

Integrated Framework for Unauthorized-Activity Detection and Data Integrity

Unlike ALTA's industry-guideline framework, the disclosed approaches incorporate computer-implemented techniques—such as blockchain-supported validation, AI anomaly detection, and metadata reconciliation—to address data vulnerabilities and support regulatory compliance before public recordation. This integrated model may support proactive protection of property records against systemic risks while improving reliability, scalability, and metadata integrity for real estate stakeholders. By detecting, prioritizing, and supporting resolution of inconsistencies early, the system may provide an alternative to fragmented or reactive solutions.

Advancing Compliance and Risk Mitigation Through Technical Innovation

In summary, these approaches may provide a technical structure aligned with ALTA's broader objectives for compliance and risk management. By using tamper-evident recordkeeping, predictive risk analysis, and automated oversight of regulatory guidelines, the system may support detection of potentially unauthorized activities, enhances data transparency, and supports review of real estate transactions for property owners, title insurers, and other participants. This system offers a forward-looking benchmark for tamper-evident, efficient, and reliable property record management—expanding beyond the limitations of existing industry frameworks.

37. Non-Patented Solutions—Limitations of First Excel Title, LLC's Property Settlement Services in Metadata Validation and Unauthorized-Activity Detection Limitations in Existing Property Settlement Services The subject matter described herein may reference property settlement services offered by First Excel Title, LLC, designed to streamline workflows in residential and commercial real estate transactions, land acquisitions, and construction settlements. Although these services may facilitate digital closings and transaction management for property owners, lenders, and title agents, they do not appear to include proactive unauthorized-activity detection measures, metadata validation, or pre-recordation compliance checks. In particular, the services do not appear to validate metadata fields—such as TMR values, PI values, or AP identifier values; land-development, building-permit, or zoning-permit applications; subsequently issued permits or logs; property ownership history documents; or tax records. As a result, records that lack these verification steps may introduce metadata-integrity risks, inaccuracies, or regulatory non-compliance concerns prior to integration into public property registries. Any references to First Excel Title, LLC's services are provided primarily as contextual background and do not disclaim or limit coverage of the subject matter described herein.

Blockchain-Supported Record Validation and Tamper-Evidence

In some approaches, the methods described herein address these gaps by employing a blockchain-supported framework for tamper-evident chains-of-title and chains-of-custody. Canonicalized cryptographic digest generation may be used to authenticate property metadata and support detection of unauthorized modifications or retroactive edits, helping maintain auditability and traceability throughout the transaction. By preserving record integrity before any public recordation, this disclosure's approach may mitigate the risk of erroneous or unauthorized data entering land registries, thereby improving transparency and stakeholder review in real estate workflows.

Proactive Metadata Reconciliation for Accuracy

To support data completeness and reliability, this system integrates property metadata fields—such as land-development, building-permit, or zoning-permit applications, subsequently issued permits or logs, property ownership history documents, tax records, and TMR values, PI values, or AP identifier values. In some approaches, near real-time reconciliation occurs against official records or jurisdiction-maintained sources, helping detect and support resolution of mismatched TMR values, PI values, or AP identifier values, unauthorized boundary changes, or missing data prior to recordation. Unlike First Excel Title's emphasis on post-transaction logistics, this system may identify potential inconsistencies at an early stage, reducing the likelihood of unauthorized or incomplete records entering official registries.

Anomaly Detection and Unauthorized-Activity Detection

In some approaches, this disclosure further enhances unauthorized-activity detection by incorporating machine learning and geospatial analytics in near real-time. These algorithms may uncover potentially unauthorized changes-such as potentially unauthorized documents, duplicate record identifiers, or metadata conflicts- and assign predictive risk scores to help stakeholders prioritize material anomalies. By addressing these inconsistencies before finalizing records, the system may reduce the likelihood of unauthorized activity, ownership disputes, and data manipulation. This proactive strategy differs from reactive settlement services that primarily address issues once transactions have already concluded.

Automated Compliance Workflows

In some approaches, the disclosed framework automates compliance tasks (for example, verifying metadata completeness, tracking statutory deadlines, and escalating unresolved discrepancies). These workflows may lower the potential for regulatory infractions and operational inefficiencies by identifying possible violations before records reach public systems. The system may also generate tamper-evident audit logs documenting compliance checkpoints, improving oversight transparency and reducing administrative burdens for stakeholders.

Integrated Framework for Data Integrity and Regulatory Adherence

By uniting blockchain validation, AI anomaly detection, metadata reconciliation, and automated compliance, this framework advances property record management beyond traditional settlement models. In addition to post-transaction remedies, it may support validation of property metadata at the pre-recordation stage, providing a scalable and robust environment for real estate transactions. This comprehensive approach helps preserve property data accuracy, mitigates unauthorized-activity risks, and supports stakeholder review by maintaining transparent oversight of recorded information.

Enhancing Property Record Oversight Capabilities

The subject matter described herein may improve accuracy, integrity, and operational efficiency across the real estate ecosystem. Stakeholders—including prospective homebuyers, homeowners, lenders, title agents, and regulators—may benefit from a proactive architecture that helps reduce unauthorized-activity risk, streamline compliance, and maintain reliable property data from initial ingestion through public recordation. By addressing data governance challenges in an integrated manner, the disclosed system may offer discernible advantages over existing solutions that emphasize post-transaction tasks.

38. Non-Patented Solutions—Limitations of First American Title Insurance Company's Property Settlement Services in Metadata Validation and Unauthorized-Activity Detection Limitations in Existing Property Settlement Solutions The subject matter described herein may reference the title insurance, escrow services, and title search offerings provided by First American Title Insurance Company, aimed at mitigating financial risks in real estate transactions. These services address various ownership-related concerns (e.g., liens, encumbrances, or title defects) and integrate digital innovations—such as eClosings and workflow automation—to enhance post-transaction efficiency. While facilitating risk management after transactions close, they do not appear to include preemptive mechanisms for unauthorized-activity detection, metadata reconciliation, or near real-time data validation during earlier record-creation phases. In the absence of proactive oversight, property data may remain susceptible to inaccuracies, metadata-integrity risks, or potential regulatory non-compliance before entering public registries. Any references to First American's solutions are included solely for context and do not disclaim or limit coverage of the subject matter described herein.

Blockchain-Supported Data Integrity and Traceability

In some approaches, this disclosure addresses these limitations by employing a blockchain-supported framework that may support tamper-evident chains-of-title and chains-of-custody. In some implementations, canonicalized cryptographic digest generation may help maintain the traceability and durability of relevant property data—including land-development, building-permit, or zoning-permit applications, subsequently issued permits or logs, property ownership history documents, and TMR values, PI values, or AP identifier values. By comparing these records against official records or jurisdiction-maintained sources early in the process, the system may help reduce discrepancies, mitigate unauthorized-document risks, and address metadata gaps prior to public recordation. This approach supports data integrity, facilitates compliance with applicable regulations, and may help reduce the likelihood of disputes across multiple jurisdictions.

Advanced Anomaly Detection and Unauthorized-Activity Mitigation

Some implementations may also include AI-driven anomaly detection and geospatial visualization to proactively identify potentially unauthorized activities before they reach official land registries. In some configurations, machine learning models may detect unauthorized boundary changes, potentially unauthorized documentation, or conflicting metadata entries, assigning predictive risk scores to prioritize high-impact anomalies. While First American's approach appears to emphasize post-transaction measures, the near real-time intervention method described herein may help support verification that records entering public systems reflect accurate, validated information. Consequently, stakeholders—including lenders, property owners, and regulators—may benefit from improved metadata integrity, reduced litigation risk, and decreased unauthorized-activity exposure.

Automated Compliance Workflows for Regulatory Adherence

The subject matter described herein may further integrate automated compliance workflows that validate metadata completeness, track statutory deadlines, and escalate unresolved issues for timely review. These workflows align with federal, state, and local guidelines, generating tamper-evident audit logs that support transparency and simplify regulatory oversight. By automating compliance procedures, the system may reduce administrative burdens and mitigate non-compliance risks, thereby enhancing operational efficiency and confidence in the real estate ecosystem.

TECHNICAL FIELD

This disclosure relates to computer-implemented systems and methods for the secure acquisition, validation, and reconciliation of jurisdiction-specific real estate metadata, including metadata fields comprising Tax Map Reference (TMR) values, Parcel Identification (PI) values, and Assessor Parcel (AP) identifier values, using blockchain-based verification, cryptographic digest generation, distributed-ledger processing, machine learning algorithms, and geospatial analytics. By enhancing accuracy, authenticity, and traceability of government-issued property documents, the disclosed frameworks may address challenges in metadata integrity, tamper-evident record validation, and anomaly detection. These solutions can provide a flexible, scalable, and proactive approach for resolving record discrepancies and maintaining regulatory compliance across diverse jurisdictions.

BACKGROUND OF THE DISCLOSURE

In the United States, real estate transactions depend significantly on the accuracy, reliability, and integrity of recorded property metadata. Despite this reliance, many local and county-level government offices—responsible for maintaining official records—may encounter structural vulnerabilities linked to prioritizing procedural compliance over more stringent validation measures. These offices, which can include registrars of deeds, county clerks, or clerks of court, serve as custodians of property records and accept legal instruments such as deeds of trust (mortgages), memoranda of lien, abstracts of judgment, deeds of foreclosure, lis pendens notices, lien certificates, and related filings. Their limited authority to conduct in-depth reviews often confines them to a passive role, affecting record protection in high-volume environments.

Moreover, these government offices may oversee metadata for commercial and residential land or building development applications (e.g., land development building or zoning permit applications, subsequently issued permits or logs). Legal frameworks in various jurisdictions typically allow the office to confirm that documents are "properly acknowledged," but do not obligate offices to investigate potentially unauthorized filings, potentially altered documentation, or data-integrity issues. Statutory immunity may apply to these offices, although it does not extend to gross negligence or intentional wrongdoing. Any references to the legal framework here provide context and do not limit this disclosure.

This predominantly procedural approach accelerates high-volume recordation but leaves gaps vulnerable to unauthorized or inconsistent modification of TMR values, PI values, or AP identifier values. These identifier values—assigned by governmental authorities—are central to chain of custody and chain of title, as they define the legal description and ownership of real property nationwide. They appear on both official and publicly recorded documents, linking property boundaries and ownership histories to the public land records of respective taxing jurisdictions. Once recorded, a potentially unauthorized or altered document may gain presumptive validity—even if defectively created. By not examining records upon intake yet granting full legal effect to them, government offices can inadvertently reinforce this paradox. Errors can then propagate—through tax assessments, foreclosures, and subsequent conveyances—often surfacing during costly litigation or other disruptions.

High-level corruption, administrative errors, and insufficient oversight can exacerbate these issues. While many public servants adhere to ethical guidelines, some jurisdictions may experience recurring misconduct, enabling unauthorized zoning alterations, hidden land transfers, or undisclosed encumbrances. A lack of proactive, technology-based reviews allows shell entities, fictitious conveyances, and falsified permits to mask transactions across multiple jurisdictions. Disconnected offices and limited inter-agency coordination further heighten this environment, letting questionable land records evade procedural checks on a large scale, potentially creating systemic risk.

A seminal publication, *Corruption in Land Use and Building Regulation, Volume I: An Integrated Report of Conclusions* (John A. Gardiner, Steven A. Waldhorn, and Theodore R. Lyman, SRI International, 1979), commissioned by the U.S. Department of Justice's National Institute of Law Enforcement and Criminal Justice, offers thorough insights on these challenges. It documents corruption within local government land-use and building regulation, describing planning, zoning, and code enforcement practices and outlining incentives for illicit behavior. The authors propose policy reforms, improved management systems, and increased citizen involvement—highlighting the systemic nature of land-use corruption and paralleling broader vulnerabilities noted here.

A public observation on Feb. 27, 2025, during a federal government efficiency proceeding—"It is much easier to hide corruption when the system is extremely inefficient. Corruption sticks out like a sore thumb in an efficient system"—captures how entrenched inefficiencies in real estate recordation can conceal unethical activities. The absence of thorough data validation and fragmented inter-agency collaboration may inadvertently allow wrongdoing to remain undetected. Increasing efficiency and oversight could bring malfeasance to light more swiftly.

In practice, local government offices primarily follow procedural directives for pre-recordation checks. Typical guidance states a clerk "is not authorized to look beyond the face of the document" and "is directed to record any deed that is properly acknowledged," regardless of potential defects. Meanwhile, 18 U.S.C. § 1021 (Title Records) provides criminal penalties for knowingly certifying false records, reflecting the federal government's interest in precise land documentation. Nonetheless, many offices rely on existing intake procedures that may not enhance recorded data reliability.

Once recorded, documents carry full legal effect—even if forgery, falsified notarization, or other invalidating conditions later emerge. As a result, erroneous instruments enter official registries, creating opportunities for exploitation by malicious actors, to the detriment of legitimate property owners. Given the estimated daily volume of 250,000-300,000 recorded instruments nationwide, even a small proportion of compromised entries can trigger wide-ranging litigation, weaken credit histories, and unleash legal complexities for homebuyers and property owners.

High-level corruption in land-use governance can heighten these systemic weaknesses. Local officials who challenge questionable activities may face retaliation, demotion, or termination, thereby undermining substantive reforms. A United States Citizen—who is also the applicant—has alleged that some county officials, spanning multiple jurisdictions, manipulated or concealed mortgage-loan origination and foreclosure transactions in land management and tax systems over several decades. This sampling, drawn from one local county government agency's records as of tax year 2021, involves approximately 12,593 foreclosing trustees' reports of residential property sales across the United States, including numerous federally insured mortgage loans, with an estimated combined value exceeding $7 billion—a figure the applicant considers conservative. The applicant contends these events occur in more than one county or state and persist at the time of filing this nonprovisional patent application. According to the applicant, government-issued records—containing TMR values, PI values, or AP identifier values from before mortgage origination or closing—may fall under federal and state laws prohibiting the theft, alteration, or falsification of public records, potentially constituting obstruction of justice. The applicant further alleges these activities might involve "fraud and related activity in connection with computers," including unauthorized access and tampering with protected computer systems. Because such metadata may be altered ahead of finalization or entry in public land registries, the authentic transfer and ownership of real property can remain unclear, leaving stakeholders unsure of who legitimately holds an alleged debt or who owes money. In this climate, retaliation and collusion could sustain unethical conduct-facilitating unauthorized property transfers or zoning changes and weakening record reliability and public trust.

Federal and state statutes underscore the seriousness of falsifying public records. Laws such as 18 U.S.C. §§ 1506, 1519, and 2071 criminalize tampering with or altering official records, potentially leading to imprisonment. Even so, non-uniform enforcement and procedural gaps at the local level may allow these issues to persist in many areas.

This disjointed, non-uniform regulatory structure contributes to uncertain titles, disputed ownership, and lowered trust in property transactions, forcing legitimate owners to remedy potentially unauthorized filings. In jurisdictions that may not provide full or near real-time checks of recorded documents, individuals may insert potentially altered or otherwise invalid records, assume their presumed authenticity, and generate substantial financial, legal, or societal ramifications.

Observations from daily practice reveal that local government offices, abiding by procedural norms, generally do not investigate documents for irregularities. This scenario magnifies the hazard of systemic failures when overlooked inaccuracies remain uncorrected. Stakeholders, such as homebuyers, lenders, or property owners, may depend on incomplete data and uncover hidden defects after costly financial or legal entanglements arise.

Data on newly authorized building permits throughout the United States illustrates how extensive these concerns may become. As of 2024, more than 1.47 million housing units were approved nationwide, valued at over $382 billion. Single-family homes made up about two-thirds of these permits, while multifamily developments remained significant in some locations. For example, Virginia alone approved 34,251 new housing units (valued at $7.57 billion), encompassing notable single-family demand (22,794 permits) and multifamily builds (10,924 permits). If illicit or erroneously recorded permits permeate such a large process, oversights could affect tax systems, mortgage underwriting, and subsequent real estate transactions—highlighting the potential ramifications of flawed metadata validation.

Market fluctuations in real estate can reverberate through the larger financial sector, potentially affecting national debt burdens. As a former Chairman of the Joint Chiefs of Staff has observed, an unstable financial landscape can pose national security challenges. If unverified or potentially altered property records incite mortgage crises or diminish investor confidence, the resulting fiscal strain may intensify budgetary pressures, influencing broader security and governance priorities. Hence, there remains a continued priority to uphold the integrity of real estate recordation so that subsequent generations may inherit a property governance framework committed to transparency and trust.

BRIEF SUMMARY OF THE DISCLOSURE

In some approaches, this disclosure describes a computer-implemented framework for acquiring, reconciling, and validating heterogeneous real estate records to help mitigate potentially unauthorized activity, data inconsistencies, and unauthorized modifications. The framework may incorporate AI-driven components—including a Public Record Request Module and a Metadata Reconciliation Engine—together with a Blockchain Audit Trail Module configured to generate canonicalized cryptographic digests and support tamper-evident, privacy-preserving validation of real estate metadata integrity across multiple jurisdictions.

A Public Record Request Module may automate the submission of relevant jurisdiction-specific protocols record requests to government agencies and public registries, retrieving TMR values, PI values, or AP identifier values from government-issued land development building or zoning permit applications, subsequently issued permits or logs, property ownership history documents, and historical real estate tax records. In some configurations, the system obtains property records referencing a first owner of record (e.g., a developer or homebuilder) and compares them to last-owner instruments (e.g., publicly recorded deeds or liens). A Metadata Reconciliation Engine may apply graph neural networks (GNNs) to detect structural or semantic inconsistencies in ownership data, liens, or boundary information, and can use a reinforcement learning-based anomaly detection model to classify and score these discrepancies. If anomalies are detected, the system may initiate an automated resolution process or flag issues for stakeholder review.

To help protect data authenticity, the framework may include a Blockchain Audit Trail Module that generates and stores canonicalized cryptographic digests of jurisdiction-specific metadata fields, including TMR values, PI values, and AP identifier values, and records comparisons between data associated with a first owner of record and a last owner of record in a blockchain ledger. The module may store the canonicalized cryptographic digests as linked Merkle-tree structures recorded across multiple ledger nodes, verify data integrity using a zero-knowledge-proof (ZKP) verifier that preserves confidentiality of record content, and append authenticated annotations through Elliptic Curve Digital Signature Algorithm (ECDSA)-secured commit operations. Additional geospatial analytics—such as LiDAR or satellite imagery—may assist in verifying parcel boundaries, detecting encroachments, or identifying missing permits. Meanwhile, self-sovereign identity (SSI) protocols can generate cryptographically verifiable ownership credentials, preserving personal privacy through zero-knowledge verifications.

By unifying cryptographic digest generation, distributed-ledger processing, AI-driven anomaly detection, and optional federated learning within a single system, these approaches may address vulnerabilities in real estate data flows. Features such as secure interoperability, automated anomaly detection, tamper-evident validation before blockchain recordation, and data lineage from a first owner of record to a last owner of record may offer advantages for lenders, title agencies, government offices, and private stakeholders seeking a more transparent, efficient, and trustworthy real estate record management solution.

BRIEF DESCRIPTION OF DRAWINGS

FIG. 1 is a block diagram illustrating an overview of a system architecture for acquiring, reconciling, and validating real estate metadata using a Public Record Request Module, a Metadata Reconciliation Engine, and blockchain verification and anomaly logging.

FIG. 2 is a diagram illustrating a metadata acquisition and validation framework for extracting and processing TMR values, PI values, and AP identifier values from government-issued records and public registries.

FIG. 5 is a diagram of an AI-powered metadata reconciliation system including a Blockchain Audit Trail Module, distributed-ledger processing, a cryptographic engine, publicly recorded metadata storage, and validation components.

FIG. 8 is a diagram showing a metadata validation system integrated with AI-driven metadata adjustments, blockchain identity validation, and self-sovereign identity management.

FIG. 9 is a schematic detailing a decision-support and self-sovereign identity system including edge AI processing, encryption, and machine-learning model retraining.

FIG. 11 is a block diagram describing a multi-jurisdiction and distributed ledger system including cross-jurisdiction processing, distributed-ledger integration, cybersecurity visualization, cybersecurity protection, user-action logging, anomaly overlay, metadata discrepancy clustering, and security-alert generation.

DETAILED DESCRIPTION

Introduction

Figure 3:
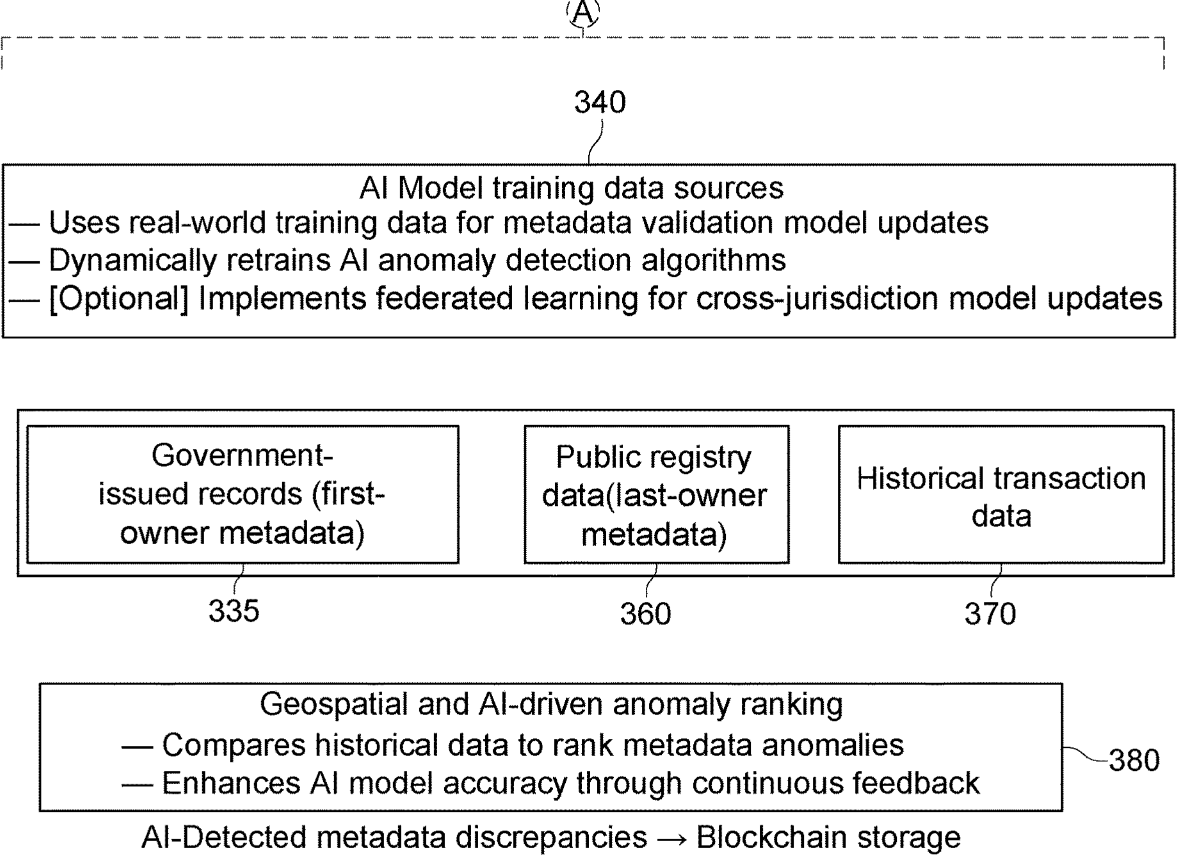
FIG. 3 is a schematic view of a metadata validation and AI-powered verification module including metadata acquisition, schema matching, anomaly detection, and blockchain-based metadata verification.

The following disclosure provides illustrative examples of how various modules, features, and approaches may be combined, but it does not limit the disclosed subject matter to any one arrangement. References to specific addresses, property locations, or particular AI or cryptographic algorithms are merely illustrative. Unless otherwise specified, the appended claims define the scope of protection, and no aspect of this Detailed Description or accompanying figures is intended to be construed as restricting or disclaiming features, methods, or implementations that fall within the broader scope of the disclosed subject matter.

In some implementations, this disclosure describes a system for secure, AI-driven data extraction, verification, and anomaly detection in property records across multiple jurisdictions, using distributed ledgers and cryptographic frameworks. In various configurations, the system may incorporate one or more of the following:

1. A Public Record Request (PRR) Module

Configured to cryptographically request and retrieve official documents (e.g., zoning permits, building permits, occupancy permits, and building logs) from government agencies. In some configurations, the PRR Module uses asymmetric encryption and zero-knowledge proofs (ZKPs) to reduce susceptibility to tampered metadata. In some approaches, these government-issued records are traceable to a first owner of record (for instance, a developer or homebuilder), which may enable detection of discrepancies against publicly recorded instruments referencing a last owner of record.

2. A Metadata Reconciliation Engine (MRE)

Providing a technical foundation for multi-modal AI functionalities, including natural language processing (NLP) for parsing and extracting TMR values, PI values, or AP identifier values, graph neural networks (GNNs) for schema matching, and reinforcement learning for anomaly detection. In some approaches, the MRE can combine government-issued and publicly recorded data, flagging inconsistencies before they propagate to downstream processes. The MRE may compare TMR values, PI values, or AP identifier values associated with first-owner metadata (e.g., building/zoning permit applications, subsequently issued permits or logs) to last-owner deed or lien references, thereby addressing ownership changes.

3. A Blockchain Audit Trail Module (Optionally Quantum-Resistant)

Designed to log or hash newly verified property data in a tamper-evident ledger structure, including by generating and storing canonicalized cryptographic digests of jurisdiction-specific metadata fields, recording comparisons between data associated with a first owner of record and a last owner of record in a blockchain ledger, and storing the canonicalized cryptographic digests as linked Merkle-tree structures across multiple ledger nodes. In some implementations, ZKPs and other cryptographic methods can preserve data privacy while providing authenticity checks, including through a zero-knowledge-proof (ZKP) verifier and Elliptic Curve Digital Signature Algorithm (ECDSA)-secured commit operations. Various configurations optionally incorporate federated learning or adaptive AI feedback to refine anomaly detection across different jurisdictions.

4. A Decentralized Identity Management or Self-Sovereign Identity (SSI) Component Allows verifiable credentials (VCs) for stakeholders (buyers, sellers, government agents, escrow, and so forth) while preserving privacy via ZKPs. In some configurations, these SSI protocols integrate with the PRR Module and the MRE to validate ownership lineage (including transitions from a first owner of record to a last owner of record) while masking personally identifiable information (PII).

These modules interrelate to facilitate what may be viewed as constructive possession of the disclosed subject matter. Specifically, real-estate metadata may be initially retrieved through the PRR Module, then verified and reconciled by the MRE (using multi-modal AI such as OCR, NLP, or computer vision), and subsequently recorded or updated on a permissioned blockchain ledger for tamper-evident validation, cryptographic protections, and—in some configurations—self-executing contracts. The PRR Module may specifically request first-owner records (e.g., building logs from a developer) and cross-reference them with last-owner instruments (e.g., recorded deeds, liens), enabling the MRE to detect mismatches involving TMR values, PI values, or AP identifier values and enabling the Blockchain Audit Trail Module to record corresponding comparisons as canonicalized cryptographic digests in a blockchain ledger. Features such as adaptive or federated AI retraining, metadata-integrity risk assessment, cross-jurisdictional record checks, and quantum-resistant protocols may operate within various implementations.

Real estate transactions involve multiple stakeholders (buyers, sellers, title agents, government agencies, regulators, financial institutions) who often rely on fragmented, relevant jurisdiction-specific data sources and protocols. In some approaches, the Public Record Request (PRR) Module operates under cryptographically secured conditions to retrieve official real estate documents (zoning permits, building permits, occupancy permits, and building logs) and provide metadata comprising TMR values, PI values, or AP identifier values from the outset. Unlike single-point, trust-based databases, the blockchain-supported verification ledger (augmented with ZKPs) may support tamper-evident ledger traceability and mitigate vulnerabilities from human error, inefficiency, or unauthorized modification-even across multiple jurisdictions. Comparing first-owner metadata (e.g., developer-issued building permits) with last-owner documents (e.g., publicly recorded deeds) may facilitate more robust chain-of-title validation, including privacy-preserving validation of jurisdiction-specific metadata before ledger recordation or associated real-property transaction activity.

In some implementations, machine learning methods—including NLP, GNNs for schema alignment, and reinforcement learning for anomaly detection—work in tandem with cryptographic verification to exceed existing automation capabilities. Specifically, the Metadata Reconciliation Engine (MRE) may apply GNN-driven schema matching to detect structural irregularities and use reinforcement learning models to classify anomalies in near real time. For example, TMR values, PI values, or AP identifier values referencing a first owner of record can be automatically compared to last-owner data in recorded deeds or liens, canonicalized for cryptographic digest generation, highlighting unauthorized boundary changes or conflicting permit references. Additional geospatial data overlays (e.g., LiDAR) or computer vision modules may further validate boundaries or detect unapproved modifications.

The PRR Module orchestrates relevant jurisdiction-specific protocols record requests, while the MRE incorporates cryptographic security protocols (asymmetric encryption, ZKPs) and adaptive or federated AI to detect anomalies. By establishing a tamper-evident record management paradigm, the system may protect homebuyers, mortgage originators, lenders, regulatory agencies, and title companies from unnoticed discrepancies. The subject matter aligns with claim elements including a Blockchain Audit Trail Module, distributed-ledger processing, cryptographic digest generation, Merkle-tree structures, ZKP verification, and ECDSA-secured commit operations to provide a secure technical framework for real estate metadata reconciliation. For additional operational details, reference is made to FIGS. 1-12 and FIG. 10A, which depict automated public record requests, AI verification, and blockchain logging.

In some approaches, the multi-layered combination of AI, blockchain, and multi-jurisdictional compliance supports the claimed scope. The sections below expand on the PRR Module, Metadata Reconciliation Engine, Blockchain Audit Trail Module, decentralized identity management, smart contract logic, and adaptive AI pipelines (federated or reinforcement learning). Their structure, functioning, and interrelationships are discussed with reference to FIGS. 1-12, illustrating how these approaches support the broad scope of the claims and may present additional advantages or alternative configurations, including configurations in which canonicalized cryptographic digests, linked Merkle-tree structures, ZKP verification, and ECDSA-secured commit operations support tamper-evident and privacy-preserving validation of jurisdiction-specific real estate metadata.

Referring now to FIG. 1 (sheets 1/21 and 2/21), in some implementations, this disclosure includes a Public Record Request (PRR) Module 100 in communication with a Metadata Reconciliation Engine (MRE) 200, forming part of a computer-implemented system for metadata acquisition, reconciliation, and validation. In various configurations, PRR Module 100 may retrieve government-issued real estate records in a cryptographically verified manner according to relevant jurisdiction-specific protocols, using a blockchain-supported verification ledger (possibly with ZKPs) to safeguard data authenticity at acquisition. In other implementations, the PRR Module 100 may execute steps such as retrieving first-owner metadata from official sources.

The PRR Module 100 can interface with official government databases (e.g., county assessors, municipal registries, national archives) to collect TMR values, PI values, or AP identifier values (220). In some configurations, it detects ownership discrepancies or errors before finalizing real estate transactions, thus reducing potential unauthorized activity or inadvertent mistakes. For instance, geospatial data overlays may supplement these TMR values, PI values, or AP identifier values.

Once metadata is acquired, the Metadata Reconciliation Engine (MRE) 200—including at least a processor 106 and memory 108 (illustrated in FIG. 1)—can facilitate AI-based schema alignment, anomaly detection, and geospatial checks. In some approaches, MRE 200 applies GNN algorithms to reconcile heterogeneous fields, comparing first-owner data from land development or zoning permit applications, subsequently issued permits/logs, and publicly recorded deeds or other last-owner instruments. In some implementations, publicly recorded deeds 222 may provide last-owner metadata for comparison by the MRE 200. MRE 200 may also cross-reference textual metadata with geospatial overlays (e.g., satellite imagery or LiDAR) to detect property boundary mismatches.

In various configurations, the MRE 200 may integrate reinforcement learning or Bayesian inference (metadata validation and processing 216) to classify anomalies with confidence-weighted outputs. These anomalies may be flagged for prompt review, enabling near real-time correction of discrepancies involving TMR values, PI values, or AP identifier values. In other implementations, a Soft AI Processor 110 and associated ML Engine Memory (CL) 116 can work alongside processor 106 to enhance classification throughput.

When metadata fields are aligned, an Anomaly Detection Engine 224 (FIG. 1) can classify potentially unauthorized entries (e.g., non-uniform permit references, typographical errors, data corruption) and route flagged anomalies to blockchain verification and anomaly logging 300. There, canonicalized cryptographic digests may be stored as linked Merkle-tree structures, and ZKP-based verification or digital signature verification may support tamper-evident validation.

In further configurations, flagged anomalies are stored in a ledger storage 315, preserving cryptographic validation and archival references for historical use. In some implementations, an internal subcomponent calibrates detection sensitivity based on real-world risk factors or prior resolutions, potentially using reinforcement learning or multimodal anomaly detection.

Additionally, blockchain verification and anomaly logging 300 may establish a tamper-evident audit trail of validated metadata or flagged irregularities. A zero-knowledge proof (ZKP) infrastructure can preserve privacy, while cryptographic methods (asymmetric encryption, quantum-resistant ciphers, or ECDSA-secured commit operations) help secure data integrity. A dedicated ledger storage 315 can integrate with public or private (permissioned) blockchains, or serve as a private environment for financial institutions, government entities, or title companies. These features focus on aspects of blockchain integrity, cryptographic verification, or secure transaction handling.

Though FIG. 1 references some modules (some indicated by placeholders), additional or alternative modules—such as advanced geospatial analytics, decentralized identity management (SSI), or contract execution engines—may be present while remaining within the scope of the appended claims.

Usage Scenario 1: (Pre-Purchase & Early Due Diligence)

In one illustrative scenario, a prospective homebuyer (Jane Doe) and a mortgage lender (ABC Bank) investigate the property at 19251 Harlow Sq Unit C-311, Lansdowne 20176-6515, Virginia, USA. PRR Module 100 retrieves a building/zoning permit application filed on Apr. 16, 2006, by Developer ABC—the first owner of record. This permit cites a newly assigned TMR value (/62/K29/////2/) plus PI values or AP identifier values. Subsequent logs from May 29, 2007 indicate similar TMR values, PI values, or AP identifier values. The MRE 200 cross-checks these data with county archives, discovering a conflicting TMR value (/62/K45///PHC/). The Anomaly Detection Engine 224 triggers an automated update to blockchain verification and anomaly logging 300, issuing near real-time alerts that help resolve irregularities before mortgage underwriting. Spotlighting the original permit application as a primary source of TMR values, PI values, or AP identifier values can avert potential chain-of-title disputes.

Usage Scenario 2 (Title Review & Post-Closing Resolution)

In another representative scenario, a title insurer and escrow agent review a building/zoning permit application from Apr. 16, 2006, revealing TMR values, PI values, or AP identifier values that diverge from post-2008 property transfer data. Updated logs from the subsequent year mention a TMR value (/62/K50PCC311/). A last-owner deed references yet another TMR value or AP identifier value, compounding confusion. Once flagged by Anomaly Detection Engine 224, the system updates the blockchain verification and anomaly logging 300, preserving unresolved anomalies. The ledger storage 315 tracks these discrepancies, enabling stakeholders to request clarifications from the agency that assigned TMR values, PI values, or AP identifier values. After the county confirms valid parcel identifiers, a permanent ledger record ensures an auditable resolution timeline.

In some approaches, these scenarios highlight multi-stakeholder access to a single, blockchain-secured metadata repository, reconciling first-owner documents with last-owner instruments (deeds, liens), generating early alerts, geospatial boundary confirmations, and reinforcement learning-based classification. Over time, modules such as self-sovereign identity (SSI) or advanced geospatial analytics may be layered on, as illustrated in FIG. 1 and the associated claims.

If an ownership conflict surfaces, the Anomaly Detection Engine 224 generates immediate alerts. Unresolved discrepancies are logged in blockchain verification and anomaly logging 300 (see FIG. 1). This can support an auditable chain of custody for property-record validation. Upon resolution, the ledger storage 315 provides a thorough record for post-closing due diligence.

In some implementations, multi-signature protocols or advanced ciphers may safeguard ledger entries. While GNN-based schema matching and reinforcement learning approaches are described, other AI algorithms (gradient boosting, support vector machines) can be substituted based on data or jurisdiction specifics.

Geospatial overlays (e.g., LiDAR, aerial imagery) may confirm boundary lines or detect unauthorized changes, as in multi-modal AI or boundary checks. These features remain optional but can improve anomaly detection accuracy, aiding city councils, planning commissions, or insurers in evaluating compliance and zoning.

In some approaches, FIG. 1 references a real property address (19251 Harlow Sq Unit C-311) along with TMR values, PI values, or AP identifier values to illustrate how stakeholders (developers, homeowners, lenders, title agents, escrow companies) may handle flagged irregularities. These references do not limit the scope of the present disclosure but exemplify possible real-world usage. In some implementations, a general disclaimer may remind stakeholders that verifying property details is strongly recommended. Any final verification step can be cryptographically logged in ledger storage 315, facilitating an auditable chain of custody for property transfers or compliance checks.

Taken together, FIG. 1 shows how first-owner metadata from government-issued sources is retrieved by PRR Module 100, then reconciled with last-owner or publicly recorded data via MRE 200. An AI anomaly detection engine (224) flags inconsistencies, culminating in a blockchain-secured anomaly logging system 300. Cryptographic methods (ZKPs, quantum-resistant ciphers, ECDSA, canonicalized cryptographic digests, and Merkle-tree integrity checks) may offer tamper-evident safeguards, while optional modules (real-time validation interfaces or SSI frameworks) can broaden functionality. Those skilled in the art may appreciate that variations remain within the spirit and scope of the appended claims. The described architecture accommodates multi-jurisdiction and multi-modal data reconciliation tasks, not disclaiming any broader subject matter set forth herein.

Metadata Acquisition and Validation Framework

Referring now to FIG. 2 (sheet 3/21), examples of the present disclosure may include a metadata acquisition and validation framework 120 within a computer-implemented system for real estate metadata reconciliation and anomaly detection. In some configurations, a Public Record Request Module 100 generates and submits automated record requests according to relevant jurisdiction-specific protocols to government authorities, retrieving building or zoning permit applications, subsequent permits or logs, and property ownership history documents referencing a first owner of record (e.g., a developer or homebuilder). A processor 112 and memory 114 may execute natural language processing (NLP)-based metadata extraction to identify TMR values 232, PI values 234, or AP identifier values 236. This initial data acquisition supports structured metadata retrieval.

Metadata Extraction and Processing

Once the framework 120 has gathered and normalized TMR values 232, PI values 234, or AP identifier values 236 from government-issued records (first owner of record) and public registries (last owner of record), an AI-powered schema matching and validation process 205 compares these heterogeneous metadata structures. At a GNN Schema matching engine 210, the system aligns fields across multiple jurisdictions, detecting possible conflicts such as mismatched ownership references or boundary descriptors. This step supports AI-driven or cryptographic anomaly detection.

In some examples, the system uses self-supervised learning to analyze more complex data patterns when labeled datasets are limited. Meanwhile, a Metadata validation module 230 executes cryptographic proofs to maintain data integrity, cross-references metadata through federated learning, and supports a reinforcement learning approach that flags anomalies for manual or automated review-thus supporting unauthorized-activity detection features.

Blockchain-Based Metadata Verification

Examples may also include integrating a blockchain layer (not explicitly labeled in FIG. 2 but potentially compatible with the Metadata validation module 230) to ensure tamper-evident recordkeeping and cryptographic transparency. For instance, cryptographic hashing can generate canonicalized cryptographic digests for validated fields, while a digital signature verification process authenticates data sources (e.g., county assessors, accredited title agencies). By combining blockchain verification with AI classification, the system may achieve multi-layered validation of real estate records. A quantum-resistant or elliptic-curve cryptographic framework may also support a quantum-safe encryption approach.

AI Model Training and Continuous Learning

It is still another feature of the disclosure that dynamic or federated learning protocols can be applied to AI model training. By aggregating real-world data from government-issued records, public registries, and historical transactions, the system refines an anomaly detection model while maintaining privacy of sensitive personal data. In some implementations, the model automatically adjusts anomaly thresholds based on prior resolutions, reducing false positives over time and enhancing accuracy. This approach supports adaptive or federated AI.

Geospatial and AI-Driven Anomaly Ranking

In some examples, the framework may also include AI-driven anomaly classification 238 that leverages geospatial data (e.g., satellite imagery or LiDAR) to identify suspicious boundary changes or mismatched addresses. By merging geospatial data with self-supervised learning or reinforcement learning, this configuration produces a risk score for anomalies. When a discrepancy exceeds a threshold, the system may log an alert to a blockchain or distributed ledger for tamper-evident tracking. Advanced geospatial analytics can help prioritize or investigate irregularities in real time.

Usage Scenario 1 (Pre-Purchase & Mortgage Loan Origination)

Consider a pre-purchase scenario where a prospective homebuyer and mortgage lender consult the framework in FIG. 2 to review 19253 Harlow Sq Unit C-312, Lansdowne 20176-6515, Virginia, USA. Using Public Record Request Module 100, the system acquires building or zoning permit applications, subsequent permits or logs, and property ownership history documents traceable to the first owner of record (Developer ABC). Government-issued internal documents reference TMR values 232 of/62/K29/////2/ or /62/K45///PHC/, and PI values 234 or AP identifier values 236 of 113-40-5108-000 or 113-40-4712-000, whereas publicly recorded data shows a modified TMR value /62/K50PCC312/ and PI value or AP identifier value 113-40-4713-002. The AI-Powered schema matching and validation process 205, alongside reinforcement learning-based anomaly detection, flags this discrepancy before the buyer commits to financing, thereby reducing late-stage loan denials and clarifying the property data for involved parties.

Usage Scenario 2 (Post-Closing & Title Reverification)

After closing, a title insurance company and escrow agent may employ the Metadata validation module 230 to confirm whether TMR values 232, PI values 234, or AP identifier values 236 from the original permits still align with government "approved" records. Suppose TMR values shift from /62/K29/////2/ or /62/K45///PHC/ to /62/K50PCC312/, and PI values from 113-40-5108-000 or 113-40-4712-000 to 113-40- 4713-002, as observed for the same property at 19253 Harlow Sq Unit C-312. This mismatch triggers the AI-driven anomaly classification 238. If geospatial analysis detects boundary or address issues, a high risk score may prompt immediate review by lenders or city officials. A tamper-evident record of any resolution is preserved, safeguarding the chain-of-title data against undisclosed alterations.

Whether discrepancies are addressed immediately or may entail more involved review, optional blockchain integration can keep flagged anomalies or corrections in a tamper-evident ledger to support cryptographic or blockchain-secured property governance. By generating canonicalized cryptographic digests for updated entries containing TMR values, PI values, or AP identifier values and applying digital signatures, the system can help deter unauthorized changes. Geospatial checks may also be performed if the anomaly classification module 238 indicates potential physical mismatches, thereby reassuring stakeholders—such as lenders, appraisers, or rating agencies—of the final property record's integrity.

As FIG. 2 illustrates, various modules (e.g., AI-powered schema matching and validation 205, GNN schema matching engine 210, metadata validation module 230, AI-driven anomaly classification 238) may be combined or omitted based on stakeholder objectives. They can address scenarios ranging from pre-purchase to post-closing workflows, bridging county assessor data with tax authority or municipal records. Such flexibility addresses diverse compliance and real estate verification challenges, emphasizing non-limiting language as reflected in the appended claims.

It is yet another aspect that geospatial overlays (e.g., satellite imagery, LiDAR) may complement TMR values 232, PI values 234, or AP identifier values 236 by mapping these identifier values to physical parcel boundaries. The AI-driven anomaly classification module 238 analyzes historical data to flag potential encroachments, unrecorded expansions, or misalignments involving TMR values. If a boundary mismatch is discovered at 19253 Harlow Sq, Unit C-312, the system logs it in a tamper-evident manner to facilitate remediation. Such geospatial analytics promote validation at various transaction stages and may limit the potential reliance on post-hoc corrections.

Referring now to FIG. 3 (sheets 4/21 and 5/21), examples of the present disclosure may include a metadata validation and AI-powered verification module 950, which can form part of a computer-implemented system for real estate metadata reconciliation and anomaly detection. In some configurations, module 950 may include a metadata acquisition and reconciliation module 310 that collects and normalizes metadata from various sources. These sources can include government-issued records 335 (first-owner metadata, for example, a landowner such as a developer or homebuilder), public registry data 360 (last-owner metadata), and historical transaction data 370. A processor 312 and memory 314 within module 310 can store and execute analytics pipelines to spot missing or incorrect entries caused by typographical errors, outdated records, or cross-jurisdictional inconsistencies. Such steps support AI-based retrieval and verification processes.

Metadata Extraction and Processing

Once module 310 gathers and normalizes TMR values, PI values, or AP identifier values, an AI-powered metadata validation module 326 may employ machine learning methods to classify and reconcile the data. In some examples, a graph neural network (GNN) schema matching engine 322 compares heterogeneous structures to detect inconsistencies in ownership references, lien status, or boundary descriptors, supporting AI-driven or cryptographic anomaly detection. A self-supervised learning subsystem 323 may detect complex patterns for AI model retraining when labeled data is limited. Meanwhile, a reinforcement learning-based anomaly detection subsystem 324 can assign risk scores to flagged discrepancies, prioritizing them for manual or automated review to support unauthorized-activity detection features.

Blockchain-Based Metadata Verification

Examples may also include a blockchain-based metadata verification component 330 that provides tamper-evident recordkeeping and cryptographic transparency. A cryptographic hashing module 332 can generate canonicalized cryptographic digests for validated metadata, while a digital signature verification subsystem 334 authenticates data sources (for example, county assessor offices or accredited title agencies). By combining blockchain technology with AI classification, it is still another aspect of the system to deliver multi-layered validation of real estate records. In some configurations, quantum-resistant or elliptic-curve cryptographic frameworks support quantum-safe encryption provisions.

AI Model Training and Continuous Learning

It is yet another facet of the disclosed subject matter that AI model training data sources 340 may consolidate real-world data from government-issued records 335, public registry data 360, and historical transaction data 370. In some approaches, dynamic or federated learning protocols can update AI anomaly detection algorithms in a manner that preserves data privacy. By referencing historical anomaly resolutions, the system can automatically adjust threshold levels in the reinforcement learning pipeline, progressively reducing false positives and improving accuracy.

Geospatial and AI-Driven Anomaly Ranking

In some examples, the system may further use a geospatial and AI-driven anomaly ranking 380 that compares historical data to rank metadata anomalies, improving AI precision through continuous feedback. This approach can analyze boundaries or lot data for suspicious irregularities (e.g., unauthorized parcel expansions, mismatched addresses). In various configurations, geospatial data (satellite imagery or LiDAR) may merge with the self-supervised learning subsystem 323 and the reinforcement learning-based anomaly detection subsystem 324 to produce a risk score, triggering additional blockchain-recorded investigations. Advanced geospatial analytics can be used to prioritize or examine real estate data inconsistencies.

Usage Scenario 1 (Pre-Purchase and Mortgage Loan Origination)

Consider a pre-purchase scenario where a homebuyer and lender consult module 950 to reconcile TMR values, PI values, or AP identifier values for 19259 Harlow Sq Unit C-332, Lansdowne 20176-6515, Virginia, USA. Building or zoning permit applications referencing a TMR value /62/K29/////2/ or /62/K45///PHC/, plus subsequent logs with a PI value or AP identifier value 113-40-5108-000 or 113-40-4712-000, identify a first owner of record (Developer ABC). Public registries (e.g., local recorder's offices, tax assessments, judicial databases) show a differing TMR value (/62/K50PCC332) and an AP identifier value (113-40-4713-006). If the reinforcement learning-based anomaly detection subsystem 324 flags these mismatches, the blockchain-based metadata verification component 330 may document the discrepancy, alerting the lender's underwriters and the homebuyer's broker or attorney. By leveraging the cryptographic hashing module 332 and digital signature verification subsystem 334, the system can maintain a tamper-evident log of irregularities. Early detection helps avoid last-minute loan rejection and supports compliance with local rules, helping maintain alignment of TMR values, PI values, or AP identifier values from initial permit application onward.

Usage Scenario 2 (Post-Closing and Title Reverification)

In another representative scenario, title insurance companies and escrow agents verify that TMR values, PI values, or AP identifier values cited in the original building or zoning permits still match official records post-transfer. Suppose the first owner of record (Developer ABC) initially referenced /62/K29/////2/ or /62/K45///PHC/ as the TMR value and 113-40-5108-000 or 113-40-4712-000 as a PI value or AP identifier value for 19259 Harlow Sq Unit C-332. Then, current records (e.g., public registry data 360) list a TMR value /62/K50PCC332 and a PI value or AP identifier value 113-40-4713-006, indicating a discrepancy for the last owner of record. The AI-powered metadata validation module 326 detects the conflict and may trigger the blockchain-based metadata verification component 330 to log the anomaly. If geospatial analysis or AI-driven anomaly ranking 380 reveals boundary mismatches, city councils, county boards, or secondary market investors might be notified. By securely anchoring updates and resolutions in a distributed ledger, the system can prevent future title disputes, stabilize tax assessments, and assure stakeholders (lenders, property insurers, housing inspectors) that TMR values, PI values, or AP identifier values remain valid across the overall transaction history.

Regardless of how promptly these discrepancies are resolved, the blockchain-based metadata verification component 330 maintains a tamper-evident record of flagged anomalies or corrections. A cryptographic hashing module 332 and digital signature verification subsystem 334 may guard updates against unauthorized changes by generating canonicalized cryptographic digests and authenticating corresponding ledger updates. In some approaches, geospatial or AI-driven anomaly ranking 380 can also be applied if boundary or lot data warrant cross-checking with satellite or LiDAR imagery. This synergy helps city planners, surveyors, tax authorities, and risk managers confirm accurate updated metadata, thereby mitigating potential real estate conflicts and enabling compliance with municipal or county regulations.

Figure 4:
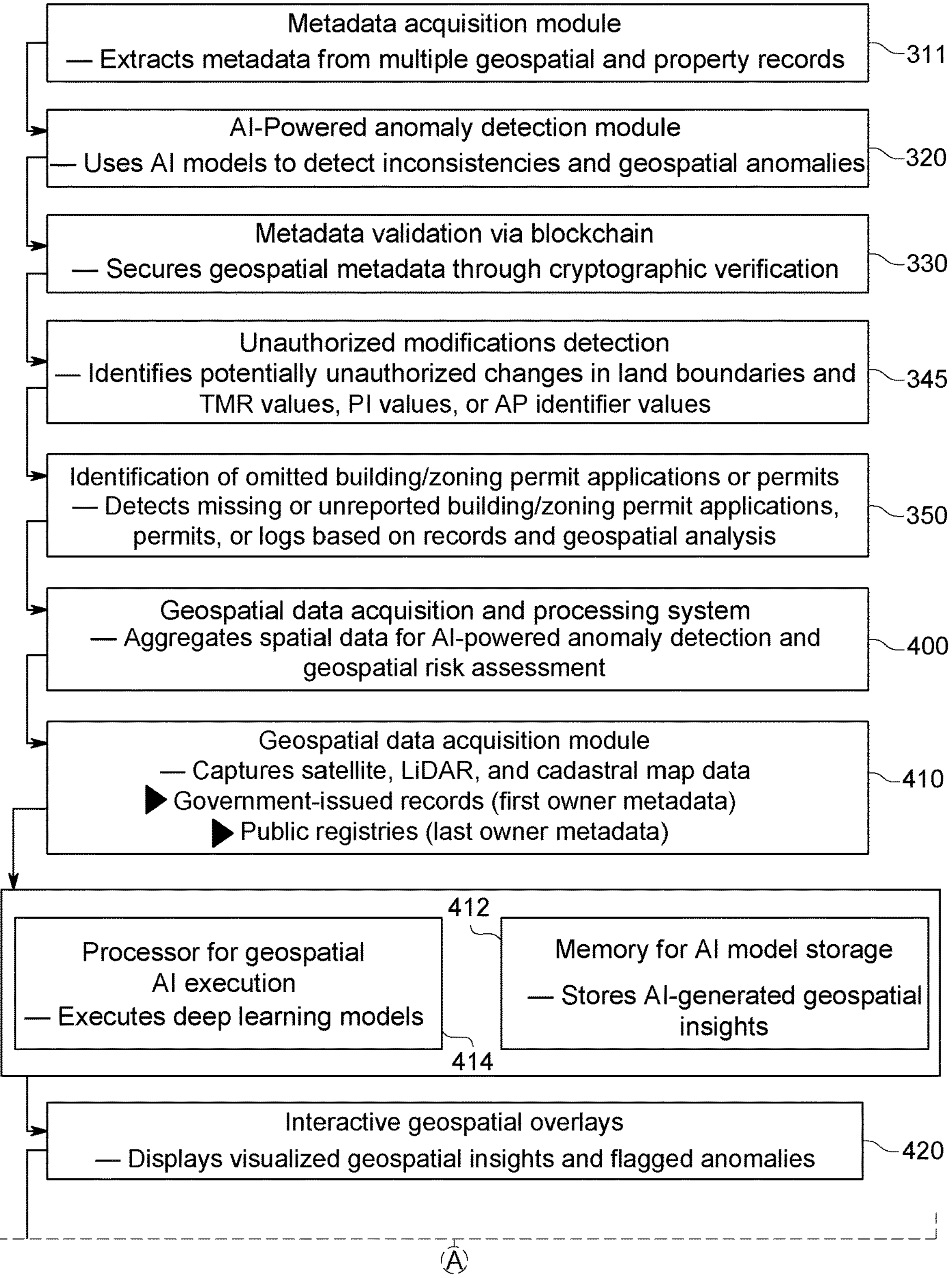
FIG. 4 is a diagram of a metadata validation process integrating AI-powered verification, blockchain-based metadata integrity, and geospatial analytics.
Figure 4:
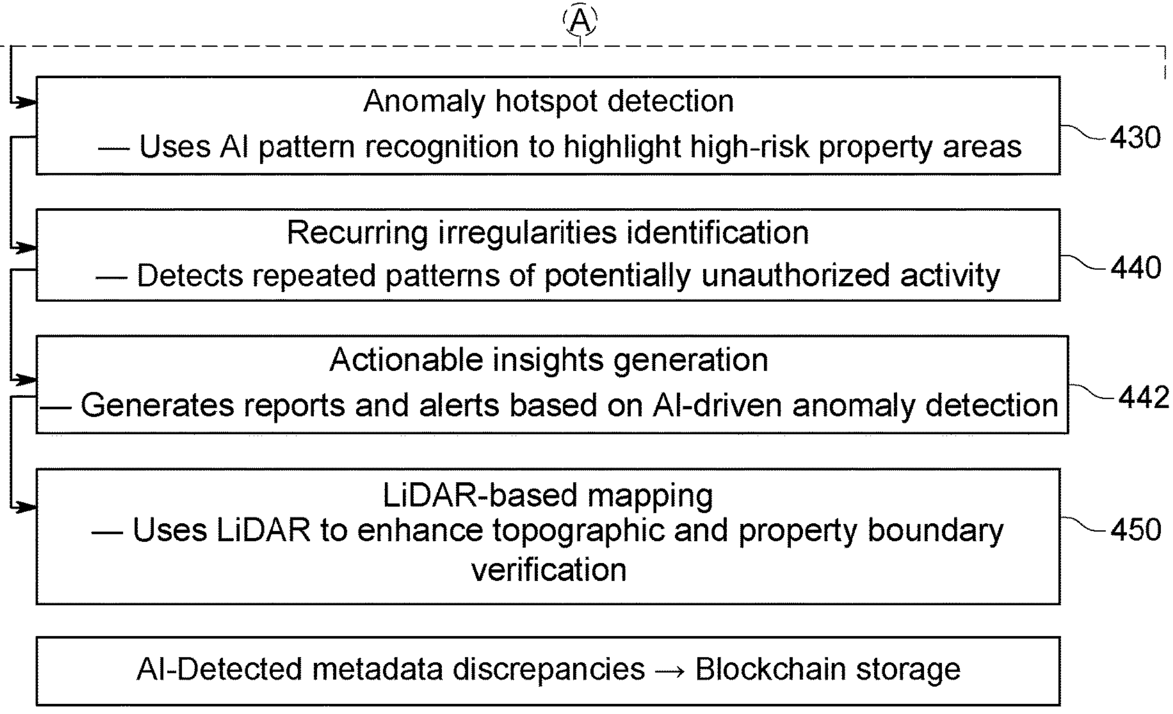

Referring now to FIG. 4 (sheets 6/21 and 7/21), examples of the present disclosure may include a metadata validation process 305 that integrates AI-powered verification with a blockchain-supported layer for metadata integrity. In some approaches, this process may combine geospatial analytics with machine learning to detect and address boundary inconsistencies, unreported construction, or other irregularities in real estate data. The system can gather property records—such as records containing TMR values, PI values, or AP identifier values—from diverse repositories, employing both AI anomaly detection and canonicalized cryptographic digests and cryptographic proofs to ensure data authenticity.

Metadata Acquisition Module and AI-Based Anomaly Detection

It is yet another aspect of the disclosed subject matter that a metadata acquisition module 311 may extract metadata from multiple geospatial or property data sources, pinpointing errors or missing entries by comparing newly acquired records against baseline references. An AI-powered anomaly detection module 320 can then apply machine learning to identify or classify suspicious metadata. For instance, if boundary data from official logs is misaligned with newly retrieved zoning or topographic data, module 320 may flag the discrepancy. This supports multi-modal AI classification and integrity checks.

Blockchain-Based Validation

Examples may also include metadata validation via blockchain 330, which enables cryptographic verification of geospatial metadata. In some configurations, canonicalized cryptographic digest generation and zero-knowledge-proof (ZKP) verification methods can preserve privacy while ensuring tamper-evident recordkeeping. By uniting geospatial analytics with a blockchain layer, the system may verify trustworthy land boundaries, building permits, or property encumbrances across multiple sources or jurisdictions.

Unauthorized Modifications Detection and Omitted Permits

Another aspect depicted in FIG. 4 includes subsystems 345 and 350, focused on detecting unauthorized boundary changes (e.g., parcel encroachments) or unreported building permits. In some implementations, these subsystems may interact with the anomaly detection module 320 for more refined anomaly detection. In various examples, geospatial overlays (e.g., satellite or LiDAR imaging) can be cross-referenced to reveal incremental boundary modifications or missing building permits. Coupled with the geospatial data acquisition and processing system 400, this mechanism can autonomously identify property changes that deviate from official or publicly recorded data.

Geospatial Data Acquisition and Processing System (400) and Processors

A further aspect of the present disclosure may include a geospatial data acquisition and processing system 400 that aggregates spatial data for AI-powered anomaly detection. In some approaches, a geospatial data acquisition module 410 captures LiDAR scans, aerial imagery, or cadastral maps, merging them with government-issued first-owner or publicly recorded last-owner data. A processor 414 and memory 412 can run deep learning models to detect boundary lines, building footprints, or newly added structures absent from official logs. By comparing up-to-date geospatial information with historical baselines, the system can identify unauthorized expansions or subdivisions.

Interactive Geospatial Overlays and Anomaly Hotspots Detection

In some examples, interactive geospatial overlays 420 may display flagged anomalies to stakeholders—such as surveyors, city councils, property insurers, or local recorder's offices. An anomaly hotspots detection 430 module uses AI pattern recognition to highlight high-risk regions involving repeated boundary violations or omitted permits, referencing historical records obtained by metadata acquisition module 311. This overlay approach can facilitate near real-time remediation of flagged issues, taking advantage of multi-modal geospatial data.

Recurring Irregularities Identification, Actionable Insights Generation, and LiDAR-Based Mapping It is still another feature of the system to incorporate recurring irregularities identification 440, which detects patterns of repeated potentially unauthorized activity, referencing historical transactions or previously flagged anomalies. An actionable insights generation 442 module can translate AI-detected anomalies into structured alerts or reports for relevant authorities or property owners. Meanwhile, LiDAR-based mapping 450 may add a verification layer for topographic or boundary details, helping reduce inaccuracies that might disrupt property transactions. These features support AI-driven metadata classification, cryptographic verification, or geospatial boundary checks.

Usage Scenario 1 (Pre-Closing Boundary Verification)

Consider a pre-closing scenario where a prospective homebuyer and a mortgage lender consult metadata validation process 305 to confirm building or zoning permit applications referencing TMR values /62/K29/////2/ or /62/K45///PHC/ and PI values 113-40-5108-000 or 113-40-4712-000, initially assigned by local authorities to the first owner of record (Developer ABC) for 19261 Harlow Sq Unit C-331, Lansdowne 20176-6515, Virginia, USA. Official records from local recorder's offices or real estate tax assessments may now list a potentially modified TMR value /62/K50PCC331/ or AP identifier value 113-40-4713-005 for the last owner of record (John Smith). If unauthorized modifications detection 345 reveals conflicting boundary lines-comparing LiDAR scans (captured by geospatial data acquisition module 410) to building logs—the anomaly detection module 320 can flag the mismatch. Anomaly hotspots detection 430 might then highlight encroachment potential, prompting alerts to escrow companies, zoning commissions, or county boards. By storing canonicalized cryptographic digests for flagged discrepancies via blockchain validation 330, the system preserves a tamper-evident ledger record of flagged updates. This approach may help avert closing delays and bolster confidence among buyers or lenders that boundaries, permits, and TMR values, PI values, or AP identifier values align with original documents.

Usage Scenario 2 (Post-Closing Permit Compliance and Lien Verification)

In another representative scenario, title insurance companies and property insurers review the same property at 19261 Harlow Sq Unit C-331 to confirm whether building or zoning permits—originally assigned TMR values /62/K29/////2/ or /62/K45///PHC/—remain valid in light of a newly recorded special warranty deed referencing TMR value /62/K50PCC331/ and PI value or AP identifier value 113-40-4713-005. Using the geospatial data acquisition and processing system 400, the system may compare topographic footprints or aerial images (acquired by module 410) against building logs. If the omitted permits identification 350 reveals missing or unreported building/zoning logs, the AI-powered anomaly detection module 320 flags the conflict. Anomaly hotspots detection 430 might expose multiple properties in this region with unreported modifications, prompting local authorities, secondary market investors, or real estate appraisers to investigate. By recording rectifications or clarifications and corresponding canonicalized cryptographic digests in blockchain validation 330, the system produces a tamper-evident audit trail for subsequent transactions, which may help reduce disputes about unrecorded liens and maintaining credible ownership histories.

In summary, FIG. 4 demonstrates how an AI-powered metadata validation process 305 can integrate the geospatial data acquisition and processing system 400 (including modules 410, 412, 414), anomaly detection 320, and blockchain verification 330 to keep property records accurate and tamper-evident. In some implementations, unauthorized modifications detection 345, omitted permits identification 350, anomaly hotspots detection 430, and recurring irregularities identification 440 may rely on deep or federated learning to refine detection over time. By illustrating both pre-closing boundary checks and post-closing permit compliance (e.g., 19261 Harlow Sq, Unit C-331), this disclosure provides a broad solution covering canonicalized cryptographic digest generation and cryptographic proofing for real estate data, AI-based anomaly classification, and geospatial analysis. Persons skilled in the art may find alternate cryptographic algorithms, AI techniques, or role-based access controls that likewise remain within the spirit and scope of the appended claims.

Referring now to FIG. 5 (sheet 8/21), examples of the present disclosure may include a blockchain-based metadata reconciliation system 500 that integrates AI-driven verification processes to maintain an authentic, tamper-evident chain of custody for real estate data. In some configurations, a blockchain audit trail module 510 and distributed ledger processing 512 can track property record updates in near real time, record comparisons between first-owner metadata and last-owner metadata, enhancing transparency and regulatory compliance. A cryptographic engine 514, responsible for canonicalized cryptographic digest generation, digital signature verification, and zero-knowledge proof (ZKP) validation, may secure sensitive information to support secure, tamper-evident ledger mechanisms.

AI-Powered Metadata Reconciliation Engine

In some implementations, an AI-powered metadata reconciliation engine 590 can retrieve metadata from government-issued and public registries, potentially focusing on TMR values 520, PI values 530, or AP identifier values 540. By applying AI-based anomaly detection and recording canonicalized cryptographic digests corresponding to identified discrepancies in blockchain storage, the system may preserve flagged records in a tamper-evident manner. In various configurations, engine 590 may compare newly submitted or revised entries (for example, ownership transfers or lien releases) against established archives through associated record comparisons 550, thereby validating data accuracy.

Publicly Recorded Metadata Storage and Validation System

The present disclosure may also include a publicly recorded metadata storage 560, which can secure updated or flagged records via canonicalized cryptographic digests and cryptographic proofs. In some approaches, a validation system 570 ensures that reconciled data complies with jurisdictional or stakeholder guidelines, leveraging AI-based anomaly classification to detect inconsistencies involving TMR values, PI values, or AP identifier values. The cryptographic engine 514 may subsequently verify these records, helping deter unauthorized or accidental alterations.

Supplemental Evidence Annotation

As an additional aspect of the disclosed subject matter, a supplemental evidence annotation 580 can attach supporting files—such as property survey maps, building permits, or notary logs—to bolster legal or regulatory assurances. By linking these documents with blockchain entries as authenticated annotations, the system may advance property governance. This feature also supports constructive possession by illustrating how real-world attachments integrate seamlessly with on-chain records.

Usage Scenario 1 (Pre-Closing & Title Verification)

Consider a pre-closing scenario in which a title insurance company and an escrow agent rely on blockchain audit trail module 510 to verify TMR values, PI values, or AP identifier values for building or zoning permits concerning the property located at 19263 Harlow Sq Unit C-342, Lansdowne 20176-6515, Virginia, USA. Suppose the first owner of record (Developer ABC) was assigned TMR values /62/K29/////2/ or /62/K45///PHC/ and AP identifier values or PI values 113-40-5108-000 or 113-40-4712-000, while public registries now list a TMR value /62/K50PCC342 or a PI value or AP identifier value 113-40-4713-008 under the last owner of record (John Smith). The AI-powered metadata reconciliation engine 590 can detect mismatches between these building permit references and newly recorded instruments, recording corresponding canonicalized cryptographic digests through distributed ledger processing 512. The cryptographic engine 514 may sign or validate flagged entries, preserving a tamper-evident audit trail. Such an approach may help prevent title disputes, reduce transaction delays, and ensure adherence to local or municipal rules regarding correct data comprising TMR values, PI values, or AP identifier values.

Usage Scenario 2 (Post-Closing & Lien Release Reconciliation)

In another scenario, homebuyers, county clerks, and housing inspectors revisit the same property (19263 Harlow Sq Unit C-342) to confirm that updated lien releases or boundary changes accord with original ownership documentation. If a newly submitted release lists a TMR value /62/K50PCC342 or an AP identifier value 113-40-4713-008 but omits the initially assigned TMR values /62/K29/////2/ or /62/K45///PHC/, the AI-powered metadata reconciliation engine 590 may flag this discrepancy, recording it in publicly recorded metadata storage 560. By consulting supplemental evidence annotation 580 (e.g., notarized records or building permits), stakeholders (city councils, financial institutions, or risk management firms) can determine whether the mismatch indicates an unauthorized modification. Once the validation system 570 confirms that resolution criteria are met, the cryptographic engine 514 may log the outcome on the distributed ledger. This approach may mitigate unauthorized-activity risk, uphold reliability of TMR values, PI values, or AP identifier values, and preserve trust among lenders and local authorities for post-closing updates.

As illustrated in FIG. 5, the blockchain-based metadata reconciliation system 500 unites the AI-powered metadata reconciliation engine 590, cryptographic engine 514, and distributed ledger components (510, 512) to maintain a tamper-evident chain of custody over metadata comprising TMR values, PI values, or AP identifier values. In various configurations, publicly recorded metadata storage 560 and validation system 570 may help ensure data accuracy and regulatory compliance, while supplemental evidence annotation 580 can strengthen legal or regulatory documentation as authenticated annotations associated with blockchain ledger entries. Some implementations may employ post-quantum encryption or elliptic-curve ciphers for digital signatures, hashing, or ZKPs. Persons of skill in the art may find that alternative AI algorithms—e.g., reinforcement learning or self-supervised learning-further enhance anomaly detection within the spirit and scope of these teachings, aiding city councils, appraisers, surveyors, and additional stakeholders who rely on robust land records and regulatory compliance.

Figure 6:
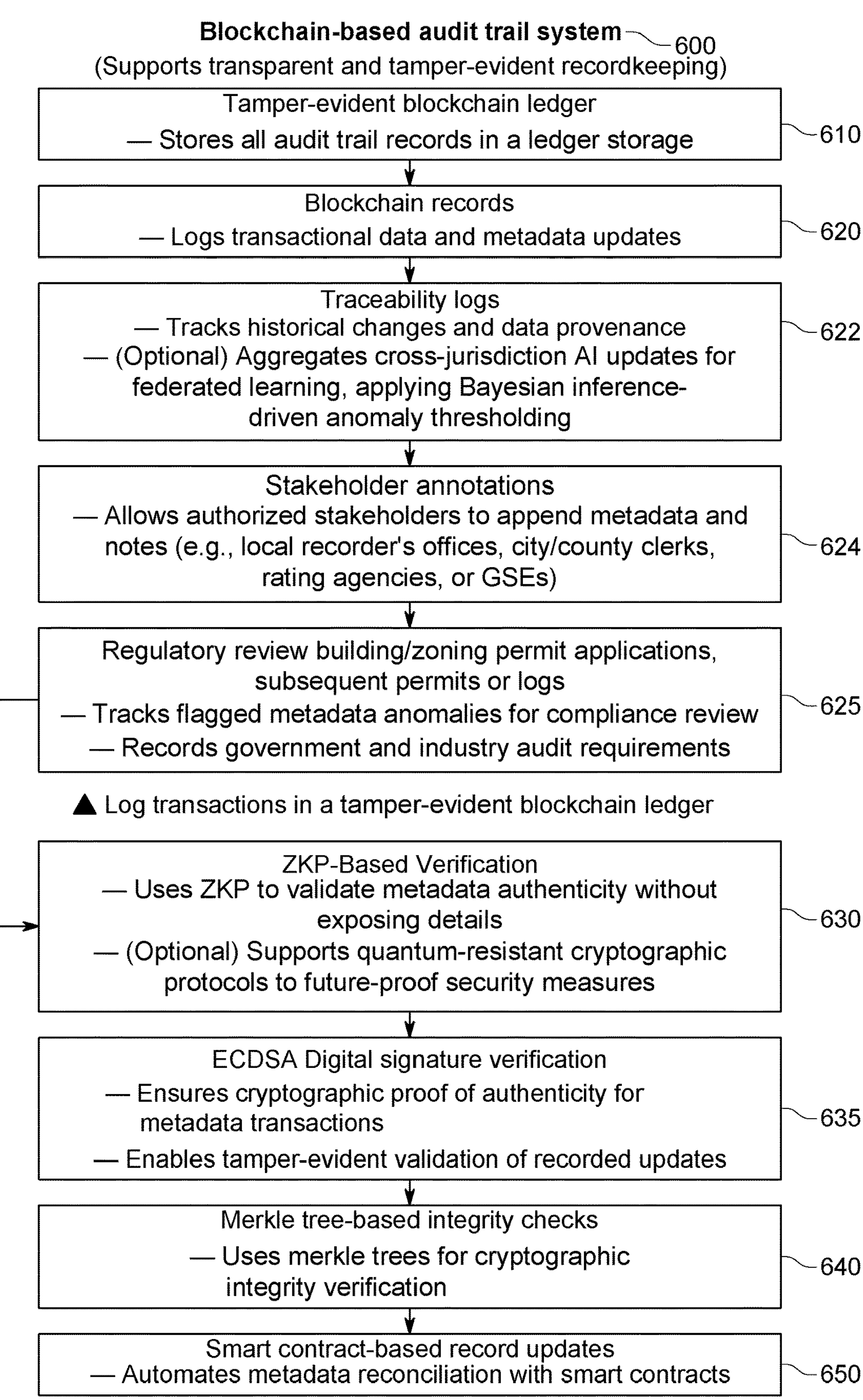
FIG. 6 is a diagram of a blockchain-based audit trail system including a tamper-evident blockchain ledger, blockchain records, traceability logs, stakeholder annotations, ZKP-based verification, ECDSA digital signature verification, Merkle-tree-based integrity checks, and smart-contract-based record updates.

Referring now to FIG. 6 (sheet 9/21), examples of the present disclosure may include a blockchain-based audit trail system 600 designed to offer transparent and tamper-evident recordkeeping for real estate transactions. In some configurations, a tamper-evident blockchain ledger 610 can store audit trail records—such as updates to TMR values, PI values, or AP identifier values—in a tamper-evident manner. Blockchain records 620 may capture transactional data and metadata changes at a granular level, supporting traceability for lenders, title companies, municipal offices, or other relevant stakeholders.

Traceability Logs and Stakeholder Annotations

It is yet another aspect that traceability logs 622 may track historical changes and data provenance, optionally aggregating cross-jurisdiction AI updates for federated learning or Bayesian inference-based anomaly thresholds. In some examples, stakeholder annotations 624 enable authorized participants (e.g., recorder's offices, city/county clerks, rating agencies, or GSEs) to append clarifying metadata—such as disclaimers, boundary notes, or property verifications. These annotations may be cryptographically hashed and preserved on-chain as authenticated annotations to maintain a cohesive, tamper-evident chain of custody.

Regulatory Review Logs

Examples may also include a regulatory review logs 625 component, tracking flagged metadata anomalies for compliance oversight and forming an audit trail for local or federal bodies. In some approaches, these logs may verify real-estate record authenticity, and can utilize AI or cryptographic methods to preserve data accuracy in a manner that does not reveal sensitive personal details.

ZKP-Based Verification and ECDSA Digital Signature Verification

A ZKP-based verification 630 can use zero-knowledge proofs to validate metadata authenticity while safeguarding confidential data. In some implementations, quantum-resistant cryptographic techniques may be employed for extended security. Concurrently, an ECDSA digital signature verification 635 module can provide cryptographic proof of authenticity for ledger transactions, helping ensure tamper-evident validation of recorded entries. By applying zero-knowledge proofs or digital signatures, the system can confirm that any changes originate from authenticated, legitimate sources.

Merkle Tree-Based Integrity Checks and Smart Contract-Based Record Updates

FIG. 6 also references Merkle tree-based integrity checks 640, which may cryptographically anchor aggregated or batched transactions for distributed ledger verification as linked Merkle-tree structures. In some approaches, smart contract-based record updates 650 can automate metadata reconciliation events, potentially incorporating anomaly detection triggers or multi-signature consensus, bolstering trust among relevant stakeholders (e.g., escrow companies, GSEs, or title insurers).

Usage Scenario 1 (Pre-Purchase & Permit Verification)

Consider a pre-purchase scenario in which homebuyers and mortgage lenders rely on traceability logs 622 and stakeholder annotations 624 to verify building or zoning permits referencing TMR values /62/K29/////2/ or /62/K45///PHC/ (initially assigned to Developer ABC, the first owner of record) for the 19269 Harlow Sq Unit C-351, Lansdowne 20176-6515, Virginia, USA. Public registries list a TMR value /62/K50PCC351/ for the last owner of record (John Smith), raising concerns about an unrecorded or tampered update. The system may activate regulatory review logs 625 to explore whether the new TMR value arises from a boundary adjustment not reflected in historical property ownership records. If ZKP-based verification 630 reveals no legitimate supporting documents for the changed TMR value, ECDSA digital signature verification 635 can ensure that any corrections are authorized. By storing canonicalized cryptographic digests and verification outcomes in the tamper-evident blockchain ledger 610, title insurers, lenders, and local authorities can confirm alignment of TMR values from the original assignment to final closing, helping avert last-minute financing denials or boundary conflicts.

Usage Scenario 2 (Post-Closing Lien Release & Record Updates)

In another representative instance, county clerks and escrow agents revisit the same property (19269 Harlow Sq Unit C-351) to verify that newly filed lien releases do not conflict with the TMR values, PI values, or AP identifier values stored in the tamper-evident blockchain ledger 610. Suppose a special warranty deed cites a TMR value /62/K50PCC351/ yet omits the original TMR values /62/K29/////2/ or /62/K45///PHC/. The smart contract-based record updates 650 may enforce a multi-signature approval step before any record modification. Stakeholder annotations 624 can capture clarifications from local recorder's offices or insurers, while traceability logs 622 track commentary additions or revisions. ZKP-based verification 630 might protect sensitive borrower data, and ECDSA digital signature verification 635 ensures modifications originate from valid sources. Through Merkle tree-based integrity checks 640, the system maintains a tamper-evident chain of custody, guarding owners and lenders against potentially unauthorized or incomplete adjustments post-closing.

System Integration and Claim Support

As outlined in FIG. 6, the blockchain-based audit trail system 600—including tamper-evident blockchain ledger 610, blockchain records 620, traceability logs 622, stakeholder annotations 624, regulatory review logs 625, ZKP-based verification 630, ECDSA digital signature verification 635, Merkle tree-based integrity checks 640, and smart contract-based record updates 650—can form a cryptographically secured ledger for discrepancies involving TMR values, PI values, or AP identifier values. In some configurations, the distributed ledger approach may support cross-jurisdiction compliance and log discrepancies as canonicalized cryptographic digests and linked Merkle-tree structures for future reconciliation. The system may employ advanced cryptographic frameworks (e.g., post-quantum methods or multi-signature consensus) and AI-based anomaly scoring to protect property ownership records. Persons skilled in the art may appreciate that variations in ledger algorithms, consensus mechanisms, or AI detection thresholds still fall within the spirit and scope of the appended claims, benefiting local or regional clerks, institutional investors, and other stakeholders relying on verified data.

Figure 7:
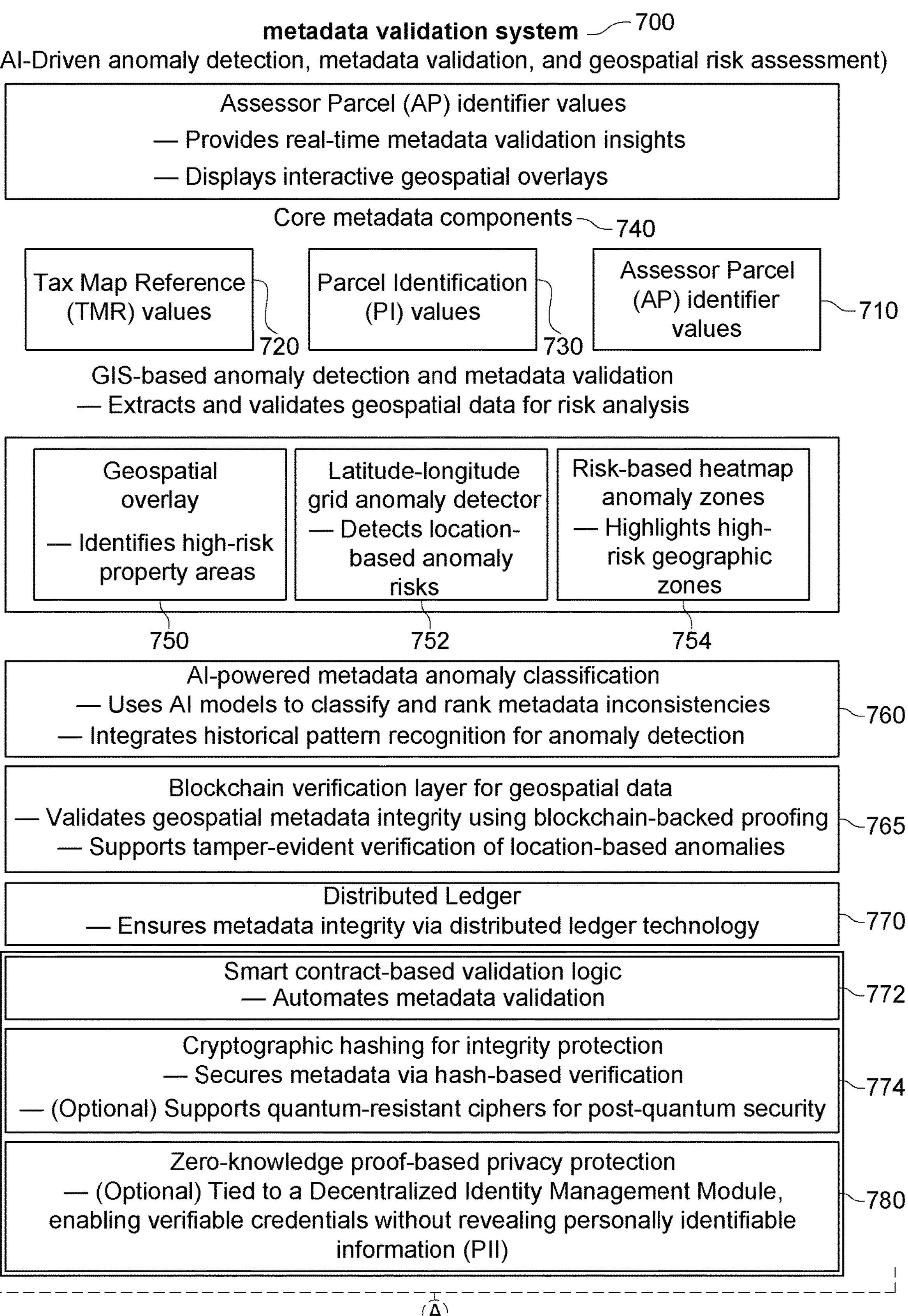
FIG. 7 is a diagram of a metadata validation system integrating GIS-based anomaly identification, geospatial overlays, AI-powered metadata anomaly classification, blockchain verification, distributed-ledger storage, cryptographic hashing, and zero-knowledge-proof-based privacy protection.

Referring now to FIG. 7 (sheets 10/21 and 11/21), examples of the present disclosure may include a metadata validation system 700 that integrates AI-driven anomaly detection, blockchain-based validation of metadata, including canonicalized cryptographic digests where applicable, and geospatial analytics to uncover real estate anomalies. In some implementations, core metadata components 740—including TMR values 720, PI values 730, and AP identifier values 710—may feed into a GIS-based anomaly detection and anomaly-identification workflow. In various approaches, geospatial overlays 750, a latitude-longitude grid anomaly detector 752, and risk-based heatmap anomaly zones 754 can highlight areas with potential discrepancies (e.g., boundary issues, unrecorded modifications). An AI-powered decision-support interface may display these geospatial findings for relevant stakeholders such as prospective homebuyers, real estate agents, or local zoning departments.

AI-Powered Metadata Anomaly Classification and Historical Pattern Recognition

In some implementations, an AI-powered metadata anomaly classification subsystem 760 may apply machine learning to categorize and rank metadata inconsistencies. Additionally, a historical data pattern recognition submodule (within 760) can uncover recurring anomaly patterns by analyzing historical records or detecting repeated boundary changes. In various configurations, the system may compile publicly recorded or municipal data.

Blockchain Verification Layer and Distributed Ledger

Once flagged, anomalies may be validated by a blockchain verification layer 765, ensuring geospatial metadata integrity through blockchain proofing. In some approaches, a distributed ledger 770 can preserve these updates across multiple nodes, forming a tamper-evident ledger record of possible discrepancies and corresponding canonicalized cryptographic digests. By linking geospatial data to a permissioned or public blockchain, the system can foster transparency among various stakeholders—government agencies, lenders, insurers, rating agencies, risk management firms—and further support cross-jurisdiction collaboration.

Smart Contract-Based Validation Logic, Cryptographic Hashing, and ZKP Privacy

Examples may also include invoking a smart contract-based validation logic 772 to automate metadata reconciliation within metadata validation system 700. A cryptographic hashing 774 module can generate canonicalized cryptographic digests for metadata, optionally integrating post-quantum ciphers for future-proofing. A zero-knowledge proof-based privacy protection 780 interface may facilitate verifiable credentials to confirm ownership or boundary legitimacy in a manner that does not reveal PII. This blend of blockchain functionality, cryptographic digest generation, and ZKPs aligns with claims covering cryptographic real estate verification.

Usage Scenario 1 (Pre-Purchase & Geospatial Verification)

Consider a pre-purchase scenario in which prospective homebuyers and mortgage lenders consult geospatial overlays 750 and a latitude-longitude grid anomaly detector 752 to confirm that building or zoning permits for the first owner of record (Developer ABC) accurately match boundaries around 19291 Harlow Sq Unit D-451, Lansdowne 20176-6515, Virginia, USA. Suppose the original records reference TMR values /62/K29/////2/ or /62/K45///PHC/ and a PI value 113-40-5398-000, whereas public registries (last-owner data) show a TMR value /62/K50PDD-451/ or a PI value or AP identifier value 113-40-5799-009. If the AI-powered metadata anomaly classification 760 detects unexplained variances (e.g., boundary expansions, omitted building logs), it may record corresponding validation data and canonicalized cryptographic digests using the blockchain verification layer 765. City councils, appraisers, or title companies may then examine these issues via the distributed ledger 770, prompting further geospatial checks. Once validated or remedied, smart contract-based validation logic 772 can automate the reconciliation, ensuring TMR values or PI values remain trustworthy before finalizing the mortgage or property sale.

Usage Scenario 2 (Post-Closing & Risk-Based Heatmap Anomaly Zones)

In another scenario, county boards, zoning commissions, and risk management firms may study the same property (19291 Harlow Sq Unit D-451) for potential boundary encroachments or unrecorded additions post-transfer. If risk-based heatmap anomaly zones 754 indicate repeated anomalies near the property's latitude-longitude grid, the system can correlate these findings with building logs or property ownership history documents, detecting unauthorized expansions that do not appear in the last owner of record's updated data. Any mismatch can invoke a zero-knowledge proof-based privacy protection 780 to confirm boundary authenticity in a manner that does not reveal personal information. Cryptographic hashing 774 may generate canonicalized cryptographic digests corresponding to revised geospatial updates for blockchain recordation to mitigate tampering. By capturing these modifications on the distributed ledger 770, the system can offer near real-time alerts to escrow agents, developers, or municipal assessors for reviewing or adjusting TMR values, PI values, or AP identifier values, supporting compliance with local rules.

Stakeholder Interactions and SSI & Ownership Verification

FIG. 7 further illustrates a stakeholder interaction sequence for SSI and ownership verification. This sequence shows how government entities may issue digital property credentials, and how sellers or buyers can employ zero-knowledge proofs (ZKPs) to confirm valid ownership in a manner that does not reveal personally identifiable information (PII). Title companies or lenders may reference ledger records via the distributed ledger 770 for potential geospatial anomalies. Upon successful validation, the system executes a smart contract-based update 772, enabling real-time reconciliation and tamper-evident completion. Multiple stakeholders—homebuyers, homeowners, real estate brokers, assessors, escrow entities, or mortgage lenders—may benefit from this proactive approach to anomaly detection and property governance.

In summary, FIG. 7 illustrates how metadata validation system 700 can merge AI anomaly detection 760, blockchain verification 765, 770, 774, 780, and geospatial analytics 750, 752, 754 to address real estate data inconsistencies. By referencing TMR values, PI values, or AP identifier values in geospatial overlays and analyzing historical data for repeated anomaly patterns, the system may provide advanced property governance—validating boundaries or ownership credentials prior to completing a transaction or revising zoning records. In some approaches, cryptographic frameworks (e.g., post-quantum keys, role-based access controls, canonicalized cryptographic digests, and ZKP-based verification) or AI methods (e.g., reinforcement learning, random forests, neural networks) remain within the spirit and scope of the claims, offering a wide variety of stakeholders—such as city councils, property insurers, or financial institutions—enhanced capabilities for reliable real estate data verification.

Referring now to FIG. 8 (sheets 12/21 and 13/21), examples of the present disclosure may include a metadata validation system 700 operating as an integrated decision-support and self-sovereign identity (SSI) system. In various implementations, AI-driven metadata adjustments—such as zoning verifications 751, tax reassessments 762, and lien reconciliations 778—may be carried out alongside blockchain-based identity validation. In some configurations, core metadata components 740 may comprise TMR values 720, PI values 730, and AP identifier values 710, directed into an AI-powered decision workflow. In additional approaches, geospatial data can be extracted and processed to assist in zoning, reassessments, or lien modifications, potentially leveraging federated learning for sophisticated anomaly thresholds.

Self-Sovereign Identity (SSI) Management and Validation

In various implementations, the disclosure may include an SSI management and validation structure. An SSI Identifier 802 can function as a distinct property identity, while a decentralized identity system 804 manages cryptographic identity verifications. In other setups, a decentralized identity management module 806 may oversee property owner credentials and collaborate with a processor 808 (for identity management) to execute SSI identity procedures. A memory 810 (for identity management) can securely store identity metadata, and a verifiable credentials (VCs) storage 816 may preserve cryptographically validated ownership or lien data. An ownership revocation mechanism 812 can govern disputed or revoked ownership entries, whereas stakeholder identity management 818 addresses stakeholder-side SSI, and seller identity management 820 handles seller-side SSI credentials. In additional approaches, these features may link to blockchain-supported title and identity management 822, which employs blockchain title management 824 for tamper-evident validation.

AI-Based Decision Analysis and Adjustments

Additionally, AI-based modules for zoning adjustments 751, tax reassessments 762, and lien reconciliations 778 may be incorporated in some implementations. In various configurations, these modules can parse updated TMR values, PI values, or AP identifier values—such as those related to property boundaries or newly discovered liens—and may trigger cryptographic checks in near real time. By integrating these processes with SSI, authorized owners or sellers (verified via a decentralized identity system 804) can approve metadata changes while preserving data integrity across multiple jurisdictions. As shown in FIG. 8, an AP identifier value 710 may be updated or validated as part of these workflows.

Usage Scenario 1 (Pre-Closing SSI Checks)

Consider a pre-closing scenario where title insurers and escrow agents rely on AI-driven metadata adjustments (751, 762, 778) plus the SSI management framework to confirm that building or zoning permits referencing TMR values /62/K29/////2/ or /62/K45///PHA/ (assigned by local authorities to the first owner of record, Developer ABC) remain in sync with newly assigned TMR values /62/K48PAA131/ in public registries for the real property 43531 Mahala St Unit A-131, Lansdowne 20176-6517, Virginia, USA. If the system detects an unapproved boundary extension or a lien discrepancy, AI-powered decision logic may prompt SSI checks to ensure the verified property owner or seller (authenticated via decentralized identity system 804) can confirm the update. Blockchain-backed title management 822 then logs the correction or dispute resolution as a tamper-evident ledger entry, assisting city councils, mortgage lenders, or rating agencies in verifying validity of TMR values, PI values, or AP identifier values prior to closing.

Usage Scenario 2 (Post-Closing Title Transfers and SSI Integration)

In another scenario, county clerks, developers, and real estate brokers revisit the same property (43531 Mahala St Unit A-131) for a post-closing ownership transfer. The system may activate lien reconciliations 778 to confirm that any newly discovered liens align with a TMR value /62/K48PAA131/ or the original TMR values /62/K29/////2/ or /62/K45///PHA/. If AI-based anomaly detection identifies suspicious changes—for instance, an erroneously updated lien—the SSI management module (e.g., decentralized identity management module 806 and processor 808) helps ensure authorized sellers or owners finalize the update. A smart contract embedded in blockchain title management 824 may then automate the revision, generating canonicalized cryptographic digests for the final records in near real time. This configuration helps property insurers, assessors, and city councils obtain tamper-evident proof of the steps, mitigating mismatches involving TMR values, PI values, or AP identifier values post-closing.

System Integration and Claim Coverage

As illustrated in FIG. 8, the metadata validation system 700 functions as an AI-driven environment for zoning, tax, or lien adjustments (751, 762, 778) while incorporating SSI mechanisms (802-820). In some configurations, these processes can tie into blockchain title management (822, 824) for near-real-time, tamper-evident identity and metadata verifications. By covering both pre-closing SSI checks (Usage Scenario 1) and post-closing title transfers (Usage Scenario 2) at 43531 Mahala St, Unit A-131, the system may show constructive possession of a comprehensive solution blending AI decision support, cryptographic identity checks, and real-estate record validation. Persons skilled in the art may appreciate that alternative cryptographic algorithms (e.g., ECDSA, lattice-based signatures), AI methodologies (reinforcement learning, gradient boosting), or multi-signature consensus remain within the spirit and scope of the appended claims, supporting secure property transactions across varied jurisdictions.

Referring now to FIG. 9 (sheet 14/21), examples of the present disclosure may include a computer-implemented system 900 that combines AI-driven decision-support with self-sovereign identity (SSI) features. In some implementations, an edge AI processing module 910, an encryption module 930, and a machine learning model retraining system 1000 can collectively support real estate anomaly detection, tamper-evident data integrity, and secure property ownership verification. In other approaches, the edge AI processing module 910 may coordinate a processor 912 (executing AI decision logic) and a memory 914 (storing AI model data), optionally involving an IoT-enabled processing 920 element for sensor or geospatial metadata. By performing real-time anomaly detection at the "edge," the system can address anomalies in TMR values, PI values, or AP identifier values before they propagate through property transactions.

Encryption Module (930) for SSI Transactions

It is yet another aspect that an encryption module 930 may secure SSI transactions and metadata using cryptographic proofs or cryptographically protected ledger inputs. In some examples, credential-issuance workflows for decentralized identity could be integrated to manage verifiable credentials for property owners or sellers. In alternative configurations, the encryption module 930 encrypts data comprising TMR values, PI values, or AP identifier values before transmitting the data to an external ledger or cross-jurisdiction repository, thus preserving privacy and lessening the risk of unauthorized manipulation.

Machine Learning Model Retraining System

A machine learning model retraining system 1000 underpins adaptive AI capabilities within this architecture. In some approaches, a machine learning model retraining engine c 1010 updates AI models based on new data, aided by a cluster flagging module 1020 that pinpoints data clusters requiring attention. In various configurations, a processor (for ML retraining) 1012 executes these algorithms, while memory 1014 may hold newly optimized model parameters for distributed or decentralized nodes. This retraining mechanism enables the system to adapt to emerging anomaly patterns-such as altered TMR values or potentially altered lien records.

Usage Scenario 1: Pre-Closing Field Validation (Expanded Stakeholders)

In one scenario, a regional title inspector employs the edge AI processing module 910 on location to verify property data for 43535 Mahala St Unit B-211, Lansdowne 20176-6517, Virginia, USA. For instance, building or zoning permit applications referencing TMR values /62/K29/////2/ or /62/K45///PHB/ (issued to the first owner of record, Developer ABC) may conflict with newly recorded TMR value /62/K50PBB211/ in public registries. Concurrently, a shift from a PI value or AP identifier value 113-40-5108-000 to 113-40-3309-000 or 113-40-3310-001 can signal additional inconsistencies. The processor 912, running AI decision logic, detects these anomalies using models in memory 914. In some implementations, the cluster flagging module 1020 highlights repeated boundary mismatches or missing permits for further review. Potential homebuyers, lenders, county clerks, or attorneys could then access cryptographically secured records if encryption module 930 is invoked to authenticate credential checks, helping maintain alignment of TMR values, PI values, or AP identifier values before closing.

In some configurations, an IoT-enabled processing 920 node may aggregate sensor or geospatial data (e.g., LiDAR, satellite imagery) to augment anomaly analysis. The encryption module 930 protects any SSI or ownership credential checks performed onsite, validating that authorized stakeholders (e.g., sellers, owners, municipal agents) can approve metadata changes. By identifying discrepancies involving TMR values, PI values, or AP identifier values ahead of closing, homebuyers, real estate brokers, and financial institutions can mitigate legal or financial risks arising from flawed or incomplete transactions.

Usage Scenario 2: Mortgage Loan Origination in Remote Nodes (Expanded Stakeholders)

Usage Scenario 2: Mortgage Loan Origination in Remote Nodes (Expanded Stakeholders)

System Integration and FIG. 9 Overview

Accordingly, FIG. 9 shows how this decision-support and SSI system 900 unifies edge AI processing (910, 912, 914, 920), encryption 930, and machine learning model retraining (1000, 1010, 1020, 1012, 1014) to deliver real-time anomaly detection, data integrity, and decentralized identity verification. In some approaches, the system may proactively identify mismatched TMR values, PI values, or AP identifier values before transactions close, reducing risk for homebuyers, lenders, and municipal authorities. By referencing cryptographic protocols (e.g., quantum-resistant ciphers, zero-knowledge proofs) and advanced AI retraining methods, this disclosure supports many non-limiting configurations. Persons of skill may appreciate that expansions—such as multi-signature consensus, collaboration with blockchain ledger updates, or role-based access—fall within the spirit and scope of the appended claims.

Figure 10:
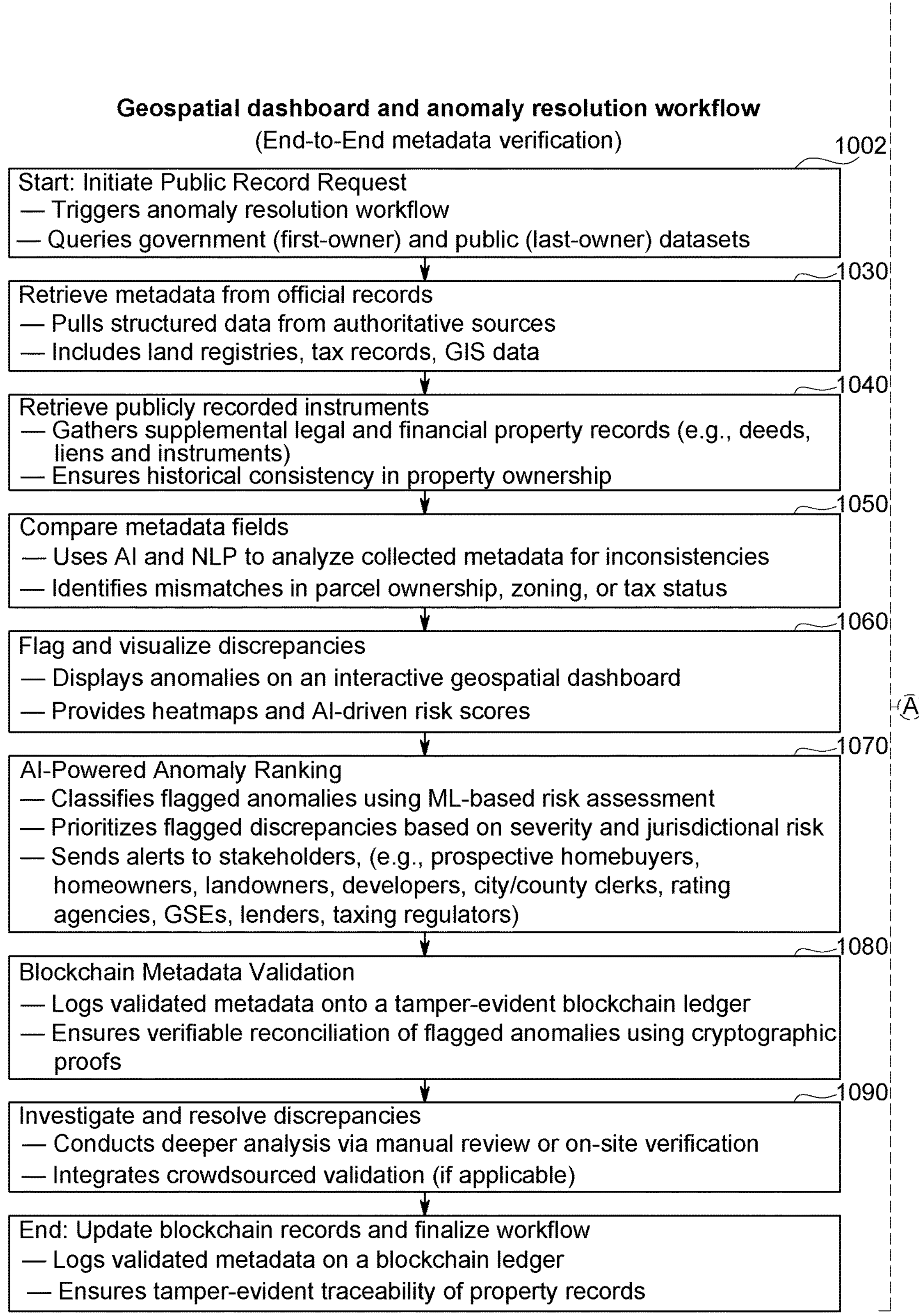
FIG. 10 is a diagram of a geospatial dashboard and anomaly resolution workflow for initiating public record requests, retrieving metadata, comparing metadata fields, visualizing discrepancies, ranking anomalies, validating metadata on a blockchain, and finalizing record updates.

Referring now to FIG. 10 (sheets 15/21 and 16/21), examples of the present disclosure may include a geospatial dashboard and anomaly resolution workflow for end-to-end metadata verification of real estate records. In some implementations, this multi-step process retrieves official or public data, detects inconsistencies via AI, and finalizes corrections on a tamper-evident ledger. In various configurations, the system can handle TMR values, PI values, or AP identifier values, geospatial overlays (e.g., LiDAR), and relevant building or zoning permits.

Initiate Public Records Request

At step 1002, the system may initiate the anomaly resolution workflow by querying official government registries, municipal records, or private datasets. In some configurations, the system gathers TMR values, PI values, or AP identifier values through a Public Record Request for local government—issued metadata (e.g., building/zoning permits)—traceable to the first owner of record-helping ensure newly uncovered or updated records are flagged for validation. In some examples, advanced indexing or AI searching can identify relevant property fields across multi-jurisdictional data sources.

Retrieve Official Records and Public Instruments

After the initial request, step 1030 obtains structured data from trusted sources (e.g., land registries, tax databases, GIS frameworks), while step 1040 may collect publicly recorded deeds, liens, or other property documents. In some implementations, these steps unify data from various jurisdictions or servers, creating a rich dataset for anomaly detection. For instance, building/zoning permit applications referencing a TMR value 49/P/1/////C2 for the first owner of record can be cross-checked with updated TMR values (e.g., TMR value /49/R/4///241/) in public registry instruments, preserving traceability of historical data.

Compare Metadata Fields

At step 1050, the system can use AI and NLP to evaluate collected metadata for inconsistencies, such as mismatched lot ownership, zoning anomalies, or unrecorded boundary alterations. In some approaches, multi-modal AI architectures handle anomaly detection and classification. The system may flag conflicting TMR values, PI values, or AP identifier values from multiple agencies or time periods, issuing timely alerts to homebuyers, lenders, or local assessors.

Flag and Visualize Discrepancies

Anomalies discovered at step 1050 appear at step 1060 on an interactive geospatial dashboard, featuring heatmaps and AI-derived risk scores for stakeholders (e.g., homebuyers, property owners, zoning boards, mortgage underwriters). In various implementations, the system can distinguish "high-risk" anomalies (e.g., TMR conflicts above a designated threshold) from "low-risk" discrepancies (e.g., address formatting), enabling stakeholders to prioritize effectively. Geospatial overlays such as LiDAR or aerial imagery may highlight unapproved expansions or missing building permits.

AI-Powered Anomaly Ranking

Following discrepancy identification, step 1070 may apply machine learning-based risk assessment to rank flagged inconsistencies by severity, legal implications, or jurisdiction. In some implementations, real-time alerts are directed to a variety of recipients (e.g., prospective homebuyers, landowners, developers, financial institutions, taxing regulators). If federated learning is employed, the system dynamically adjusts risk categories across regions. For instance, a suspicious TMR value /49/R/4///241/ can be escalated if repeated anomalies surface in adjacent counties.

Blockchain Metadata Validation

In some approaches, step 1080 may incorporate blockchain metadata validation, recording confirmed data on a tamper-evident blockchain ledger using canonicalized cryptographic digests and cryptographic proofs. Additionally, encryption or hashing may protect PII while preserving a tamper-evident environment for TMR values, PI values, or AP identifier values. By enabling verifiable reconciliation of flagged discrepancies, the system aligns with claims involving ledger-based property data. Stakeholders (e.g., title insurers, escrow agents, municipal clerks) can rely on this ledger for final verification once anomalies are addressed.

Investigate and Resolve Discrepancies

At step 1090, the workflow can use manual or hybrid processes, combining AI insights with legal checks or on-site inspections. In various examples, crowdsourced validation (e.g., from surveyors or property inspectors) may support boundary or lien authenticity investigations. In some implementations, any investigative actions can be logged on the blockchain, forming a tamper-evident audit trail that provides buyers, sellers, lenders, or government officials with confidence in the resolution process.

End—Update Blockchain Records and Finalize Workflow.

Lastly, the workflow concludes by updating blockchain records and logging validated metadata and corresponding canonicalized cryptographic digests to maintain tamper-evident traceability. This process may involve multi-signature consensus or automated notifications to title companies, local authorities, or relevant stakeholders, confirming newly resolved property data as official. Persons skilled in the art may appreciate how this end-to-end process-comprising retrieval, AI analysis, geospatial risk assessment, blockchain validation, and final recordation-provides an integrated solution falling within multiple appended claims.

Usage Scenario 1 (Pre-Closing Data Verification)

In one scenario, prospective homebuyers, real estate brokers, or city councils may follow steps 1002-1040 to compile property data for 2228 Abboccato Ter SE Unit 241, Leesburg 20175-4792, Virginia, USA, sourced from building/zoning permit applications referencing TMR values /49/P/1/////C2/ or /49/R/4///241/ (allotted by local agencies to the first owner of record, Developer ABC). If AI analysis at step 1050 detects inconsistencies (e.g., a mismatch involving PI values from 190-40-0971-000 to 189-10-1382-013), the system displays them on the geospatial dashboard at step 1060. Anomaly ranking at step 1070 may notify lenders or homebuyers if significant ownership conflicts exist. Blockchain metadata validation at step 1080 ensures tamper-evident logging of any rectifications so TMR values or PI values can be updated before the final closing.

Usage Scenario 2 (Post-Closing Permit Reconciliation)

In another scenario, lenders, escrow companies, and county boards revisit the same property (2228 Abboccato Ter SE Unit 241) to reconcile newly found building logs or zoning changes. If step 1050 identifies an unrecorded boundary extension or a missing building permit conflicting with the property's TMR value /49/P/1/////C2/ but documented as a TMR value /49/R/4///241/ in the public registry, the system may escalate the discrepancy. Stakeholders (developers, appraisers, zoning commissions) can investigate via step 1090. Once resolved, the system finalizes the update on the blockchain ledger, ensuring the corrected TMR values, PI values, or AP identifier values conform to authorized sources. This approach mitigates disputes over partial records or unverified expansions after transaction completion.

Overall End-to-End Verification and Claim Coverage

As shown in FIG. 10, this geospatial dashboard and anomaly resolution workflow supports comprehensive real estate metadata validation. In some implementations, the synergy of AI field comparisons (step 1050), anomaly ranking (step 1070), and blockchain logging (step 1080) helps protect TMR values, PI values, or AP identifier values from unauthorized activity or oversight. Although this disclosure references cryptographic features (e.g., post-quantum encryption, multi-signature consensus, canonicalized cryptographic digests, ZKP-based verification, or ECDSA-secured commit operations) and advanced AI (federated learning), persons skilled in the art may recognize that expansions—such as zero-knowledge proofs or smart contract triggers—fall within the scope of the appended claims, delivering a multifaceted approach to property data governance.

Automated Public Record Request Flow (AI+Blockchain)

Figure 10A:
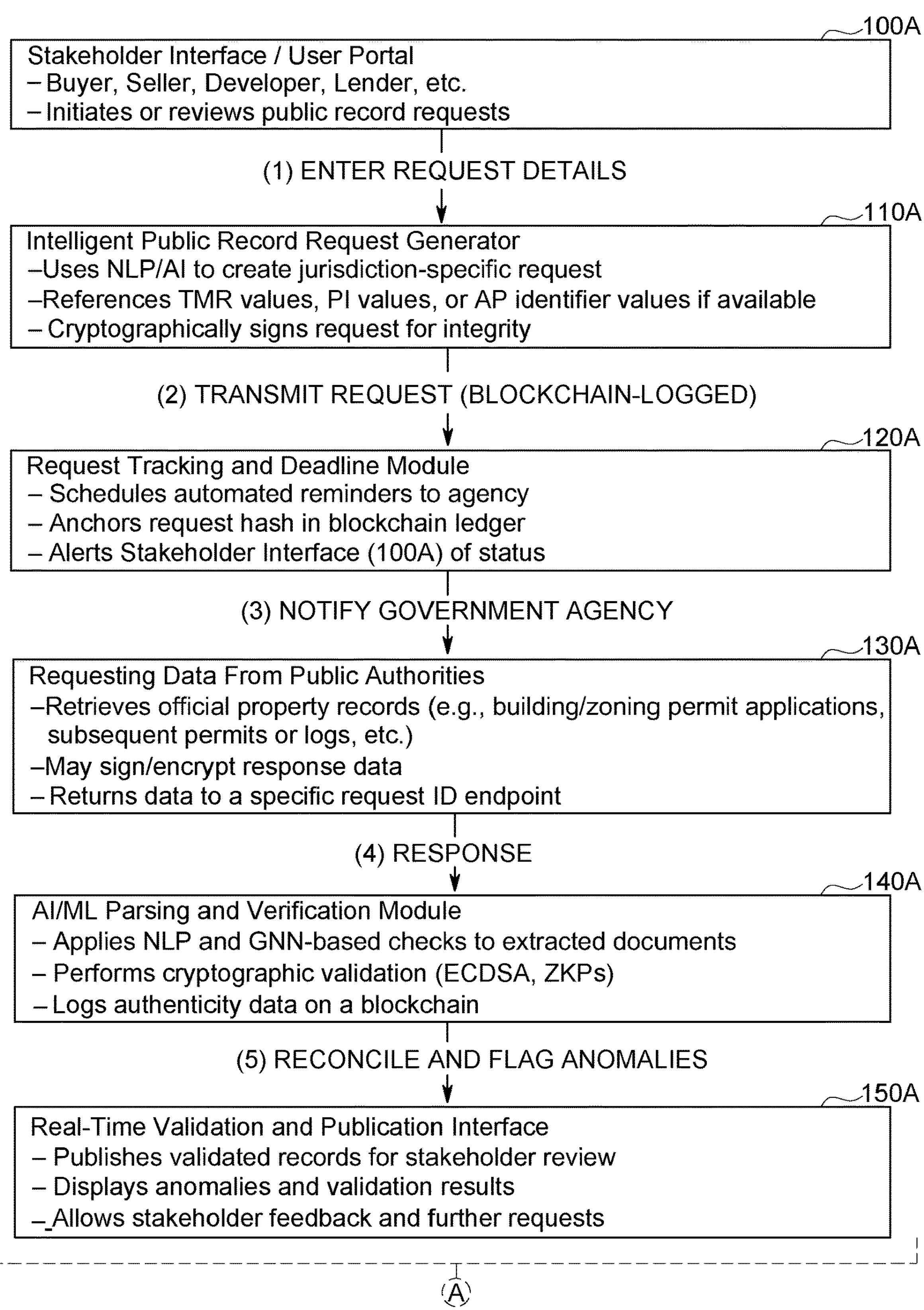
FIG. 10A is a flow diagram illustrating an automated public record request process, which may involve AI-based parsing, blockchain hashing, and stakeholder notifications through a stakeholder interface, an Intelligent Public Record Request Generator, request tracking, public-authority response handling, AI/ML parsing and verification, and real-time validation and publication.

Referring now to FIG. 10A (sheets 17/21 and 18/21), examples of the present disclosure may include a framework for verifying and reconciling real estate metadata (e.g., TMR values, PI values, or AP identifier values) throughout a property transaction. FIG. 10A highlights two usage scenarios: Pre-Closing Public Record Request and Post-Closing Lien Corrections/Refinance Validation. Both scenarios may involve multiple stakeholders—prospective homebuyers, homeowners, landowners, developers, lenders, city councils, zoning commissions, county recorders, title insurers, or government authorities—relying on accurate title metadata (e.g., a first owner of record and a last owner of record) to confirm ownership lineage, assess lien status, or spot boundary issues. The system employs artificial intelligence/machine learning (AI/ML) for anomaly detection, a secure blockchain ledger for tamper-evident audit logs, and cryptographic methods for data authenticity checks, thereby providing a robust, scalable platform that does not limit the overall disclosure.

Stakeholder Interface/User Portal and Intelligent Public Record Request Generator In some approaches, FIG. 10A includes a Stakeholder Interface/User Portal 100A, enabling various users—such as homebuyers, homeowners, developers, lenders, attorneys, or title insurers—to input or review property details. For instance, a user may provide the address 2228 Abboccato Ter SE Unit 241, Leesburg 20175-4792, Virginia, USA, plus any known data comprising TMR values, PI values, or AP identifier values (e.g., /49/P/1/////C2/ or 190-40-0971-000). Once submitted, an Intelligent Public Record Request Generator (PRR Module) 110A uses natural language processing (NLP) to produce relevant jurisdiction-specific protocols data requests. A Request Tracking & Deadline Module 120A then logs the request in a blockchain ledger, establishing a tamper-evident timestamp and automating reminders to public authorities 130A for timely responses.

In some configurations, the Requesting and Receiving Data from Public Authorities Module 130A retrieves official records—such as building/zoning permit applications, subsequent permits or logs, or property ownership documents referencing the first owner of record. These records may be cryptographically signed and returned to the system, where an AI/ML Parsing and Verification Module 140A (also referred to as a Metadata Reconciliation Engine (MRE)) uses GNN or other AI methods to detect anomalies, authenticate cryptographic signatures, and detect conflicts (e.g., a TMR value /49/P/1/////C2/ vs. a TMR value /49/R/4///241/). If inconsistencies arise, a Real-Time Validation & Publication Interface 150A publishes flagged data, allowing stakeholders (e.g., title insurers, surveyors, appraisers, or municipal planners) to supply extra documentation or corrective action.

Usage Scenario 1 (Pre-Closing Public Record Request)

In a first scenario, prospective homebuyers and a mortgage lender employ the Stakeholder Interface 100A to verify that the seller declaring title to 2228 Abboccato Ter SE Unit 241 is indeed the last owner of record. Users enter the property's situs address, plus a TMR value /49/P/1/////C2/, or rely on the system to locate matching TMR values, PI values, or AP identifier values in local government databases. Once initiated, the Intelligent Public Record Request Generator (PRR Module) 110A cryptographically signs and transmits the request to the Request Tracking & Deadline Module 120A, which logs a corresponding cryptographic hash or canonicalized cryptographic digest in a blockchain ledger for tamper-evident tracking. The Government Authority 130A responds with official building/zoning logs referencing the first owner of record (e.g., Developer ABC) and relevant ownership files. The MRE 140A then compares these documents to publicly recorded instruments citing the last owner of record, running cryptographic checks (e.g., ECDSA, zero-knowledge proofs) and pinpointing data mismatches. For instance, TMR values or PI values from earlier permits (/49/P/1/////C2/ or 190-40-0971-000) may conflict with updated TMR values or PI values in the county registry (/49/R/4///241/or 189-10-1382-013). The interface 150A reveals the flagged mismatch, enabling buyers, lenders, and possibly local zoning officials or inspectors to resolve it before closing—thus averting title defects, financing delays, or erroneous property descriptions.

Usage Scenario 2 (Post-Closing Lien Corrections/Refinance Validation)

In another scenario, existing homeowners, escrow agents, or title insurers revisit the property's record if an unrecorded lien or boundary change appears after closing. They input the address or TMR value (/49/P/1/////C2/) into Stakeholder Interface 100A, prompting the Intelligent Public Record Request Generator (PRR Module) 110A to log a new blockchain-tracked request. Following data retrieval from land development building/zoning permits (subsequent permits or logs) and other records referencing the first owner of record and the last recorded deed referencing the last owner of record, the AI/ML Parsing and Verification Module 140A compares them with the original building/zoning permit applications. Anomalies—such as a TMR value /49/R/4///241/ or a PI value 189-10-1382-013 not matching the deed—are escalated in interface 150A, allowing title insurers, county planners, or assessors to gauge the validity of newly assigned TMR values, PI values, or AP identifier values. If additional evidence is requested (e.g., updated boundary surveys), stakeholders can upload it via interface 150A, with changes recorded on the blockchain as tamper-evident ledger entries. In some implementations, smart contracts may release or hold escrowed funds once the system identifies alignment among TMR values, PI values, or AP identifier values (or lien data) and official records.

Blockchain and AI Integration Across Stages

During these workflows, the blockchain fosters a tamper-evident audit trail for requests, responses, and resolutions, verifiable by parties such as financial institutions, real estate brokers, county clerks, or institutional investors. Merging AI/ML-driven anomaly detection with cryptographic protocols (e.g., zero-knowledge proofs, ECDSA-secured commit operations, canonicalized cryptographic digests, or quantum-resistant approaches) helps secure data while safeguarding stakeholder privacy. This architecture aligns with technology center classifications (TC 2100 or TC 2400) concerning machine learning and blockchain-based security. Furthermore, the system's modular nature supports varied local, state, or federal criteria, including time-sensitive record replies or robust disclosures for property owners. Disclosed features (e.g., reinforcement learning, geospatial analysis, or federated AI training) can enhance system performance by identifying ownership anomalies or unrecorded encumbrances.

Comprehensive Property Lifecycle Scenarios

The twelve figures in this application present at least two scenarios akin to those illustrated by FIG. 10A, covering distinct phases of a property's lifecycle. Reconciling data from the first owner of record (e.g., an original developer) and the last owner of record (e.g., a subsequent homeowner) can be beneficial here, enabling stakeholders (title insurance underwriters, county boards, land-use commissions, mortgage-backed securities investors) to validate TMR values, PI values, and AP identifier values. By systematically identifying incomplete building logs, unrecorded liens, or unauthorized boundary modifications, the platform bolsters transaction transparency while lowering risks of hidden encumbrances. Since any flagged anomaly or change to a TMR value or PI value is logged on the blockchain, the process remains tamper-evident and auditable by authorized participants.

AI/ML Parsing and Verification Module 140A (MRE) and Cryptographic Security

The AI/ML Parsing and Verification Module 140A—also referred to as a Metadata Reconciliation Engine (MRE) in some claims—can include image recognition for digitized surveys or geospatial analytics to detect undisclosed boundary changes. Such capabilities support surveyors, planning consultants, or inspectors who rely on accurate parcel dimensions and validated permits. Quantum-resistant cryptographic methods may further safeguard ownership metadata from potential future cryptographic exploits, enabling the system to adapt to evolving technology considerations and regulatory guidelines while maintaining data integrity across varied jurisdictions and transaction stages.

Benefits: Pre-Closing and Post-Closing Workflows

A Pre-Closing Public Record Request scenario may equip prospective buyers, sellers, and lenders with reliable data from the outset, mitigating unforeseen complications. A Post-Closing Lien Corrections or Refinance Validation scenario helps ensure public records accuracy post-sale, allowing current owners to resolve newly discovered liens or corrected parcel references in time to avert refinancing or boundary assessment issues. Although 2228 Abboccato Ter SE Unit 241 and a TMR value /49/P/1/////C2/ illustrate these contexts, the system may address diverse property addresses or metadata arrangements within the claims' scope. By combining AI/ML anomaly detection, tamper-evident blockchain logging, canonicalized cryptographic digests, cryptographic verification, and an interactive collaboration interface, the platform can optimize real estate record administration while preserving broad flexibility for various implementations.

Throughout this specification, phrases such as "in some approaches" or "in various implementations" denote possible embodiments intended to avoid limiting the claims. Any indefinite or relative wording has been revised to avert narrowing. The system remains amenable to advanced features (e.g., federated learning, smart contracts for escrow release, sophisticated geospatial analytics), consonant with the appended claims. This adaptable design addresses known challenges in property record management, leveraging AI/ML and secure ledger functionalities to meet demands for transparency and dependable ownership validation.

Hence, the approaches, modifications, and equivalents described facilitate reconciliation and validation of real estate metadata, elevating confidence and efficiency in property transactions. These examples are not intended to preclude other possible implementations that build upon the same foundational concepts. The claims define the scope of protection, envisaging variations and enhancements within the spirit of the disclosure-such as additional AI-driven enhancements, self-sovereign identity frameworks, or cryptographic provisions supporting future-proof ownership data.

Referring now to FIG. 11 (sheet 19/21), examples of the present disclosure may include a multi-jurisdiction and distributed ledger system 1100 that integrates cybersecurity, regulatory compliance, and secure data logging for real estate record management across diverse regions. This system can help maintain property metadata integrity—including TMR values, PI values, and AP identifier values—even when multiple legal or regulatory frameworks are in place. By leveraging blockchain-based distributed ledger integration (DLT), AI-driven cybersecurity, and near real-time metadata reconciliation, the system can foster tamper-evident transparency, unauthorized-activity risk mitigation, and cryptographically verifiable metadata integrity in handling title records, boundary changes, or lien status verifications.

Cross-Jurisdiction Module and Distributed Ledger Integration

In some implementations, a Cross-Jurisdiction Module 1110 may coordinate compliance across legal boundaries by aligning metadata governance with varying local or regional guidelines. A Distributed Ledger Integration 1112 can enable secure data storage and synchronization using a Byzantine Fault-Tolerant (BFT) consensus mechanism, helping ensure property transactions and metadata remain tamper-evident against system faults or malicious attacks. By interfacing with blockchain or DLT technologies, the system may deliver near-real-time validation of property records, lien releases, or zoning updates, enhancing transparency among title insurers, land-use boards, and financial institutions. In some approaches, cryptographic proofs—such as zero-knowledge proofs (ZKPs), ECDSA-secured commit operations, canonicalized cryptographic digests, or quantum-resistant signatures—may be appended to transactions for heightened security.

Cybersecurity Visualization System and Protection Module

Examples may also include a Cybersecurity Visualization System 1114 that offers near real-time or batch-mode security monitoring, detecting unauthorized changes to property records. Forensic evaluation and data integrity checks can be accessed through a unified dashboard, allowing stakeholders—county clerks, property assessors, lenders—to identify suspicious modifications across multi-jurisdiction networks. Additionally, an AI-driven Cybersecurity Protection Module 1116 may actively surveil system access, employing intrusion detection protocols and role-based permissions to prevent unauthorized modifications to data comprising TMR values, PI values, or AP identifier values. By adopting automated access controls and defensive strategies, the module can verify boundary edits, ownership lineage changes, or lien releases before such updates are fully recorded.

Log User Actions Module and Overlay Anomalies System

In some implementations, a Log User Actions Module 1118 may capture user and system logs, forming a comprehensive audit trail for tracking property metadata updates. This module can timestamp boundary expansions, title changes, or lien releases to confirm they are systematically recorded. Meanwhile, an AI-driven Overlay Anomalies System 1120 may display near real-time or batched cybersecurity anomalies, flagging questionable registry edits, unauthorized property transfers, or irregular tax assessments. A Cluster Metadata Discrepancies Module 1122 can further group anomalies by risk patterns, supporting predictive analytics and automatic anomaly resolution processes.

Generate Security Alerts System

Whenever detected irregularities surpass defined security thresholds, a Generate Security Alerts System 1124 can trigger automated responses or human intervention, alerting cybersecurity teams, government regulators, or real estate transaction stakeholders to potential issues. In various implementations, the system may deploy self-executing smart contracts to block ledger modifications until authorized entities review and address anomalies. Such measures can deter malicious tampering and sustain data integrity across multi-jurisdiction property records.

Usage Scenario 1: Multi-Jurisdiction New Construction Transfer

Consider a multi-jurisdiction scenario where a developer constructs a condominium at 2230 Abboccato Ter SE Unit 244, Leesburg 20175-4792, Virginia, USA, referencing multiple building permits—such as Residential—New Construction Building Permit No. B00208630100, approved on Aug. 26, 2020. The Cross-Jurisdiction Module 1110 may allow municipal planning commissions, tax offices, and regional zoning boards to align TMR values, PI values, or AP identifier values before transferring the property to a prospective homebuyer. By comparing data from the original parent tract (for instance, a TMR value /49/P/1/////C2/) with updated TMR values in public registries (e.g., /49/R/4///244/), the module assists stakeholders in verifying which TMR value applies to the newly constructed unit.

Meanwhile, Distributed Ledger Integration 1112 can synchronize boundary edits, title updates, and tax assessments within the multi-jurisdiction recordkeeping system, including corresponding cryptographic ledger entries or canonicalized cryptographic digests. If a parent parcel previously used a PI value or AP identifier value 190-40-0971-000 but local databases now reference a PI value or AP identifier value 189-10-1382-016 for a child tract, the system ensures near real-time reconciliation so that lenders, county clerks, or real estate brokers know which PI value or AP identifier value is valid for the new property.

During the transaction, if an unapproved update to a TMR value or lien modification surfaces—for example, a sudden shift from /49/P/1/////C2/ to /49/R/4///244/ non-uniform with official logs—the Cybersecurity Protection Module 1116 may promptly flag the suspicious activity and log it in the Log User Actions Module 1118 as a tamper-evident event record. The anomaly then appears in the Overlay Anomalies System 1120, where the Cluster Metadata Discrepancies Module 1122 clusters repeated attempts to alter the same record. If numerous unauthorized changes happen, the Generate Security Alerts System 1124 may pause the transaction and escalate the issue for scrutiny by county officials, lenders, or escrow agents.

Such a proactive approach can enable near real-time unauthorized-activity detection, cross-jurisdiction compliance, and improved title security prior to special warranty deed filings (e.g., Instrument No. 20200910-0080426). This reduces the likelihood of conflicting TMR values or AP identifier values that might otherwise undermine the conveyance.

Usage Scenario 2: Cross-Boundary Refinance with Regulatory Oversight In another scenario, a homeowner in a multi-jurisdiction region initiates a mortgage refinance, verifying TMR values, PI values, or AP identifier values spanning two counties. For example, public registry data may show that a PI value or AP identifier value has changed from 190-40-0971-000 (associated with older building permits) to 189-19-2681-000, causing confusion among recorders and lending institutions. The Cross-Jurisdiction Module 1110 can harmonize these variances by referencing permits, county zoning details, or previously recorded instruments (Certificates of Occupancy, Surveyor's Certificates) so that TMR values or PI values remain correct before refinance approval.

As part of an AI-driven anomaly detection process, the Log User Actions Module 1118 can log data exchanges among mortgage lenders, title insurers, local government offices, or other stakeholders, including planning commissions or escrow agents. If the Overlay Anomalies System 1120 detects an attempt to alter a PI value or AP identifier value (e.g., from 113-40-3309-000 to 189-19-2882-000) in the absence of recognized documentation, the Cluster Metadata Discrepancies Module 1122 may categorize it based on risk parameters. If the irregularities exceed designated thresholds, the Generate Security Alerts System 1124 can immediately inform mortgage insurers, rating agencies, or federal compliance bodies, prompting intervention before the refinance is finalized.

By referencing official permits—such as B00208450100—validating chain of title for Instrument No. 20200817-0070079 or 80P, and mapping changes to TMR values or PI values from a parent to a child tract, the system helps maintain integrity-validated property records and may help reduce the likelihood that a homeowner inadvertently refinances a misidentified parcel.

Overall System Operation and Claim Support

As illustrated in FIG. 11, multi-jurisdiction and distributed ledger system 1100 merges cross-jurisdiction compliance 1110, secure ledger integration 1112, AI-based cybersecurity (1114, 1116, 1120-1124), and real estate transaction auditing 1118 to maintain secure, tamper-evident recordkeeping. Optional cryptographic measures—such as ECDSA-secured commit operations, canonicalized cryptographic digests, ZKP-based verification, or quantum-resistant ciphers—may reinforce ledger integrity, and self-executing smart contracts may enable near real-time property transaction updates.

As depicted in FIG. 11, in various configurations, the multi-jurisdiction and distributed ledger system 1100 can unite cross-jurisdiction compliance module 1110, secure ledger synchronization 1112, AI-driven cybersecurity (1114, 1116, 1120-1124), and transaction auditing 1118 for tamper-evident data records. Cryptographic algorithms—such as ECDSA-secured commit operations, canonicalized cryptographic digests, ZKP-based verification, or quantum-resistant ciphers—may further preserve ledger integrity, while smart contracts can support near real-time transaction updates.

By combining AI-based cybersecurity, blockchain-backed metadata reconciliation, and cross-jurisdiction regulatory automation, this system promotes title transparency, reduces unauthorized-activity risk, and eases compliance in multi-jurisdiction property transactions. Although examples reference 2230 Abboccato Ter SE Unit 244, the system can accommodate varied properties under multiple regulatory frameworks, thereby offering flexibility and efficiency as real estate governance evolves.

Figure 12:
FIG. 12 is a diagram showing a unified blockchain, cryptographic, contract, and AI system including cryptographic hashing, a quantum-resistant cryptographic subsystem, predictive analytics, scalable architecture, a self-executing contract-based system, an AI risk assessment module, an AI compute framework, a multi-module aggregator, and optional OCR, NLP, computer vision, multi-modal aggregation, and blockchain aggregation components.

Referring to FIG. 12 (sheets 20/21 and 21/21), examples of the present disclosure may include a unified blockchain, cryptographic, contract, and AI system 1200 that combines quantum-resistant security, AI analytics, and self-executing contract logic for real estate record management. In some implementations, cryptographic hashing 1210, including canonicalized cryptographic digest generation, predictive analytics tools 1220, and a scalable architecture 1230 (potentially incorporating multi-modal AI modules) can provide tamper-evident on-chain transactions, near real-time anomaly detection, and automated real estate workflows under designated parameters.

Cryptographic Hashing, Predictive Analytics Tools, and Scalable Architecture In some implementations, cryptographic hashing 1210 can secure on-chain data integrity by generating and recording canonicalized cryptographic digests for updates—such as changes to TMR values, PI values, or AP identifier values—into a distributed ledger. Meanwhile, predictive analytics tools 1220 may detect anomalies in on-chain data (e.g., for forged deeds or boundary conflicts). A scalable architecture 1230 supports high-throughput transaction processing, accommodating large volumes of property deals across multiple jurisdictions.

Quantum-Resistant Cryptographic Subsystem

A quantum-resistant cryptographic subsystem 1240 can help protect on-chain data from quantum threats. In some approaches, memory 1242 (storing quantum-safe cryptographic materials) retains lattice-based cryptographic parameters, while a post-quantum engine 1244 produces signatures or ephemeral cryptographic elements. This quantum-safe encryption may bolster ledger integrity and data security over extended periods.

Self-Executing Contract-Based System

A self-executing contract-based system 1300 may automate property processes—such as title updates, lien releases, or escrow triggers—through smart contract logic 1312. Memory 1310 stores contract state and parameters, while a trigger mechanism 1320 initiates contract execution upon real-world or digital conditions (for instance, checking alignment of TMR values, PI values, or AP identifier values). In some implementations, property transactions may not conclude until TMR values, PI values, or AP identifier values are verified against official sources.

AI-Powered Risk Assessment and AI Compute Framework

The system may also include an AI risk assessment module 1400, featuring memory 1410 (storing AI models) and a processor 1412 (AI risk engine) that evaluates on-chain anomalies (e.g., incomplete deed references or boundary expansions absent valid building permits). An AI compute framework 1420 can optimize AI models for large-scale blockchain tasks, supporting distributed computations for near real-time anomaly detection. The system merges cryptographic ledger updates with AI logic to identify flagged data before ownership changes are executed by self-executing contracts.

Multi-Module Aggregator

A multi-module aggregator 1500 may coordinate cryptographic hashing 1210, the quantum-safe subsystem 1240, the AI risk assessment 1400, and the self-executing contract system 1300. By updating quantum-safe keys, broadcasting transaction triggers, or recording final property metadata and corresponding canonicalized cryptographic digests, the aggregator yields a cohesive real estate ecosystem.

Usage Scenario 1: Pre-Closing Quantum-Safe Mortgage Validation

In one illustrative scenario, prospective homebuyers and lenders utilize system 1200 to confirm property details at 2232 Abboccato Ter SE Unit 243, Leesburg 20175-4792, Virginia, USA, prior to loan finalization. A building/zoning permit application from Jan. 10, 2020—and Residential-New Construction Permit B00208450100 (approved Aug. 26, 2020)—might reference a TMR value /49/P/1/////C2/ for a parent tract. Public registry records sometimes show a modified TMR value /49/R/4///243, risking confusion if not validated.

When the system ingests these records, the AI risk assessment module 1400 cross-checks TMR values or PI values (represented on-chain by canonicalized cryptographic digests generated by cryptographic hashing 1210) against official logs. If the multi-module aggregator 1500 detects unverified updates to TMR values, overlooked liens, or suspicious changes, it can alert zoning boards, city councils, or lenders before smart contract logic 1312 releases mortgage funds. By leveraging quantum-resistant checks (subsystem 1240), the system helps ensure that the first owner of record and associated data comprising TMR values, PI values, or AP identifier values match government-issued documents, mitigating title disputes or mortgage rejection risks.

Usage Scenario 2: Post-Closing AI-Driven Title Correction

In another situation, a homeowner or developer may notice conflicting TMR values or PI values following closing for the same property (2232 Abboccato Ter SE Unit 243). Official data might list a PI value or AP identifier value 190-40-0971-000 for the parent tract, while public registries show PI values or AP identifier values 189-19-2882-000 or 189-10-1382-015, which do not appear to have an approved permit justifying the shift.

As depicted in FIG. 12, the unified blockchain, cryptographic, contract, and AI system 1200 integrates quantum-resistant encryption 1240, AI analytics 1400, self-executing contracts 1300, cryptographic hashing 1210, predictive analytics 1220, scalable architecture 1230, and the multi-module aggregator 1500 to furnish a secure, automated framework for real estate data governance. One or more optional components (A)-(E)—such as an OCR module for scanned deeds, an NLP engine for TMR values or PI values, or a blockchain aggregator—may support advanced document parsing or boundary detection. The system may also use ECDSA-secured commit operations, canonicalized cryptographic digests, ZKP-based verification, or quantum-resistant ciphers for secured ledger transactions, enabling near real-time updates or self-executing contract features.

Overall, FIG. 12 illustrates how quantum-safe cryptographic tools, AI modules, self-executing contracts, and high-throughput ledger operations can jointly address discrepancies involving TMR values, PI values, or AP identifier values in multi-jurisdiction contexts. Earlier FIGS. 1-11)

offer the foundation for these capabilities—covering public record requests (FIG. 1), geospatial analytics (FIG. 4), SSI frameworks (FIG. 8), and edge AI (FIG. 9). By merging these elements, FIG. 12 can advance AI-enhanced real estate transactions across diverse jurisdictions and reinforce the applicant's constructive possession of the subject matter, including canonicalized cryptographic digest generation, ZKP-based verification, ECDSA-secured commit operations, AI model workflows, and automated contract execution designed to encourage real-time property data alignment.

Glossary

For clarity and to define context-specific terminology used throughout this application, the following glossary is provided:

AI-Powered Metadata Reconciliation

A computational process that may include artificial intelligence (AI), such as graph neural networks (GNNs), to harmonize diverse real estate metadata (e.g., TMR values, PI values, or AP identifier values). This reconciliation helps maintain data accuracy and uniformity across various property ownership and transaction records.

Anomaly Detection Module

A module that employs machine learning approaches—such as reinforcement learning, self-organizing maps (SOMs), and self-supervised contrastive learning—to detect inconsistencies or suspicious entries in real estate metadata. The module may generate risk scores for flagged anomalies, prioritizing higher-risk issues for expedited resolution.

Assessor Parcel (AP) identifier values

Government-issued assessor parcel identifier values assigned by local tax authorities to specific parcels. AP identifier values serve as a core reference for validating parcel location, ownership lineage, and tax assessment data, thereby facilitating chain-of-title verification and reliable property transactions.

Blockchain Audit Trail Module

A blockchain-based element configured to create cryptographically secure, tamper-evident logs that record the progression of property metadata validation, anomaly detection, stakeholder input, and compliance checks including, in some implementations, canonicalized cryptographic digests of jurisdiction-specific metadata fields. This module may enhance transparency and tamper-evident traceability throughout the property record lifecycle.

Byzantine Fault-Tolerant (BFT) Consensus

A decentralized blockchain consensus methodology that offers robust data synchronization even under adversarial or unreliable network conditions. BFT consensus may protect property data from potentially unauthorized modifications or conflicting ledger entries, preserving transaction reliability.

Cadastre

An official land registry system containing details of boundaries, ownership, property assessments, and zoning data. It supports real estate metadata validation by providing recognized source data for comparing TMR values, PI values, and AP identifier values.

Chain-of-Custody

A procedure incorporating cryptographic timestamping and canonicalized cryptographic digest generation (e.g., blockchain ledger entries) to preserve the integrity of government-issued property records (e.g., land development building or zoning permit applications, subsequently issued permits or logs, and property ownership history documents) during the reconciliation process. Transfers or modifications can be logged chronologically, aiding auditability and preventing unauthorized updates.

Chain-of-Title

An officially documented series of property ownership transfers (e.g., via recorded deeds, liens, or other instruments). A blockchain-based chain-of-title framework can confirm the authenticity of ownership lineage by cross-referencing government-issued documentation (e.g., zoning permits, building permits, tax records) and public land registries.

Child Tract

A subdivided parcel originating from a larger Parent Tract. Child Tracts may receive distinct parcel identifiers (e.g., TMR values, PI values, or AP identifier values) to streamline boundary delineation, recordkeeping, and referencing. In some approaches, anomaly detection and metadata reconciliation processes can reveal and address inconsistencies in subdivided parcels.

Comparison Interface

A graphical or programmatic interface presenting side-by-side comparisons of government-issued records (including first-owner data) with publicly recorded metadata (including last-owner data). This interface may highlight any mismatches involving TMR values, PI values, or AP identifier values, boundary issues, or other relevant metadata discrepancies.

Cryptographic Hashing

A procedure that generates canonicalized cryptographic digests for property data (e.g., TMR values, PI values, or AP identifier values, and building permits). These digests may enable tamper-evident integrity checks, support detection of unauthorized modifications, and anchor recorded data in a blockchain ledger.

Decentralized Identity Management Module

A blockchain-based, self-sovereign identity (SSI) component handling cryptographic credentials to validate property ownership, user authenticity, or stakeholder authorization. This module may incorporate zero-knowledge proofs (ZKPs) to maintain privacy while verifying identity claims.

Elliptic Curve Digital Signature Algorithm (ECDSA)

A cryptographic signing method used to authenticate metadata updates on blockchain networks, including ECDSA-secured commit operations in some implementations. ECDSA ensures transactions are cryptographically signed and traceable to authorized stakeholders, mitigating tampering or impersonation in property record adjustments.

Federated Learning

A distributed machine learning model in which local nodes (e.g., multiple jurisdictions or agencies) train AI models on region-specific property data in a manner that does not reveal sensitive information. The aggregated parameters can enhance overall model accuracy for cross-jurisdictional anomaly detection and metadata alignment.

Geospatial Data Acquisition Module

A component that gathers and integrates spatial datasets (e.g., satellite imagery, LiDAR scans, cadastral maps). This module can perform real-time boundary checks, detect unauthorized land modifications, and validate TMR values, PI values, or AP identifier values against recognized geospatial records.

Merkle Tree Verification

A cryptographic approach using hash trees (Merkle trees) to confirm the completeness and tamper-evident integrity of blockchain-stored real estate data. Leaf nodes in a Merkle tree represent canonicalized cryptographic digest entries, facilitating efficient validation of individual records against linked Merkle-tree structures in the ledger structure.

Metadata Clustering

A machine learning technique grouping flagged anomalies (e.g., absent TMR values, PI values, or AP identifier values, boundary conflicts) by severity, region, or transaction type. Clustering may expedite anomaly resolution by streamlining risk analyses and organizing flagged records for stakeholder review.

Natural Language Processing (NLP)

AI-driven techniques that convert unstructured textual real estate documents (e.g., legal descriptions, land development building or zoning permit applications, subsequent issued permits/logs, and property ownership history documents) into structured metadata. NLP supports comprehensive anomaly detection, chain-of-title analyses, and advanced metadata reconciliation.

Parent Tract

An original land parcel from which Child Tracts are derived. In some implementations, the system may reference the Parent Tract's official records (e.g., TMR values, PI values, or AP identifier values, land development building/zoning permits, subsequent approved permits/logs, and property ownership history documents) to maintain boundary alignment and detect unauthorized changes while creating new parcels.

Parcel Identification (PI) values

Parcel-oriented identifier values assigned by local authorities for cross-referencing property tax data, ownership details, land development building/zoning permit applications, subsequent issued permits/logs, property ownership history documents, and real estate transaction data. PI values may help uphold chain-of-title validity and metadata alignment.

Public Record Request Module

A system component that automates record requests according to relevant jurisdiction-specific protocols for official property records (e.g., land development building/zoning permit applications, subsequent issued permits/logs, and property ownership documents). This module may employ zero-knowledge proofs (ZKPs) and cryptographic methods (e.g., canonicalized cryptographic digest generation) to authenticate records before ingestion.

Quantum-Resistant Cryptography

A suite of cryptographic strategies (e.g., lattice-based encryption) intended to withstand emerging quantum computing capabilities. In some approaches, this system leverages such techniques to preserve privacy and security of property records.

Reinforcement Learning-Based Anomaly Detection

Machine learning methods that employ adaptive feedback loops to classify or prioritize flagged property metadata anomalies. Over time, these algorithms learn from stakeholder inputs and historical resolutions, refining anomaly detection thresholds and risk evaluations.

Self-Supervised Contrastive Learning

AI training methods that can operate in scenarios where explicitly labeled data is not available, enabling the model to discover intricate patterns in property records and detect potential anomalies (e.g., mislabeled TMR values, PI values, or AP identifier values, unauthorized boundary changes) based on implicit data structures.

Smart Contract-Based Notarization

An automated blockchain approach in which self-executing contracts verify ownership metadata, enforce escrow conditions, or handle dispute resolution. This process can facilitate property transfers by securely notarizing the relevant data and record modifications.

Special Warranty Deed

A type of real estate deed in which the grantor warrants title against claims that arise during the grantor's ownership period, as opposed to claims that may have originated beforehand. In this disclosure, a special warranty deed may be reconciled against metadata comprising TMR values, PI values, or AP identifier values using AI-based schema matching and blockchain-supported verification ledgers. Such reconciliation can compare metadata found in government-issued documents (e.g., building or zoning permit applications, subsequent permits/logs, and property ownership history documents referencing the first owner of record) with publicly recorded data (e.g., deeds, liens, mortgages referencing the last owner of record), thereby promoting ownership lineage validation and reducing anomalies before or after conveyance. This method can incorporate zero-knowledge proof (ZKP) authentication, anomaly scoring, and stakeholder review in real-time validation modules. See also: TMR value, PI value, AP identifier value, Public Record Request Module, Metadata Reconciliation Engine.

Tax Map Reference (TMR) Values

Jurisdiction-assigned identifier values attached to zoning or tax maps. TMR values indicate property boundaries for accurate taxation, ownership checks, and cross-referencing within public or government registries.

Zero-Knowledge Proof (ZKP)

A privacy-preserving cryptographic protocol that allows a prover to demonstrate knowledge of, or compliance with, property data in a manner that does not reveal sensitive information. ZKPs can safeguard proprietary or personal details (e.g., identity, transaction values) while confirming the authenticity of real estate records.

The invention claimed is:

1. A blockchain-based metadata-reconciliation system for real-estate records, the system comprising:

(a) a Blockchain Audit Trail Module, including a distributed-ledger processing unit and a cryptographic engine, operable to perform operations comprising:

(i) generating and storing canonicalized cryptographic digests of jurisdiction-specific metadata fields, including Tax Map Reference (TMR) values, Parcel Identification (PI) values, and Assessor Parcel (AP) identifier values, by executing a deterministic parallel hashing routine and recording comparisons between data associated with a first owner of record and a last owner of record in a blockchain ledger;

(ii) storing the canonicalized cryptographic digests as linked Merkle-tree structures recorded across multiple ledger nodes;

(iii) verifying data integrity using a zero-knowledge-proof (ZKP) verifier that detects unauthorized ledger modification while preserving confidentiality of record content; and (iv) appending authenticated annotations, including supplemental evidence, to the blockchain ledger through Elliptic Curve Digital Signature Algorithm (ECDSA)-secured commit operations executed in a hardware-anchored enclave to prevent exfiltration of cryptographic keys.

2. The system of claim 1, further comprising an Intelligent Public-Record Request Generator operable to implement a public-record acquisition subsystem comprising:

(i) a rules parser coupled to an AI-powered compliance engine trained on relevant jurisdiction-specific protocols and operable to parse local regulatory frameworks;

(ii) a request queue operable to generate and submit public-record requests that align with applicable real-estate document guidelines; and (iii) a tracking datastore operable to track request statuses by logging queries and responses into a blockchain ledger as cryptographically hashed entries that are auditably tamper-evident.

3. The system of claim 1, wherein a distributed-ledger processing unit executes Elliptic Curve Digital Signature Algorithm (ECDSA)-secured commit operations that cryptographically sign ledger updates and cryptographically link the updates to historical records to maintain a tamper-evident audit trail.

4. The system of claim 1, wherein integration of the zero-knowledge-proof verifier, the Merkle-tree structures, and the Elliptic Curve Digital Signature Algorithm (ECDSA)-secured commit operations provides reduced verification latency, reduced hash-collision propagation, and tamper-evident, privacy-preserving validation of jurisdiction-specific metadata prior to recordation in the blockchain ledger and associated disbursement of real-property transaction funds.

* * * * *